(12) United States Patent
Kim et al.

(10) Patent No.: US 12,713,121 B2
(45) Date of Patent: Aug. 18, 2026

(54) CAMERA DEVICE

(71) Applicant: LG INNOTEK CO., LTD., Seoul (KR)

(72) Inventors: Hyun Soo Kim, Seoul (KR); Jung Cheol Kim, Seoul (KR); Hyeon Jun Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 7 days.

(21) Appl. No.: 18/709,665

(22) PCT Filed: Oct. 24, 2022

(86) PCT No.: PCT/KR2022/016282

§ 371 (c)(1),
(2) Date: May 13, 2024

(87) PCT Pub. No.: WO2023/085644

PCT Pub. Date: May 19, 2023

(65) Prior Publication Data

US 2025/0008208 A1 Jan. 2, 2025

(30) Foreign Application Priority Data

Nov. 12, 2021 (KR) ........................ 10-2021-0155696
Nov. 12, 2021 (KR) ........................ 10-2021-0155697

(51) Int. Cl.
*H04N 23/55* (2023.01)
*H04N 23/51* (2023.01)
*H04N 23/54* (2023.01)

(52) U.S. Cl.
CPC ............. *H04N 23/55* (2023.01); *H04N 23/51* (2023.01); *H04N 23/54* (2023.01)

(58) Field of Classification Search
CPC ......... F16F 15/02; H04N 23/00; H04N 23/51; H04N 23/54; H04N 23/55; H04N 23/57; H04N 23/60
See application file for complete search history.

(56) References Cited

U.S. PATENT DOCUMENTS 9,781,345 B1 * 10/2017 Miller ...................... G02B 7/09
2020/0166771 A1 * 5/2020 Huang ................ G02B 27/646
(Continued)

FOREIGN PATENT DOCUMENTS

KR 10-2015-0054719 A 5/2015
KR 10-2016-0000728 A 1/2016
(Continued)

OTHER PUBLICATIONS

International Search Report dated Jan. 31, 2023 in International Application No. PCT/KR2022/016282.
(Continued)

*Primary Examiner* — Amy R Hsu
(74) *Attorney, Agent, or Firm* — SALIWANCHIK, LLOYD & EISENSCHENK

(57) ABSTRACT

The present embodiment relates to a camera device that performs optical image stabilization (OIS) by moving an image sensor. The camera device can drive the image sensor along three axes, that is, an x-axis shift, a y-axis shift, and a z-axis rolling, and comprises: a base; a housing disposed on the base; an image sensor disposed in the base; a wire movably supporting the image sensor, and a first damper that connects the housing and the wire, wherein the housing is fixed to the base.

20 Claims, 43 Drawing Sheets

(56) References Cited

U.S. PATENT DOCUMENTS

2021/0176400 A1* 6/2021 Miller .................... H04N 23/54
2023/0023813 A1* 1/2023 Oh ....................... H04N 23/687

FOREIGN PATENT DOCUMENTS

| | | | |
|---|---|---|---|
| KR | 10-2017-0021682 | A | 2/2017 |
| KR | 10-2018-0098074 | A | 9/2018 |
| KR | 10-2018-0109928 | A | 10/2018 |
| KR | 10-2019-0013561 | A | 2/2019 |
| KR | 10-2020-0031629 | A | 3/2020 |
| KR | 10-2020-0055548 | A | 5/2020 |
| KR | 10-2021-0081556 | A | 7/2021 |

OTHER PUBLICATIONS

Office Action dated Apr. 7, 2026 in Korean Application No. 10-2021-0155696.
Office Action dated Apr. 8, 2026 in Korean Application No. 10-2021-0155697.

* cited by examiner

FIG. 48(a)
FIG. 48(b)
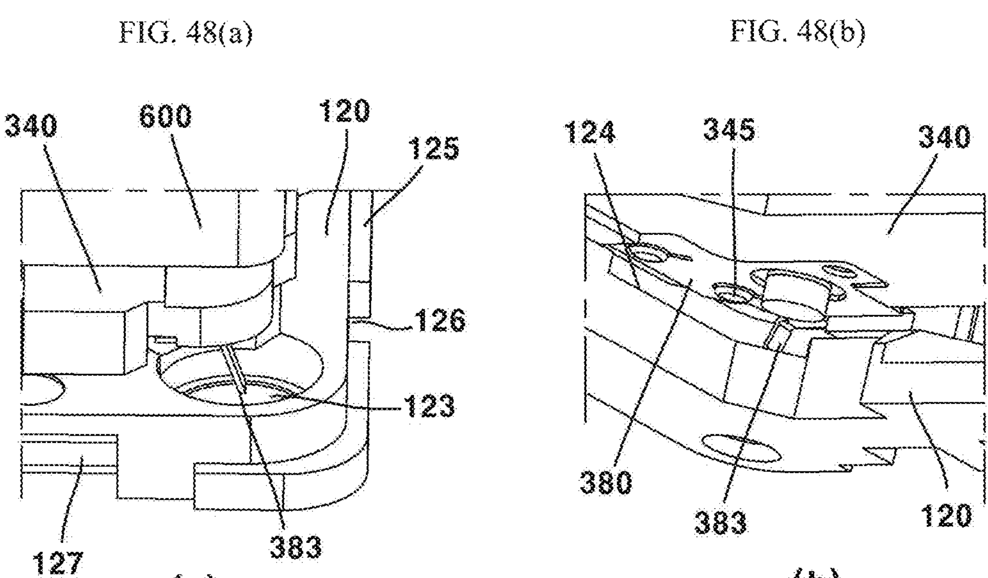
FIG. 49
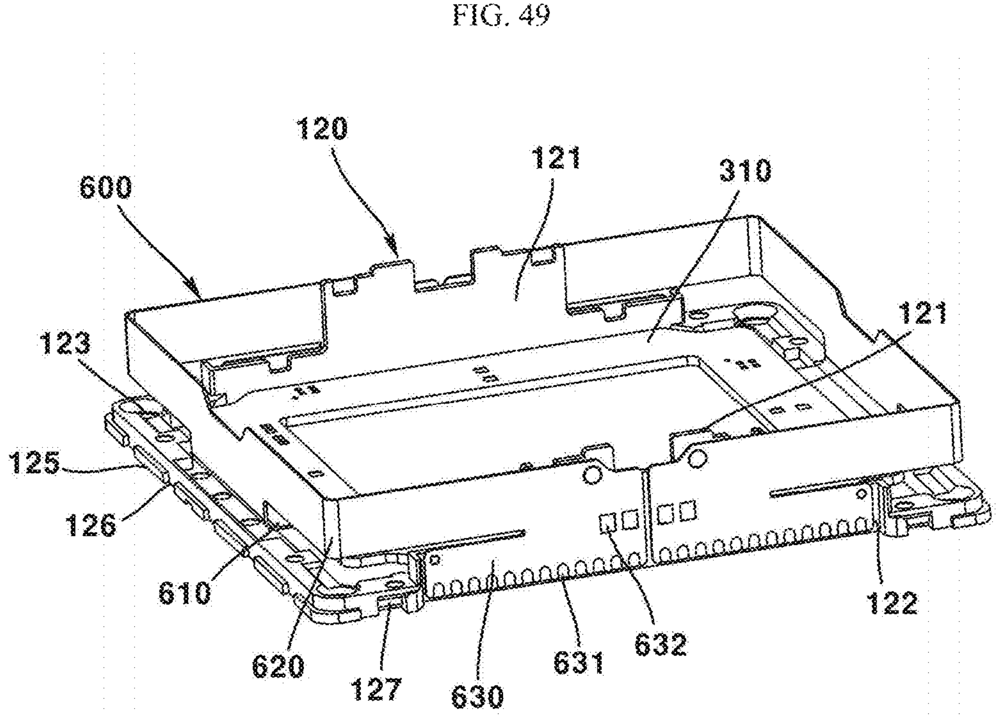

310
121b
121a
121
121a
121b
122
120

140
142
144
127
120

(a)

140
144a
142
127
120

(b)

CAMERA DEVICE

CROSS-REFERENCE TO RELATED APPLICATIONS

This application is the U.S. national stage application of International Patent Application No. PCT/KR2022/016282, filed Oct. 24, 2022, which claims the benefit under 35 U.S.C. § 119 of Korean Application Nos. 10-2021-0155696, filed Nov. 12, 2021; and 10-2021-0155697, filed Nov. 12, 2021; the disclosures of each of which are incorporated herein by reference in their entirety.

TECHNICAL FIELD

The present embodiment relates to a camera device.

BACKGROUND ART

A camera device is a device that photographs a picture or video of a subject and is installed in an optical apparatus such as a smartphone, a drone, a vehicle, and the like.

In recent camera devices, in order to improve the quality of images in recent camera devices, optical image stabilization (OIS) function that compensates for image shaking caused by user movement is being required.

In camera devices, the image stabilization function is performed by moving the lens in a direction perpendicular to the optical axis. However, with the recent trend toward higher pixels, the diameter of the lens increases, which increases the weight of the lens, making it difficult to secure electromagnetic force to move the lens inside a limited space.

DETAILED DESCRIPTION OF THE INVENTION

Technical Subject

The present embodiment is intended to provide a camera device that performs an image stabilization function by moving the image sensor.

The present embodiment is intended to provide a camera device that drives an image sensor in three axes: x-axis shift, y-axis shift, and z-axis rolling.

Technical Solution

The camera device according to the present embodiment comprises a base; a housing being disposed on the base; an image sensor being disposed inside the base; a wire movably supporting the image sensor; and a first damper connecting the housing and the wire, wherein the housing may be fixed to the base.

It comprises a first driving unit that moves the image sensor in a direction perpendicular to the optical axis, wherein the wire is disposed in the optical axis direction, wherein the housing comprises a hole or a groove through which the wire passes, and wherein at least a portion of the first damper may be disposed in the hole or the groove of the housing.

The hole or the groove of the housing comprises: a first chamfer having a width in a direction perpendicular to the optical axis increases as it moves upward; and a second chamfer being disposed below the first chamfer and having a width increasing in a direction perpendicular to the optical axis direction as it moves downward, wherein the length of the second chamfer in an optical axis direction may be longer than the length of the first chamfer in an optical axis direction.

The housing comprises a groove being formed in a corner region of an upper surface of the housing, wherein a dam is formed between an outer side surface of the housing and the groove of the housing by the groove of the housing, and wherein at least a portion of the first damper may be disposed inside the dam of the housing.

The camera device comprises an upper elastic member being coupled to the housing, wherein a first portion of the wire may be coupled to the upper elastic member.

The first damper may be spaced apart from the upper elastic member.

The camera device comprises: a bobbin being movably disposed inside the housing; and a second damper connecting the bobbin and the upper elastic member, wherein the upper elastic member comprises: an outer portion being coupled to the housing; an inner portion being coupled to the bobbin; a connecting portion connecting the outer portion and the inner portion; and a coupling portion being extended from the outer portion and coupled to the wire, and wherein the second damper may be connected to the connecting portion of the upper elastic member.

The bobbin comprises a groove being formed on an upper surface of the bobbin, wherein the connecting portion of the upper elastic member comprises: a first portion connecting the outer portion and the inner portion; and a second portion being extended from the first portion to a position corresponding to the groove of the bobbin, and wherein the second damper may connect the groove of the bobbin and the second portion of the connecting portion of the upper elastic member.

The second portion of the connecting portion of the upper elastic member may be disposed closer to the outer portion of the upper elastic member than an inner portion of the upper elastic member.

The second portion of the connecting portion of the upper elastic member is formed in a circular shape with a diameter larger than another portion of the second portion at an end portion of the second portion, wherein the second portion of the connecting portion of the upper elastic member may comprise a hole being formed at an end portion of the circular shape.

The bobbin comprises a protrusion being formed on the upper surface of the bobbin, wherein the third damper connects the protrusion of the bobbin and the first portion of the upper elastic member, and wherein the third damper may be connected to a portion between the outer portion and the second portion of the first portion of the upper elastic member.

The camera device comprises: a first substrate in which the base is disposed; a second substrate being spaced apart from the first substrate and electrically connected to the image sensor; a connection substrate connecting the first substrate and the second substrate; a holder being disposed in the second substrate; and a coupling member being disposed in the holder, wherein a second portion of the wire may be coupled to the coupling member.

The camera device comprises a holder being coupled to the image sensor; and a coupling member made of a metal and being disposed in the holder, and wherein the wire may be coupled to the coupling member.

The camera device may comprise a fourth damper connecting the coupling member and the base.

The base comprises a groove being formed on an upper surface of the base, wherein the coupling member may comprise: a coupling portion being coupled to the wire; and an extension portion being extended from the coupling portion toward the groove of the base to form an obtuse angle with the coupling portion.

At least a portion of the fourth damper is disposed inside the groove of the base and may be connected to the extension portion of the coupling member.

Each of the first damper, the second damper, and the third damper may have viscosity.

An optical apparatus according to the present embodiment comprises a main body; a camera device being disposed in the main body; and a display being disposed in the main body and outputting a video or an image being photographed by the camera device.

The camera device according to the present embodiment comprises: a first substrate; a base being disposed in the first substrate; a second substrate being disposed in the first substrate; an image sensor being electrically connected to the second substrate; a cover member being disposed on the base and comprising an upper plate and a side plate; and a connecting substrate being disposed inside the cover member, connecting the first substrate and the second substrate, and comprising a terminal portion, wherein the base comprises a first groove being formed on an outer side surface of the base facing the side plate of the cover member, and wherein the terminal portion of the connecting substrate may be disposed in the first groove of the base and spaced apart from the side plate of the cover member.

The connecting substrate comprises a connecting portion being connected to the second substrate, and an extension portion connecting the connecting portion and the terminal portion, wherein the extension portion of the connecting substrate may be spaced apart from the side plate of the cover member in a direction perpendicular to the optical axis direction.

The connecting portion of the connecting substrate may be disposed further inside than the outer side surface of the base.

The camera device comprises a driving unit that moves the image sensor in a direction perpendicular to the optical axis against the first substrate, and the connecting portion of the connecting substrate may be spaced apart from the side plate of the cover member by more than a stroke space in the direction perpendicular to the optical axis direction.

The base comprises a hole being formed larger than the image sensor at a position corresponding to the image sensor, and the base may comprise a first protruded portion being protruded from an inner surface of the base at an opposite side of the first groove of the base.

The base comprises a second protruded portion being protruded from the first protruded portion, and the second substrate may be overlapped with the second protruded portion without being overlapped with the first protruded portion in an optical axis direction.

The camera device may comprise: a housing being disposed in the base; a bobbin being disposed inside the housing; a holder being disposed in the second substrate; an upper elastic member connecting the housing and the bobbin; a coupling member being disposed in the holder; and a wire connecting the upper elastic member and the coupling member.

The coupling member comprises a coupling portion being coupled to the holder and an extension portion being bent and extended from the coupling portion, wherein the base comprises a second groove being formed on an upper surface of the base, and wherein a damper may be disposed in the second groove of the base and connected to the extension portion of the coupling member.

The base comprises a third groove being formed on the upper surface of the base and being extended from the second groove in a direction perpendicular to the optical axis, wherein the second groove may be formed to be deeper from the upper surface of the base than the third groove.

The base comprises a protruded portion being protruded from an upper surface of the base, wherein the protruded portion of the base forms the first groove of the base, and wherein the terminal portion of the connecting substrate may be fixed to the protruded portion of the base with adhesive.

The base comprises a step portion being protruded from the outer side surface of the base, wherein the side plate of the cover member is overlapped with the step portion in an optical axis direction, and wherein a sealing member may be disposed between the step portion of the base and the side plate of the cover member.

The base comprises a plurality of fourth grooves being formed on a side surface of the step portion, wherein the side plate of the cover member comprises a groove being connected to at least a portion of the plurality of fourth grooves of the base, and wherein at least a portion of the sealing member may be disposed in the plurality of fourth grooves of the base and the groove of the cover member.

The plurality of fourth grooves of the base comprise a plurality of grooves disposed on a first side surface of the base, wherein in a direction perpendicular to the optical axis direction, the sum of the widths of the plurality of grooves may be 17% to 37% of the width of the first side surface of the base.

The cover member comprises a ground terminal being extended downward from the side plate and coupled to the first substrate through a conductive member, wherein the base comprises a fifth groove being formed on a side surface of the step portion deeper than the thickness of the side plate of the cover member, and wherein the ground terminal of the cover member may be disposed in a position corresponding to the fifth groove of the base or bent so that at least a portion of the ground terminal is disposed inside the fifth groove of the base.

The optical apparatus according to the present embodiment comprises a main body; a camera device being disposed in the main body; and a display being disposed in the main body and outputting a video or image being photographed by the camera device.

Advantageous Effects

Through the present embodiment, the image stabilization function can be performed by moving the image sensor.

In addition, in the present embodiment, a damper is applied to connect wires that move during OIS driving and the housing which is a fixed part so that oscillation phenomenon during OIS driving can be inhibited.

Alternatively, in a modified embodiment, oscillation phenomenon during OIS driving can be inhibited through a damper connecting the extension portion of the coupling member being connected to a lower end of the wire and the base.

In addition, in the present embodiment, a damper is applied between the upper elastic member and the bobbin to inhibit oscillation phenomenon during AF driving. Furthermore, loss of the damper can be inhibited by the damper tank structure of the bobbin. In addition, the anti-dust effect can be enhanced by applying dampers connecting the upper elastic member and the bobbin to two or more locations.

In addition, in the present embodiment, an image sensor PCB assembly can be assembled in a state of actuator assembly through the central hole of the base.

In addition, an OIS damper can be applied to the base.

In addition, the base can be inhibited from interfering with the extension portion of the coupling member.

In addition, space for the driving stroke of the interposer PCB can be secured through the groove structure of the base.

In addition, the inflow of foreign substances can be blocked through the sealing structure between the cover member and the base.

In addition, a grounding structure for the cover member is provided, and interference from such as solder for connecting the cover member and the substrate can be inhibited.

BRIEF DESCRIPTION OF DRAWINGS

Figure 13:
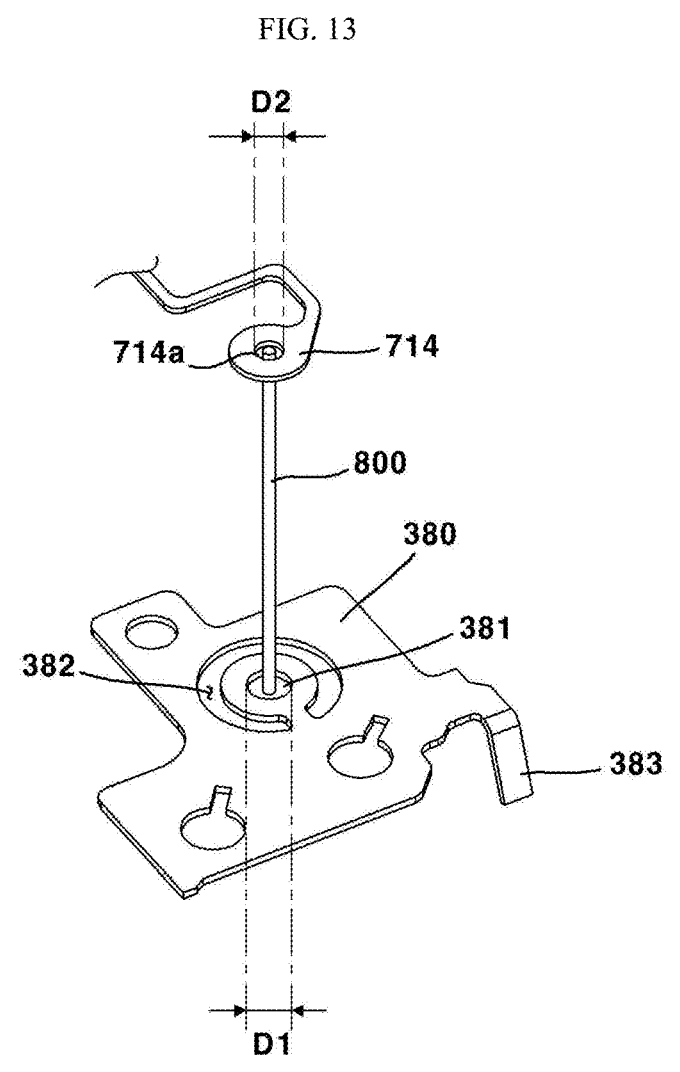

FIG. 13 is an enlarged view of a portion of FIG. 12.

Figure 30:
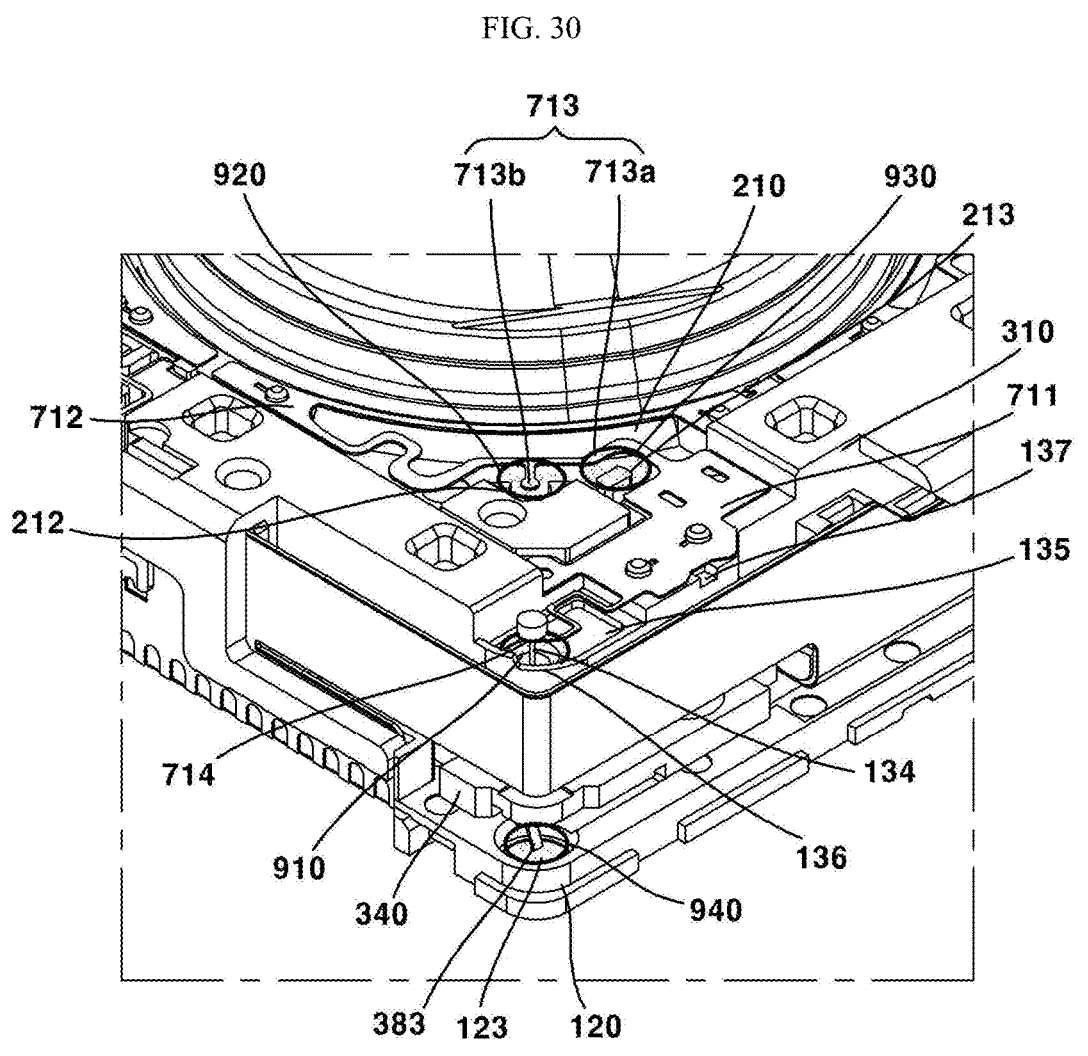

FIG. 30 is an enlarged view illustrating an application structure of the first to fourth dampers of a camera device according to the present embodiment.

FIG. 48(*a*) is a perspective view illustrating an arrangement structure of a coupling member and a base of a camera device according to the present embodiment, and FIG. 48(*b*) is a bottom perspective view.

FIG. 49 is a perspective view illustrating a coupled state of a base and a connecting substrate according to the present embodiment.

FIG. 54(*a*) is a bottom perspective view illustrating a ground terminal and a groove of a base of a camera device according to the present embodiment, and FIG. 54(*b*) is a bottom perspective view of a modified embodiment in which the ground terminal is bent.

FIG. 56 is a diagram illustrating the driving in which an image sensor of a camera device is shifted along an x-axis according to the present embodiment. FIG. 57 is a diagram illustrating the driving in which an image sensor of a camera device is shifted along a y-axis according to the present embodiment. FIG. 58 is a diagram illustrating the driving in which an image sensor of a camera device is rolling about a z-axis according to the present embodiment.

BEST MODE

Figure 1:
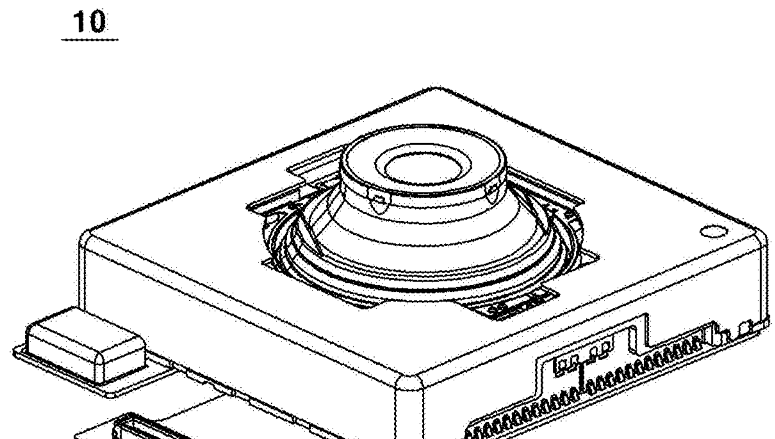
FIG. 1 is a perspective view of a camera device according to the present embodiment.

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction with respect to one component may be comprised.

Hereinafter, one of an 'AF driving unit' and an 'OIS driving unit' may be referred to as a 'first driving unit' and the other one may be referred to as a 'second driving unit'. Hereinafter, one of an 'AF coil 430' and an 'OIS coil 440' may be referred to as a 'first coil' and the other one may be referred to as a 'second coil'. Hereinafter, one among an 'AF magnet 410', an 'OIS magnet 420', a 'sensing magnet 450', and a 'correction magnet 460' is referred to as a 'first magnet', another one is referred to as a 'second magnet', yet another one is referred to as a 'third magnet', and still another one may be referred to as a 'fourth magnet'. Hereinafter, any one among a 'first substrate 110', a 'second substrate 310', a 'sensor substrate 320', a 'third substrate 470', and a 'connecting substrate 600' is referred to as a 'first substrate', another one is referred to as a 'second substrate', yet another one is referred to as a 'third substrate', still another one is referred to as a 'fourth substrate', and yet still another one may be referred to as a 'fifth substrate'.

Hereinafter, a camera device according to the present embodiment will be described with reference to the drawings.

Figure 2:
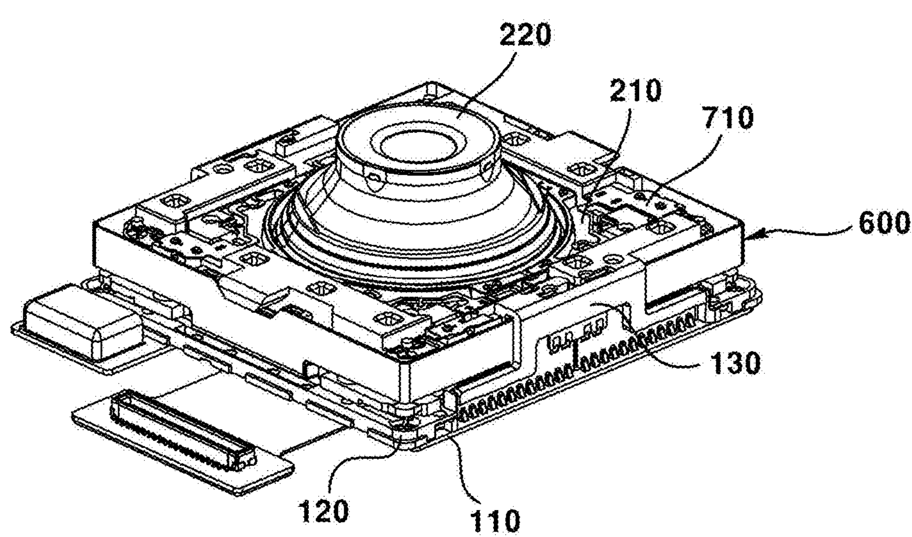
FIG. 2 is a perspective view of the camera device according to the present embodiment with the cover member omitted.
Figure 3:
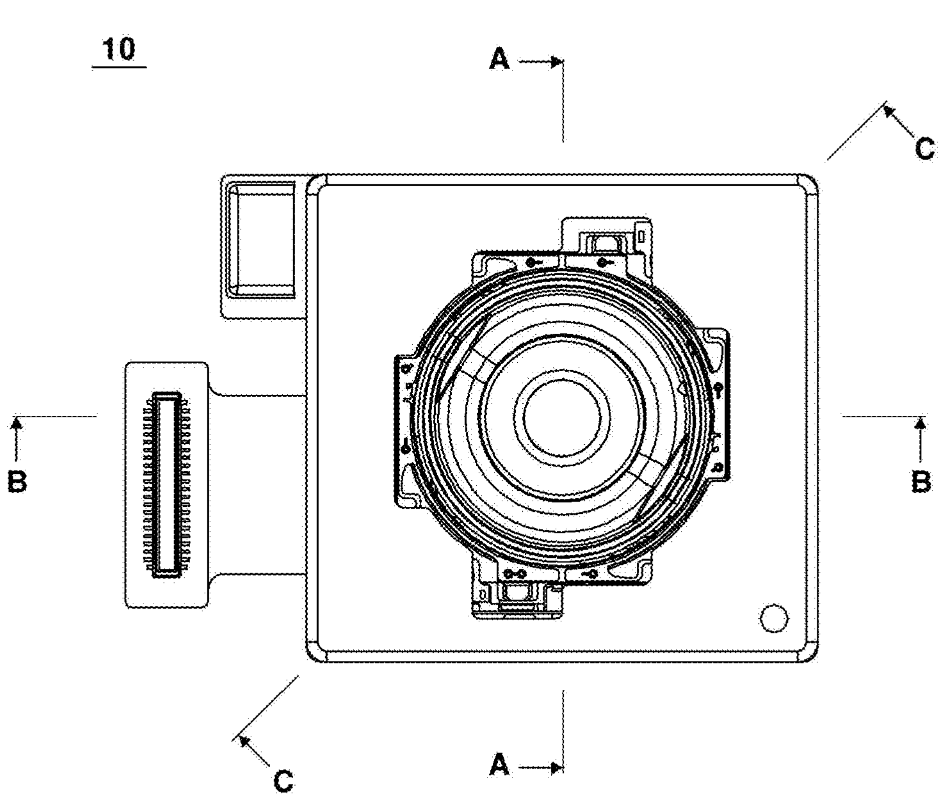
FIG. 3 is a plan view of a camera device according to the present embodiment.
Figure 4:
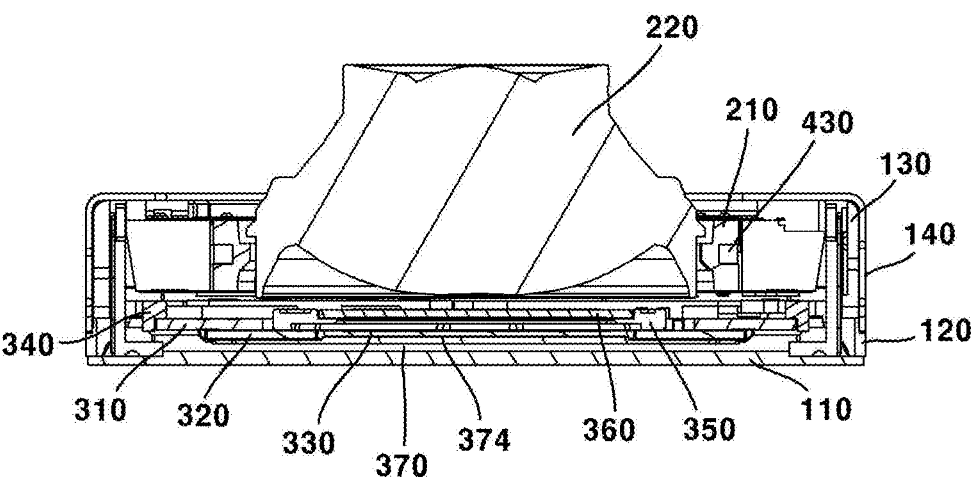
FIG. 4 is a cross-sectional view taken along line A-A of FIG. 3.
Figure 5:
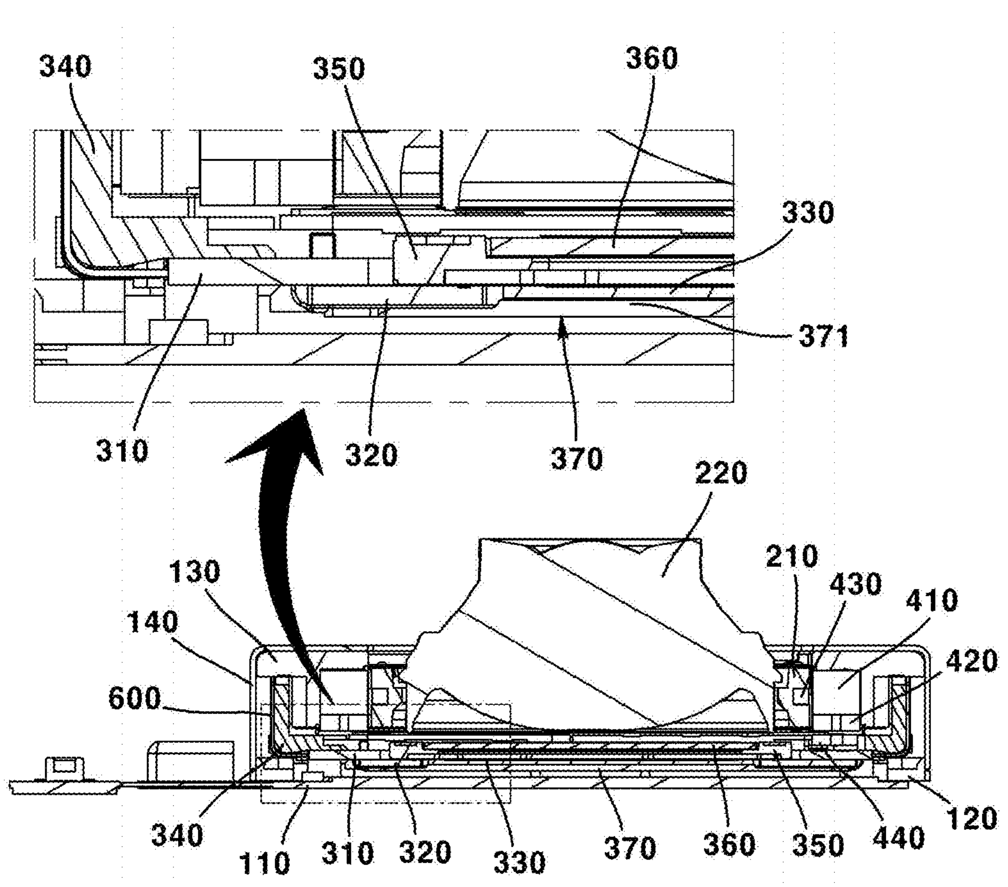
FIG. 5 is a cross-sectional view taken along line B-B of FIG. 3.
Figure 6:
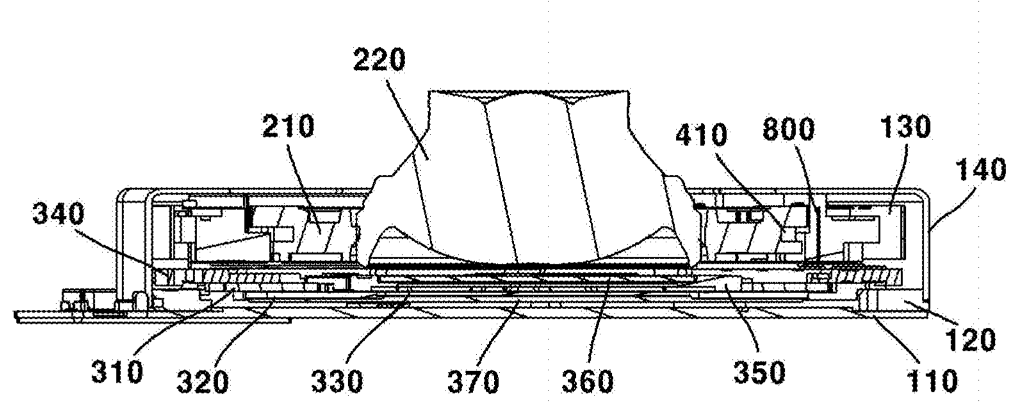
FIG. 6 is a cross-sectional view taken along line C-C of FIG. 3.
Figure 7:
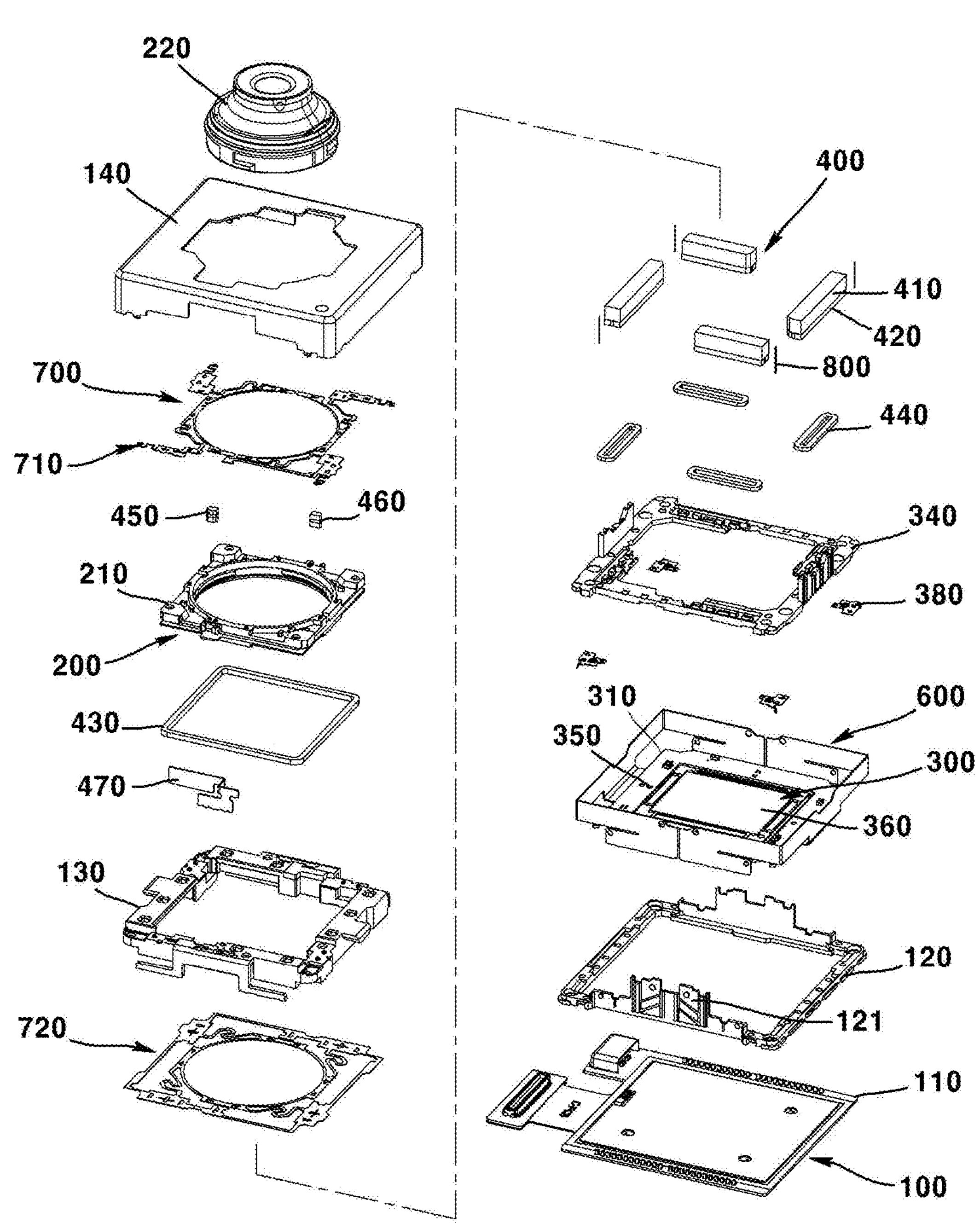
FIG. 7 is an exploded perspective view of a camera device according to the present embodiment.
Figure 8:
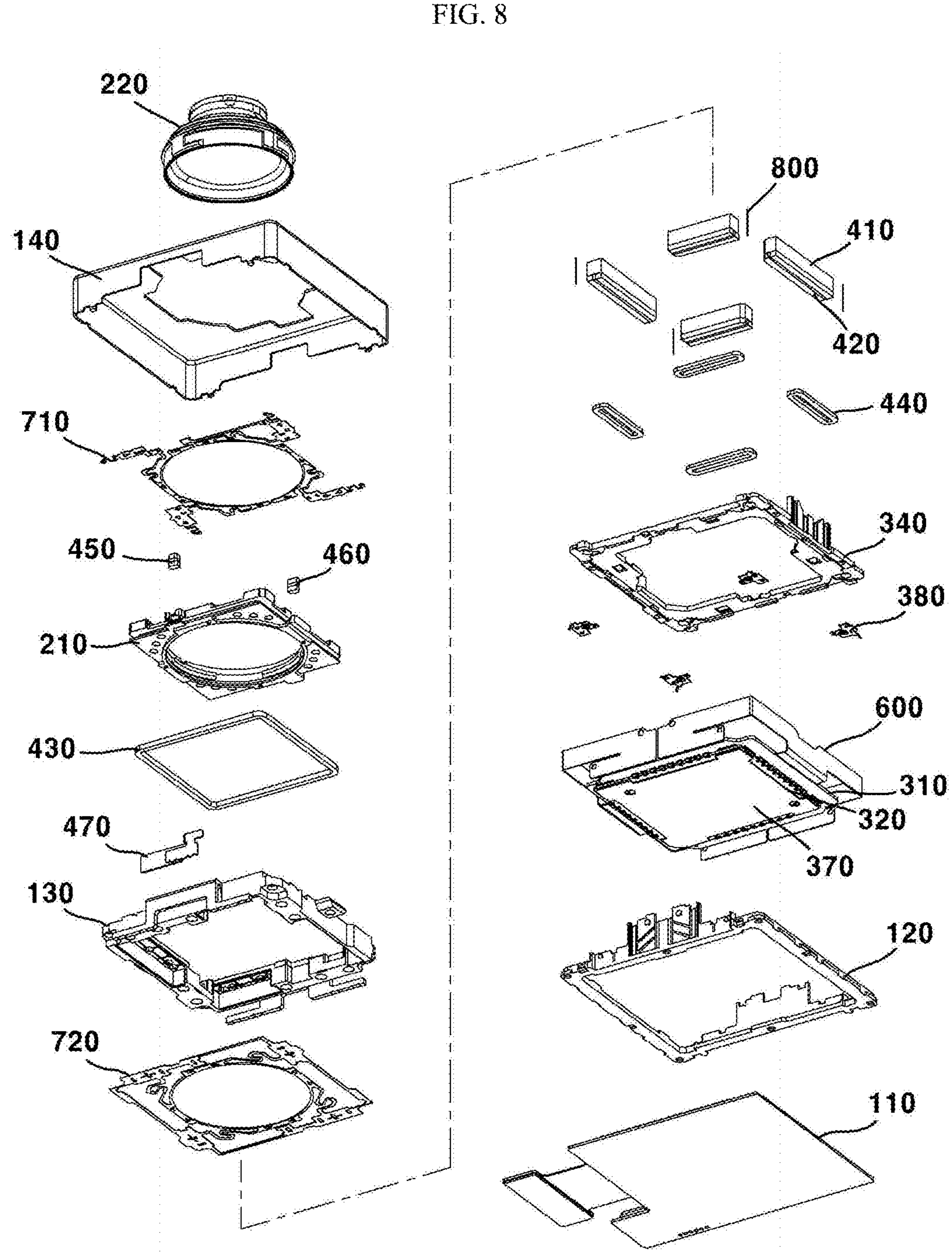
FIG. 8 is an exploded perspective view of a camera device according to the present embodiment viewed from a direction different from that of FIG. 7.
Figure 9:
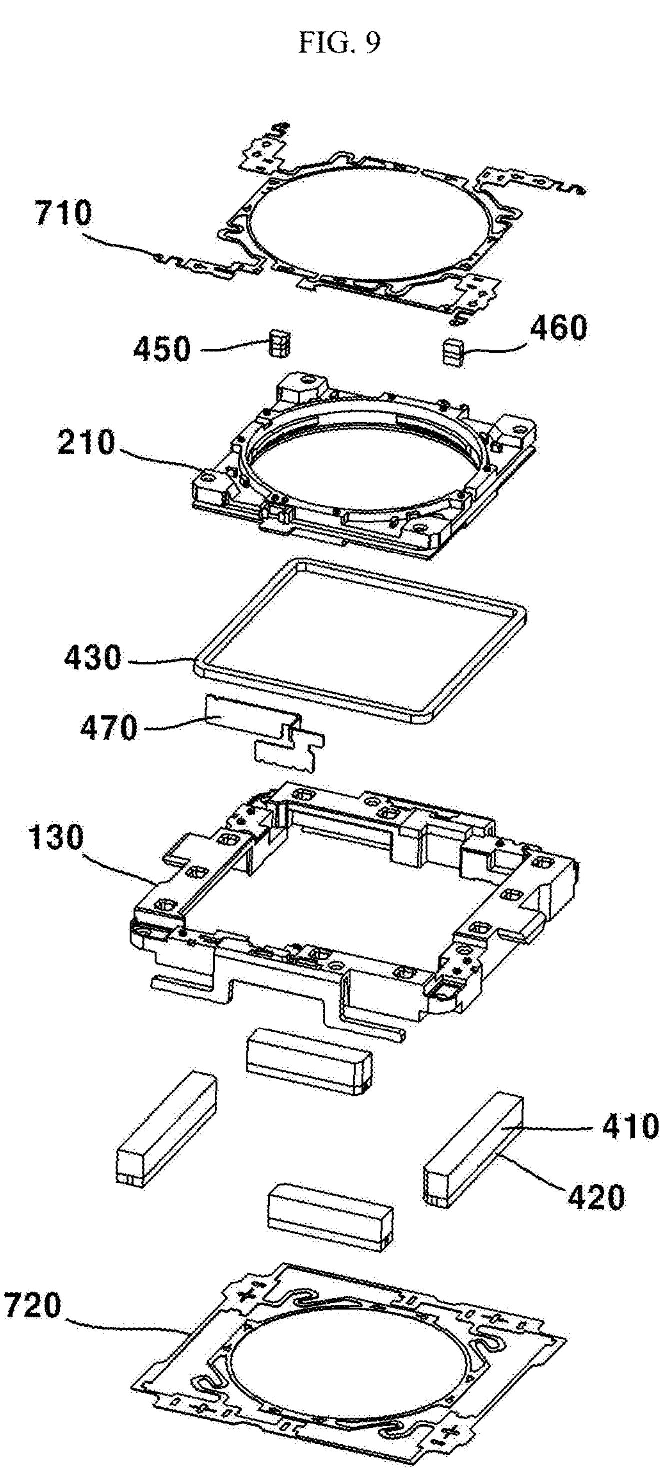
FIG. 9 is an exploded perspective view of a first moving part and related components of a camera device according to the present embodiment.
Figure 10:
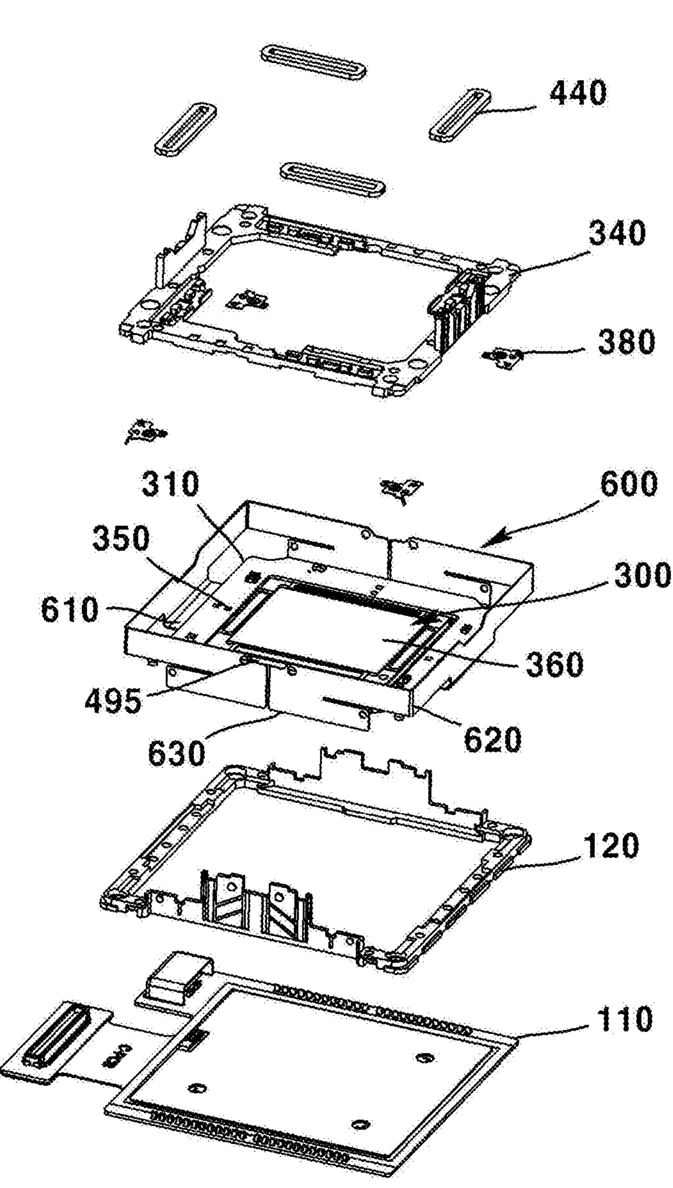
FIG. 10 is an exploded perspective view of the second moving part and related components of a camera device according to the present embodiment.
Figure 11:
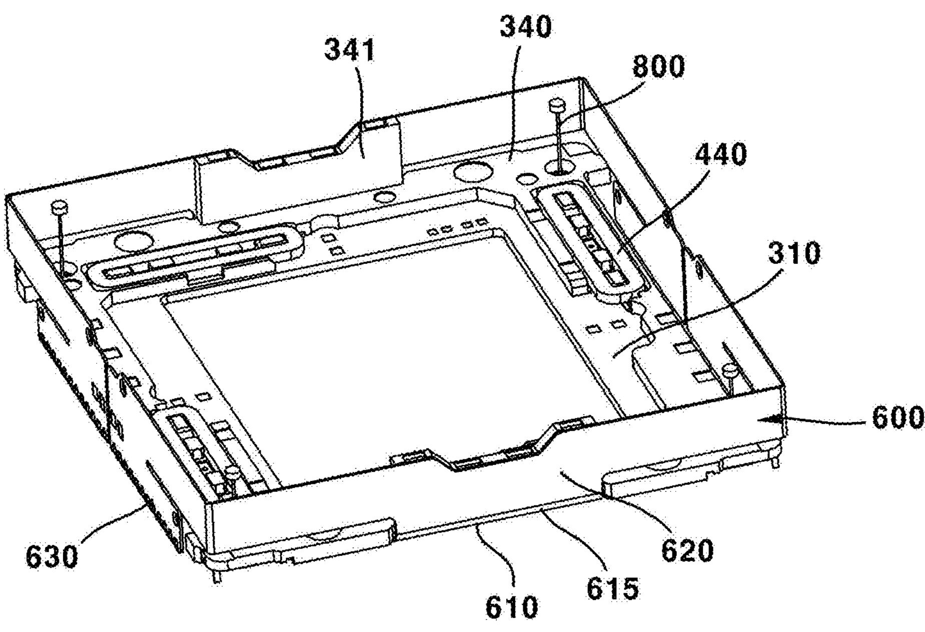
FIG. 11 is a perspective view of a partial configuration of a connecting substrate, a wire, and a second moving part of a camera device according to the present embodiment.
Figure 12:
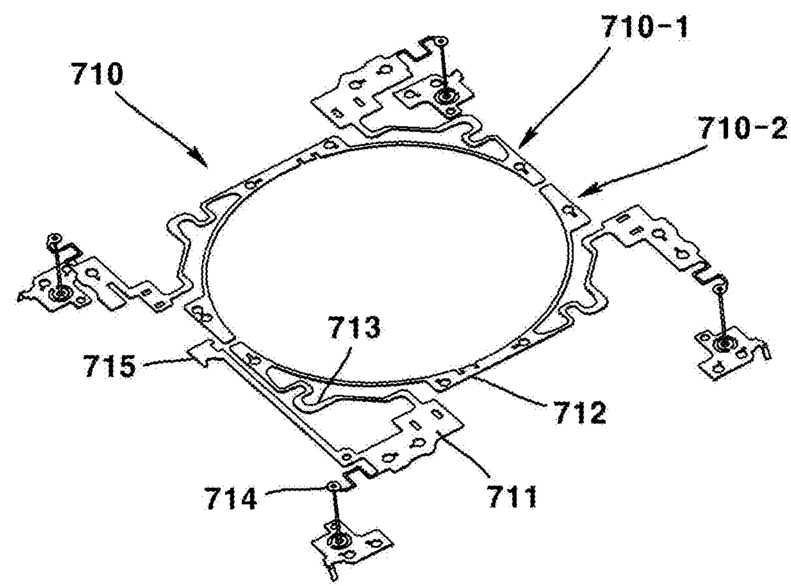
FIG. 12 is a perspective view illustrating a wire coupling structure of a camera device according to the present embodiment.
Figure 14:
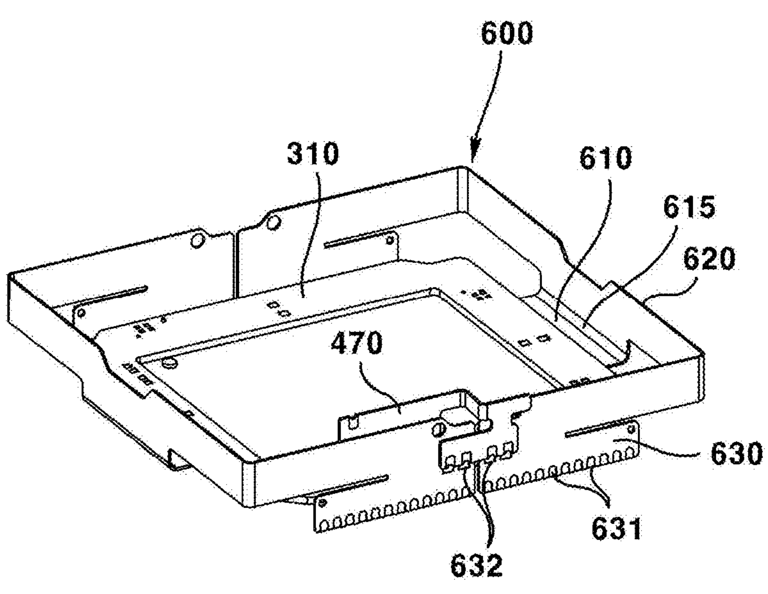
FIG. 14 is a perspective view illustrating a coupled structure of a connecting substrate and a third substrate of a camera device according to the present embodiment.
Figure 15:
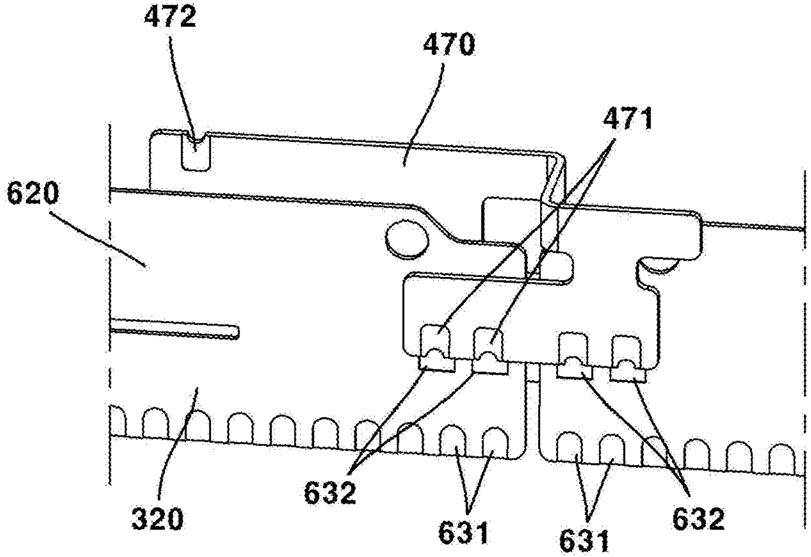
FIG. 15 is an enlarged view illustrating a portion of FIG. 14.
Figure 16:
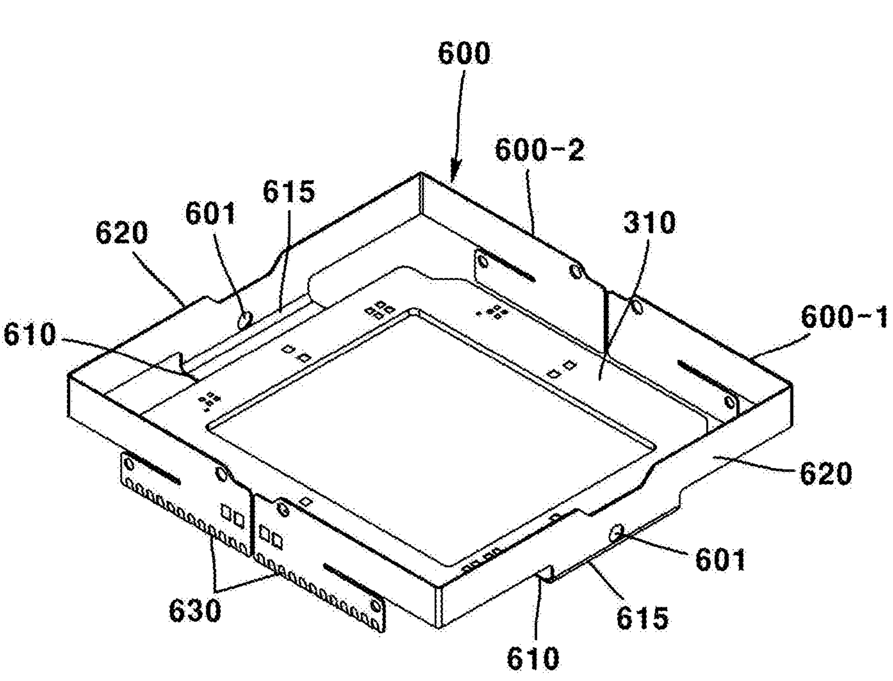
FIG. 16 is a perspective view of a second substrate and a connecting substrate of a camera device according to a modified embodiment.
Figure 17:
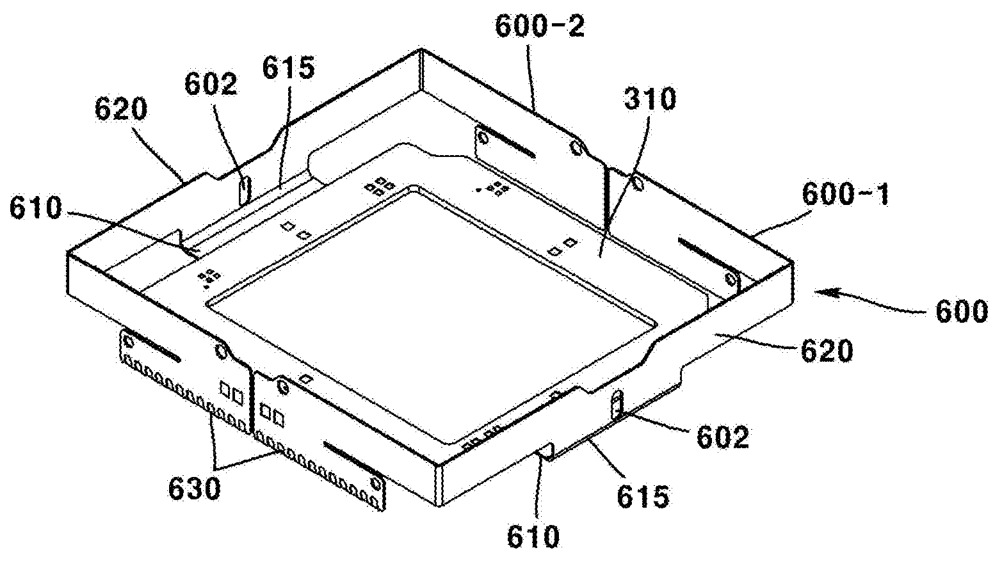
FIG. 17 is a perspective view of a second substrate and a connecting substrate of a camera device according to another modified embodiment.
Figure 18:
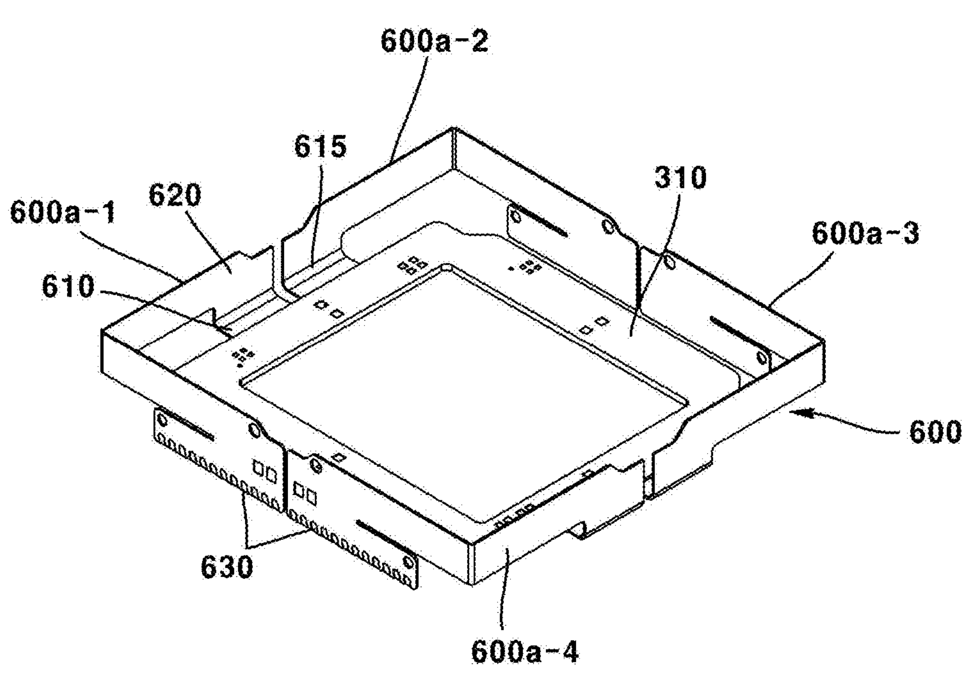
FIG. 18 is a perspective view of a second substrate and a connecting substrate of a camera device according to yet another modified embodiment.
Figure 19:
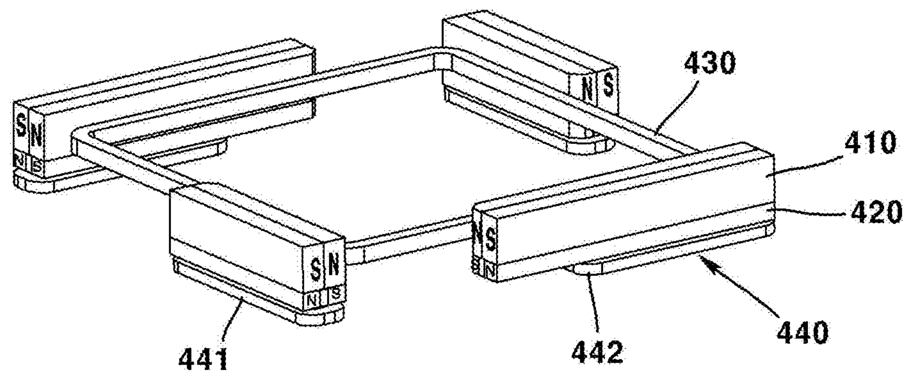
FIG. 19 is a perspective view illustrating a magnet and a coil of a camera device according to the present embodiment.
Figure 20:
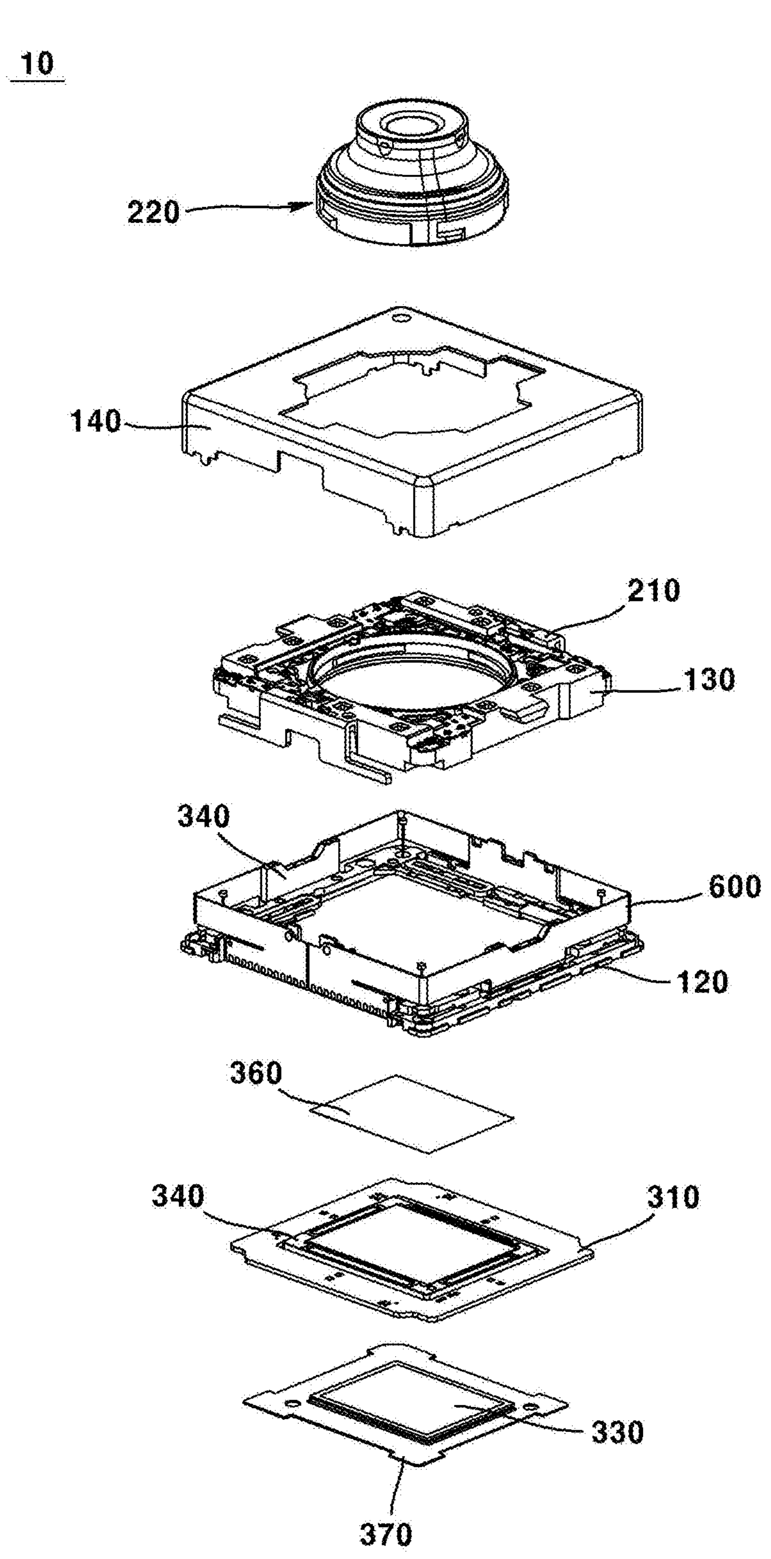
FIG. 20 is an exploded perspective view of a camera device according to the present embodiment.
Figure 21:
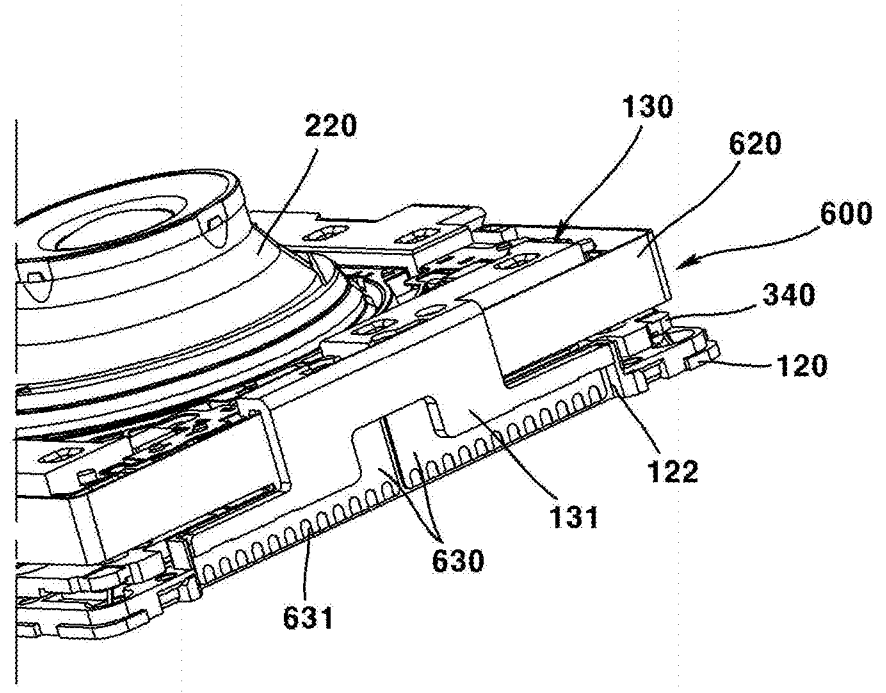
FIG. 21 is a perspective view illustrating a wing portion and related configuration of a housing according to the present embodiment.
Figure 22:
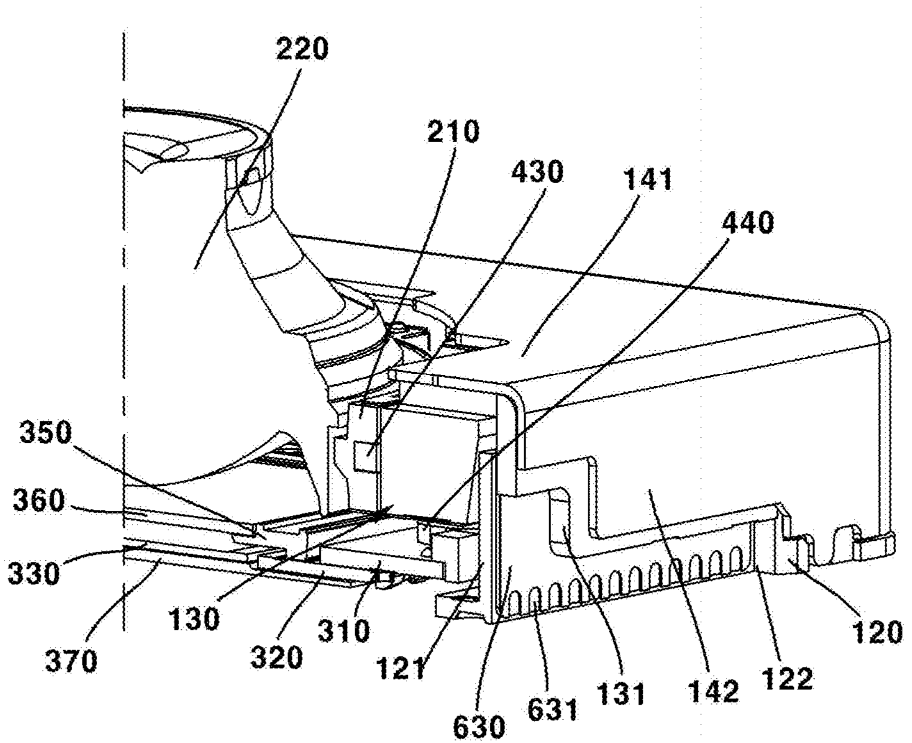
FIG. 22 is a cross-sectional perspective view illustrating a wing portion and related configuration of a housing according to the present embodiment.
Figure 23:
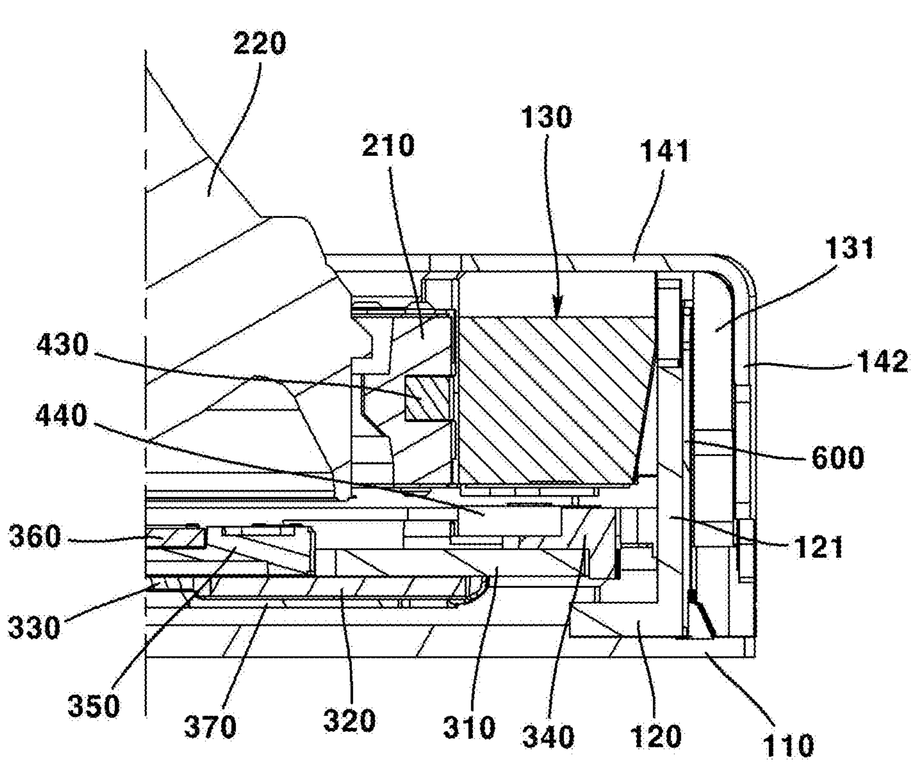
FIG. 23 is a cross-sectional view illustrating a portion of a camera device according to the present embodiment.
Figure 24:
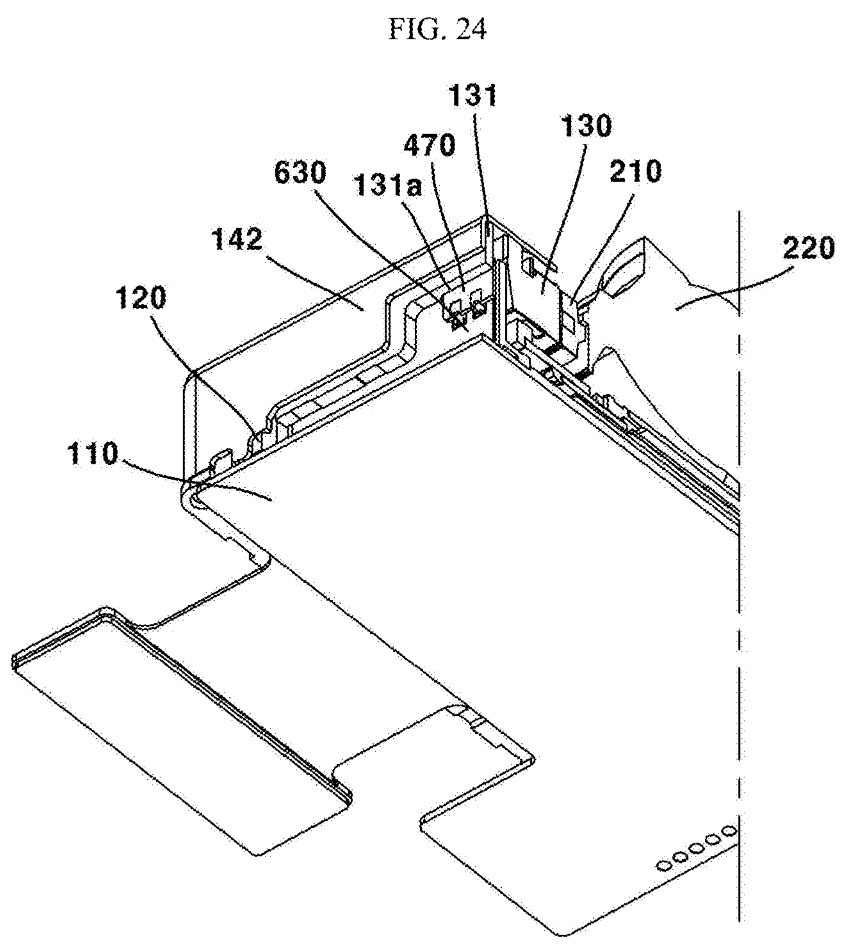
FIG. 24 is a cross-sectional perspective view illustrating a wing portion of a housing at an opposite side in FIG. 22 and related configuration.
Figure 25:
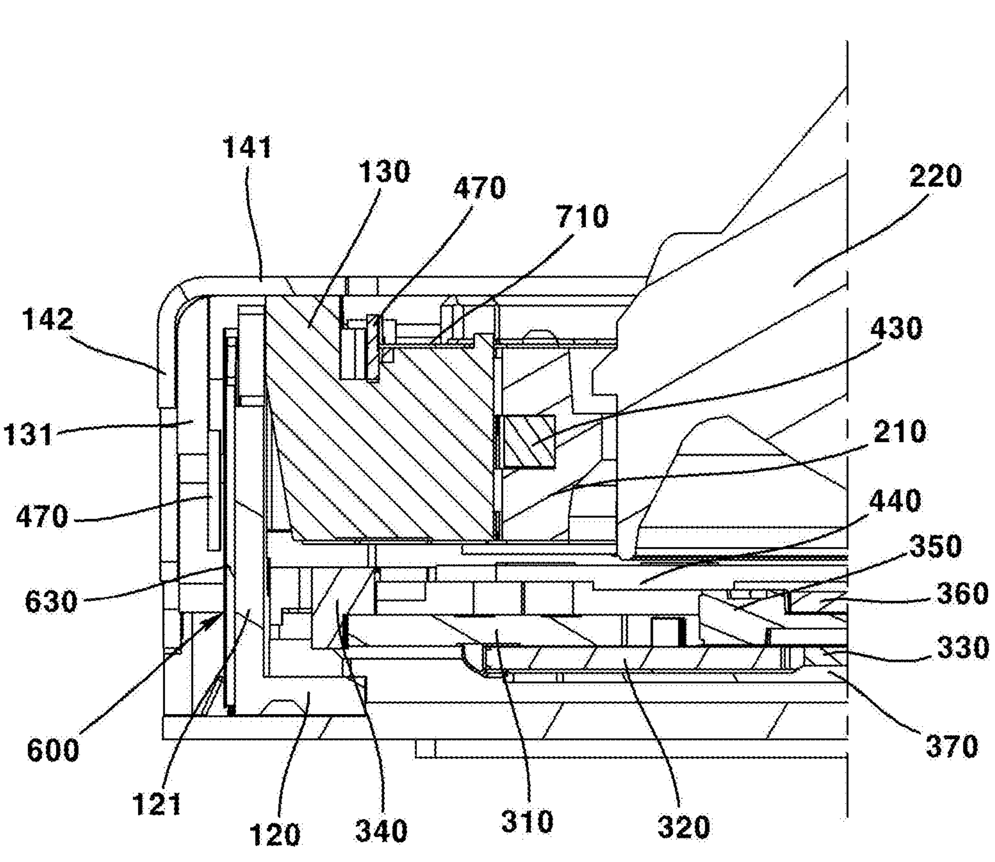
FIG. 25 is a cross-sectional view illustrating a portion of a camera device opposite to FIG. 23.
Figure 26:
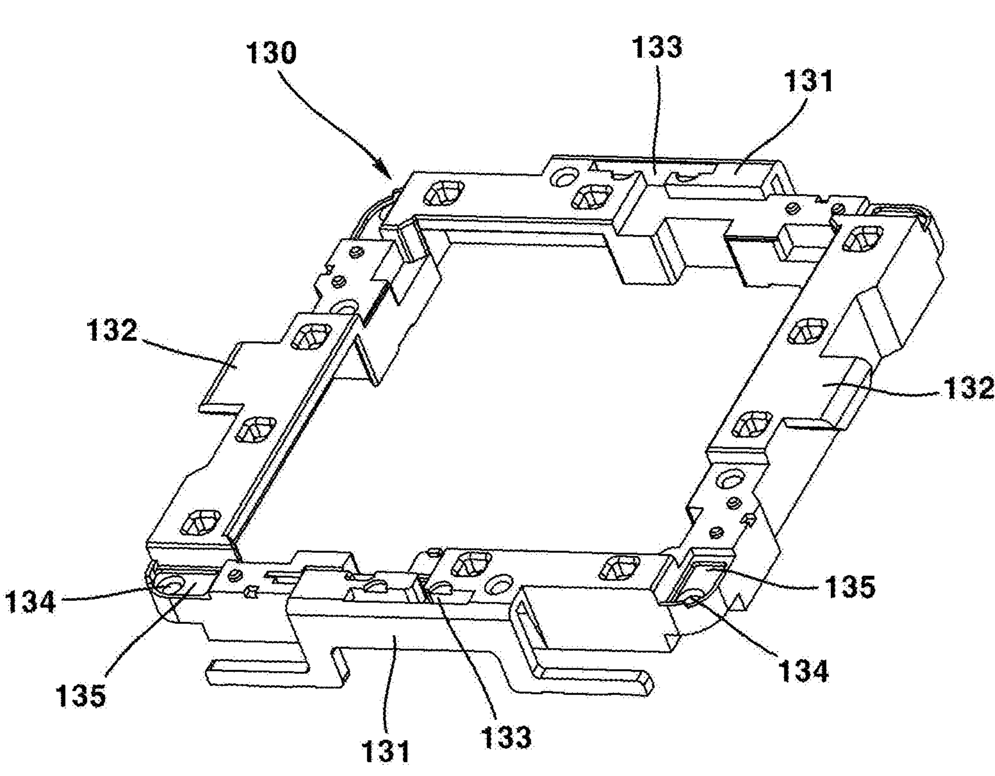
FIG. 26 is a perspective view of a housing of a camera device according to the present embodiment.
Figure 27:
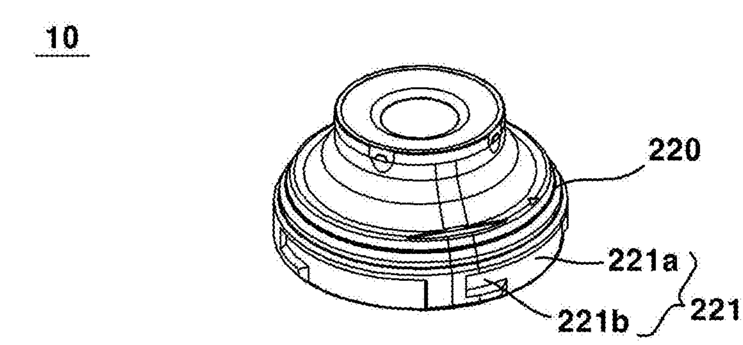
FIG. 27 is an exploded perspective view for explaining a coupling structure of a lens of a camera device according to the present embodiment.
Figure 27:
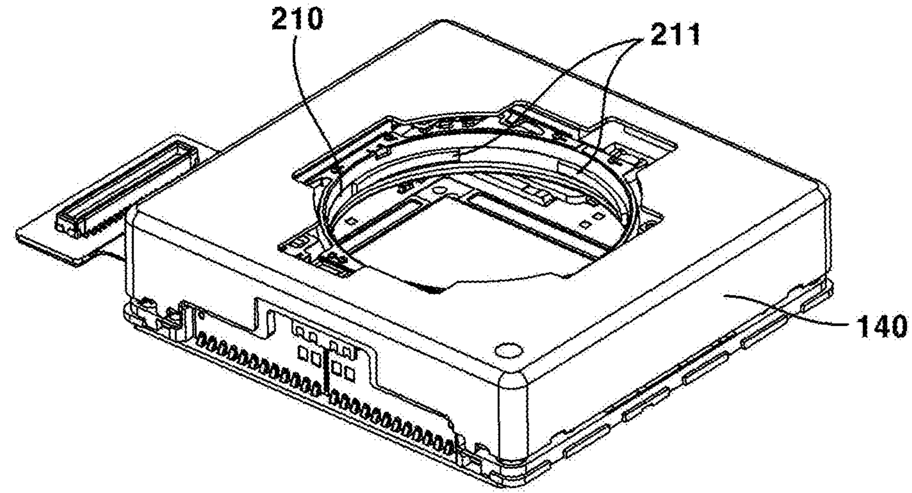
Figure 28:
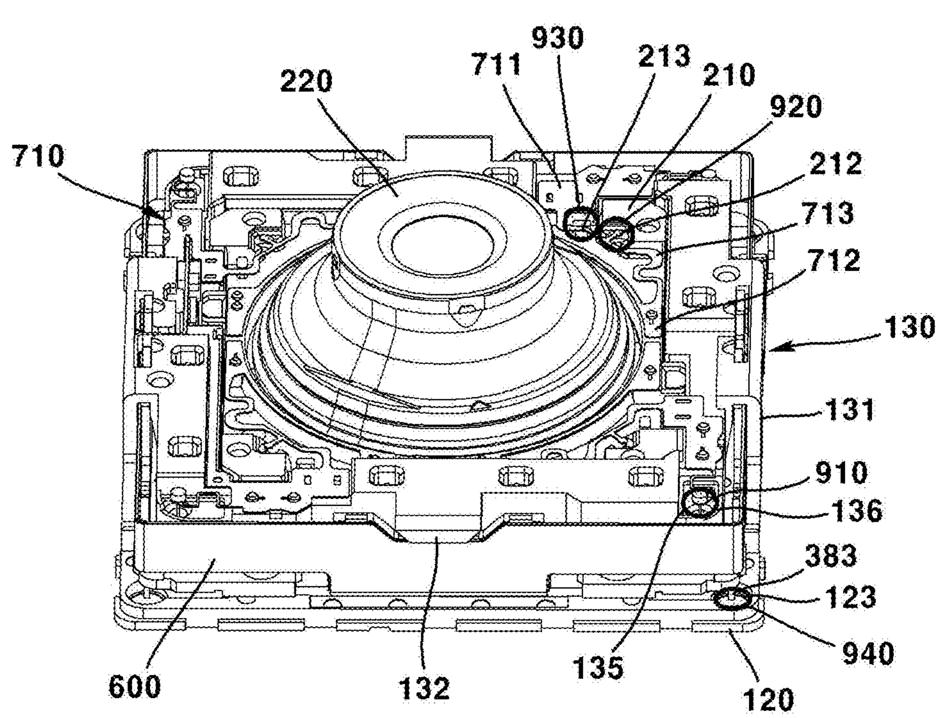
FIG. 28 is a perspective view of a camera device according to the present embodiment with a cover member and a first substrate removed.
Figure 29:
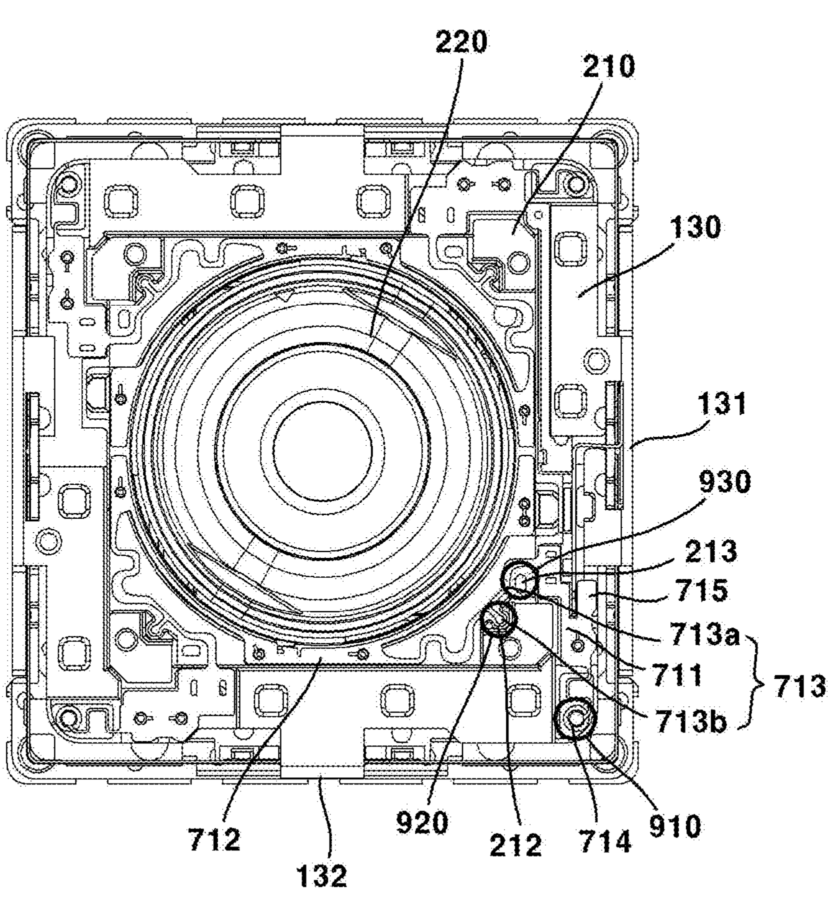
FIG. 29 is a plan view of a camera device according to the present embodiment with a cover member and a first substrate removed.
Figure 31:
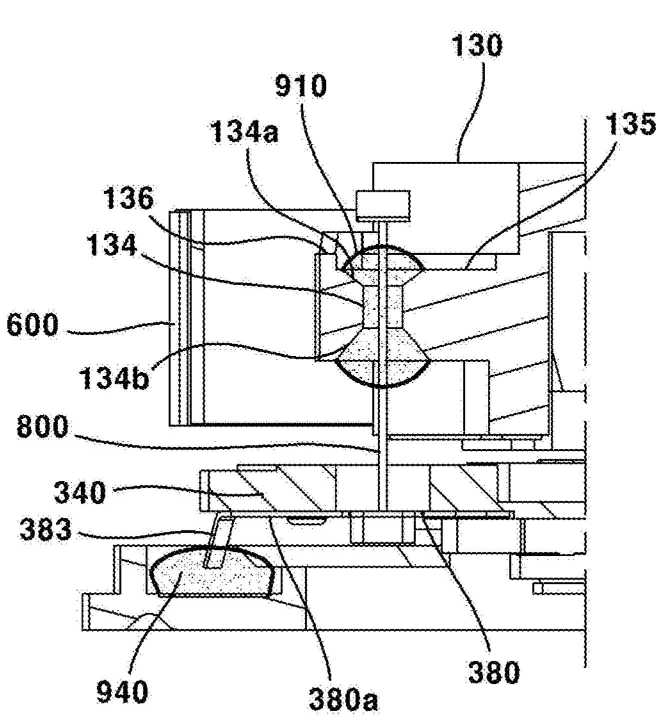
FIG. 31 is a cross-sectional view illustrating an application structure of a first damper and a fourth damper of a camera device according to the present embodiment.
Figures 32A, 32B, 32C:
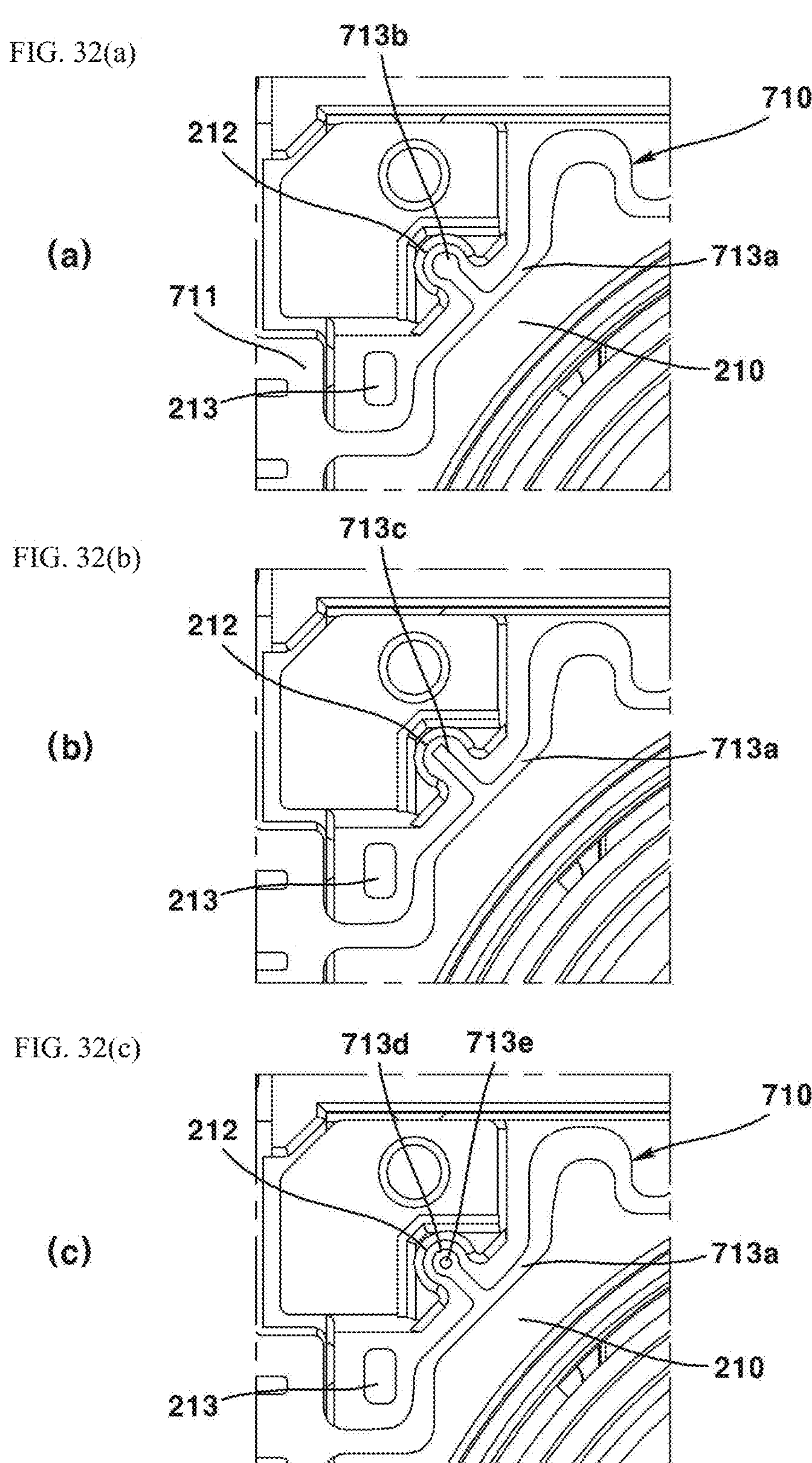
FIG. 32(*a*) is a plan view illustrating a structure for applying a damper to a bobbin and an upper elastic member according to the present embodiment, FIG. 32(*b*) is a plan view illustrating a structure for applying a damper to a bobbin and an upper elastic member according to a modified embodiment, and FIG. 32(*c*) is a plan view illustrating a structure for applying a damper to a bobbin and an upper elastic member according to another modified embodiment.
Figure 33:
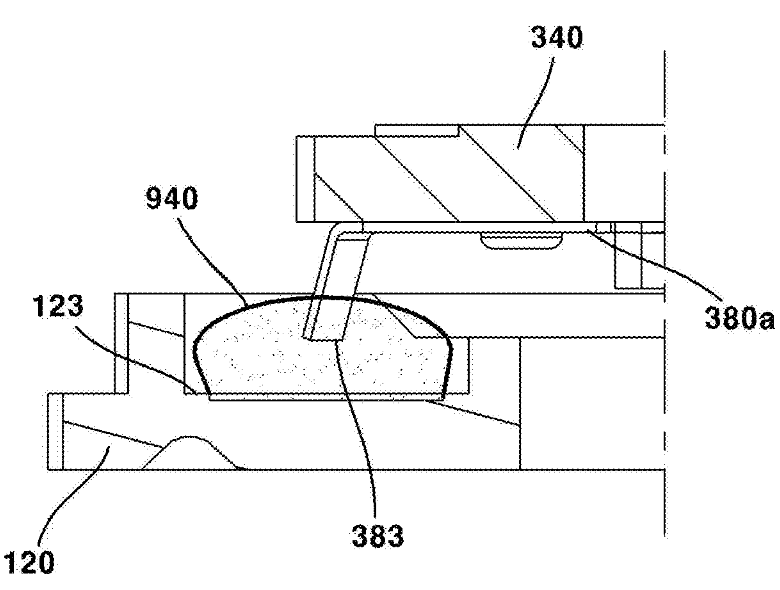
FIG. 33 is a cross-sectional view illustrating an application structure of a fourth damper of a camera device according to the present embodiment.
Figure 34:
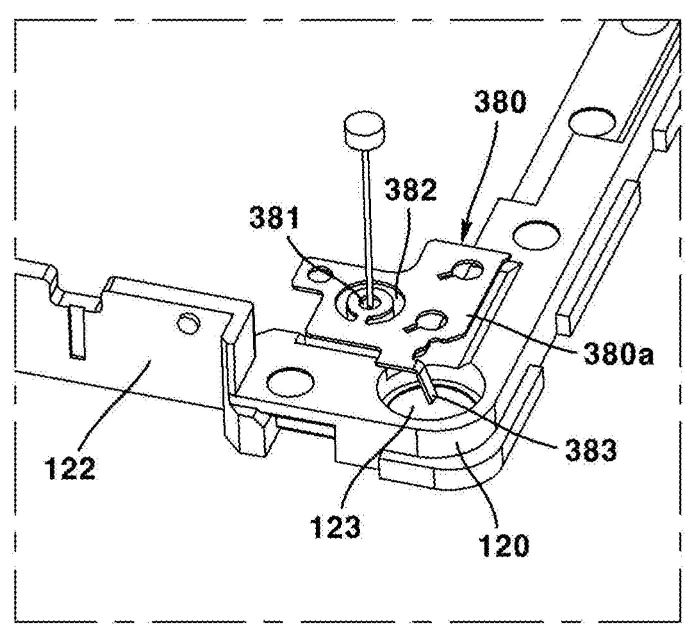
FIG. 34 is a perspective view illustrating a structure for applying a fourth damper to a coupling member and a base of a camera device according to the present embodiment.
Figure 35:
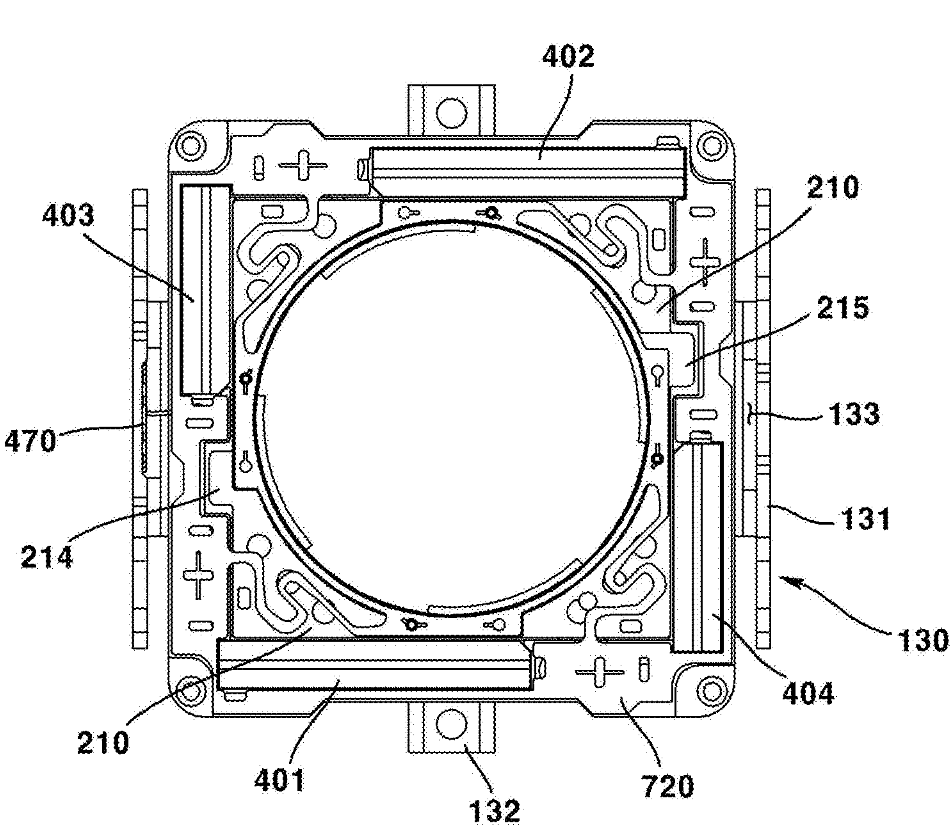
FIG. 35 is a bottom view of a partial configuration of a camera device according to the present embodiment.
Figure 36:
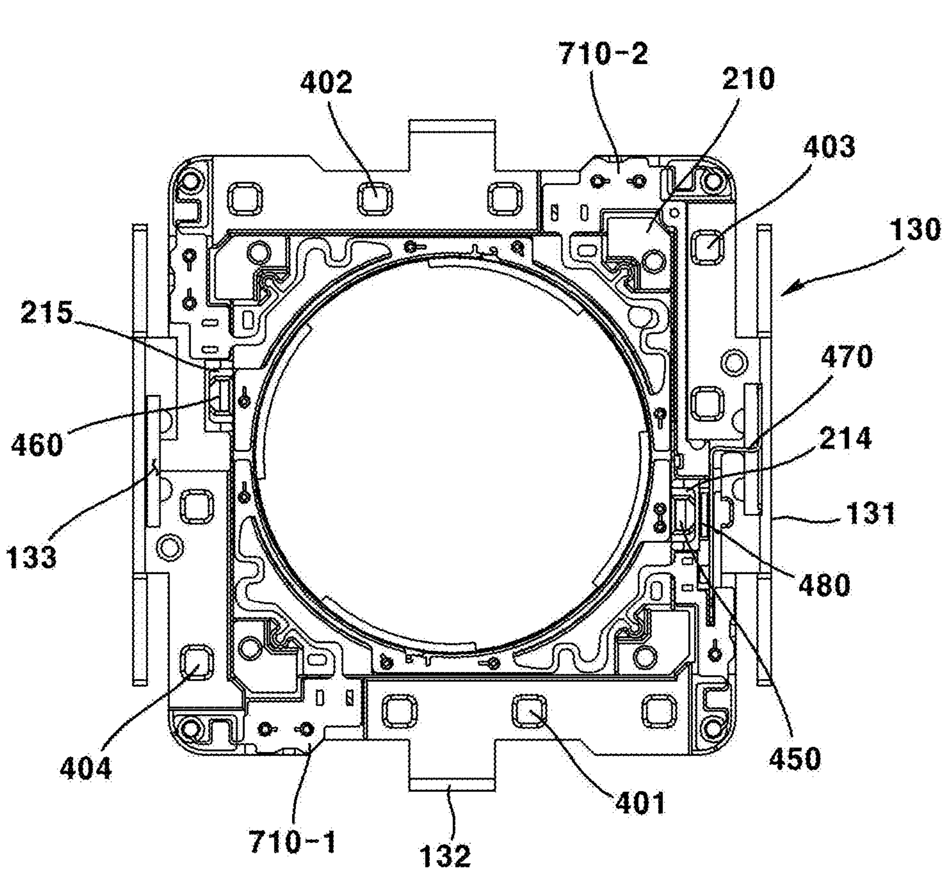
FIG. 36 is a plan view of a partial configuration of a camera device in the state of FIG. 35.
Figure 37:
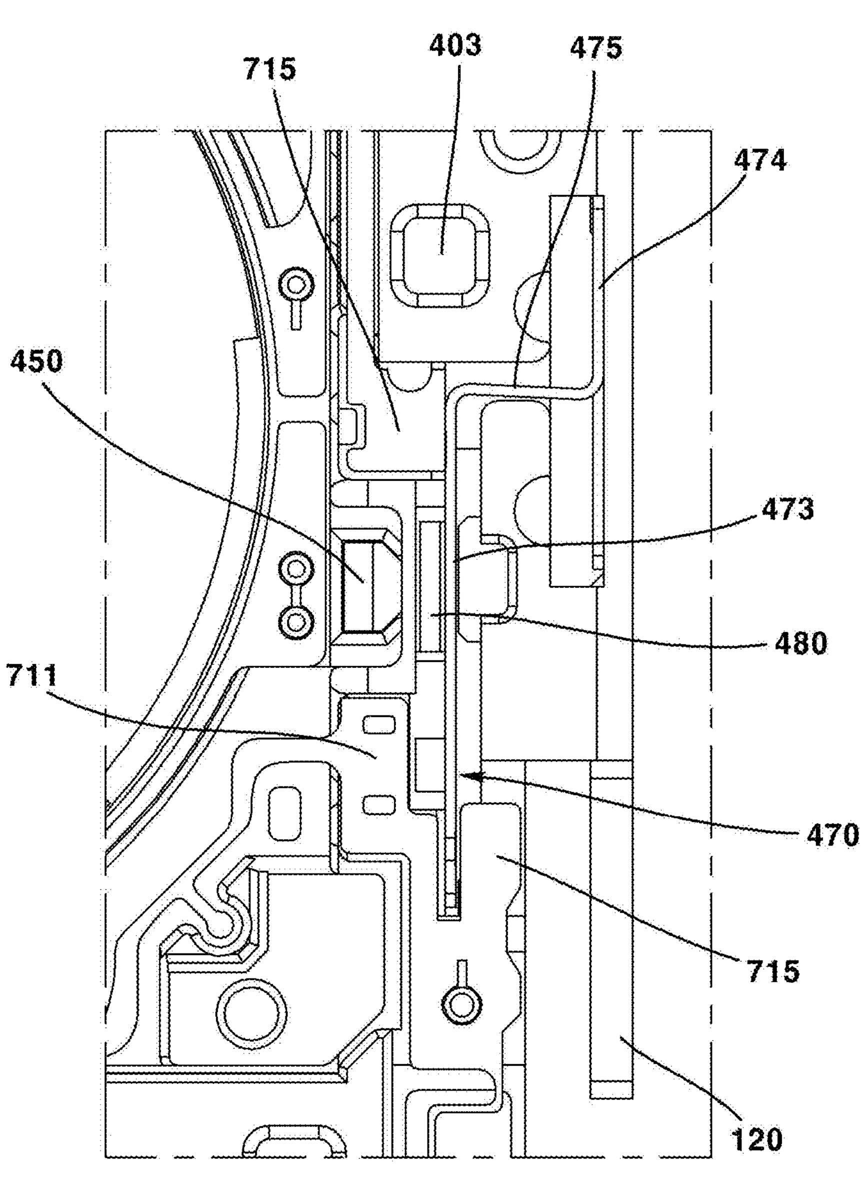
FIG. 37 is an enlarged view of a portion of FIG. 36.
Figure 38:
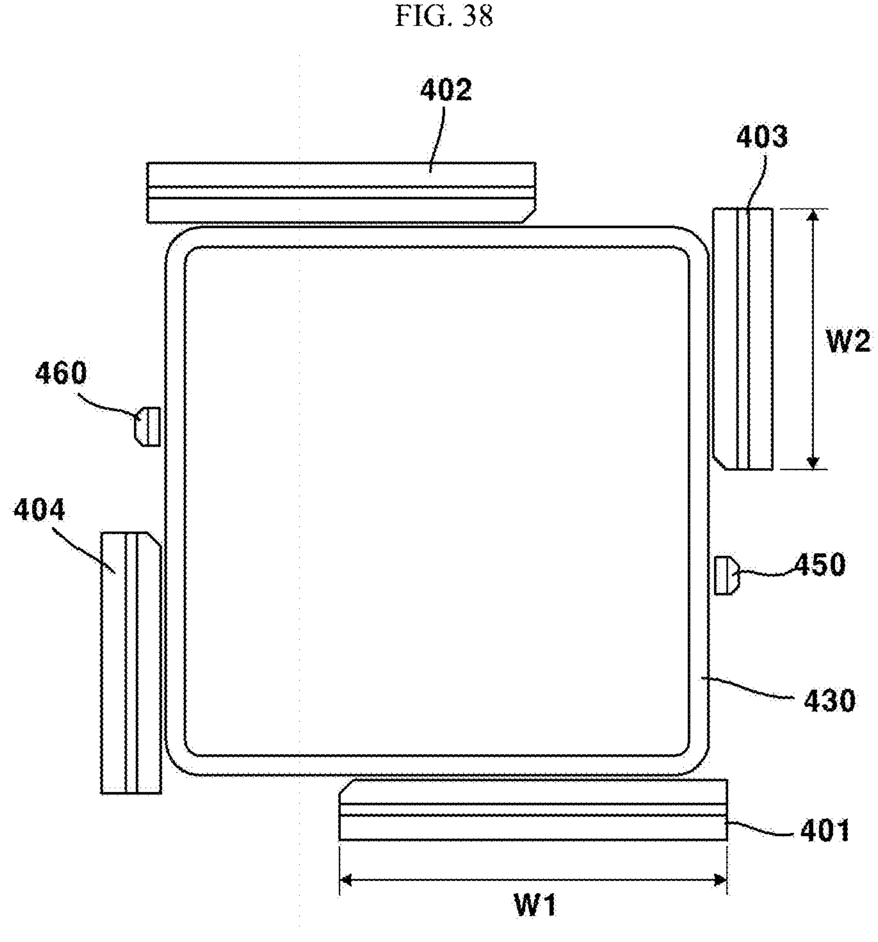
FIG. 38 is a plan view illustrating a coil and a magnet of a camera device according to the present embodiment.
Figure 39:
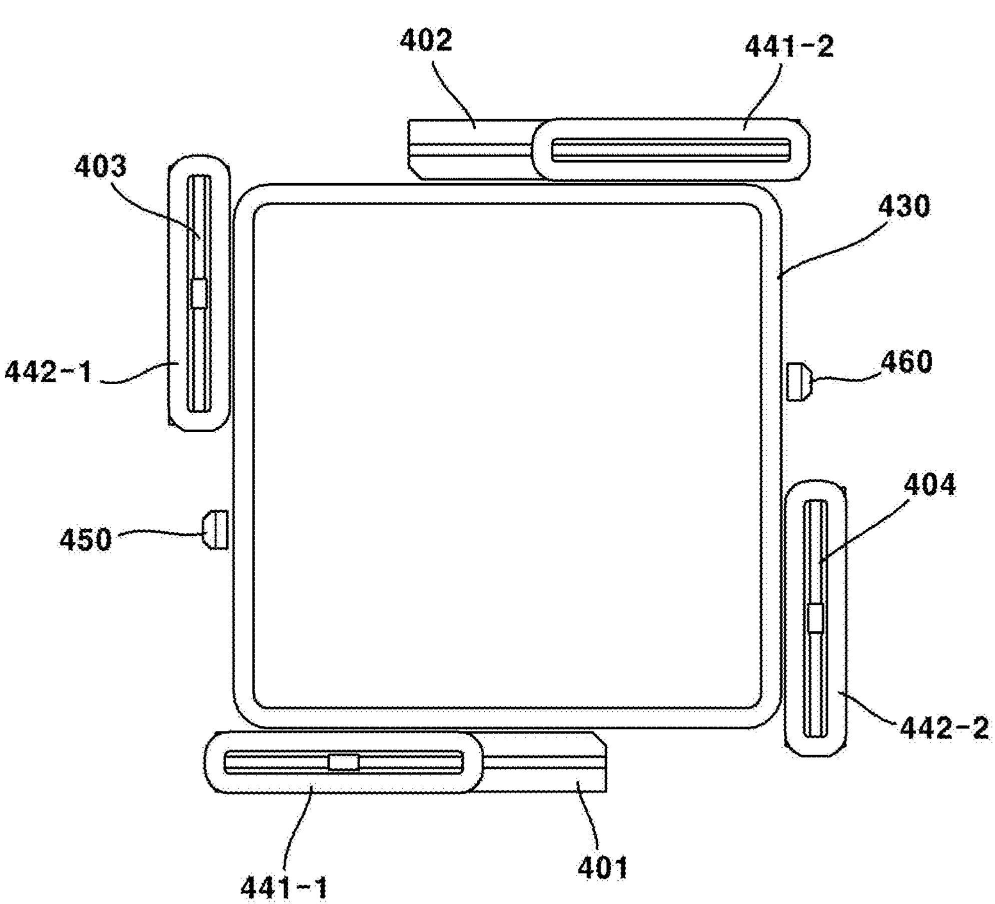
FIG. 39 is a bottom view illustrating a coil and a magnet of a camera device according to the present embodiment.
Figure 40:
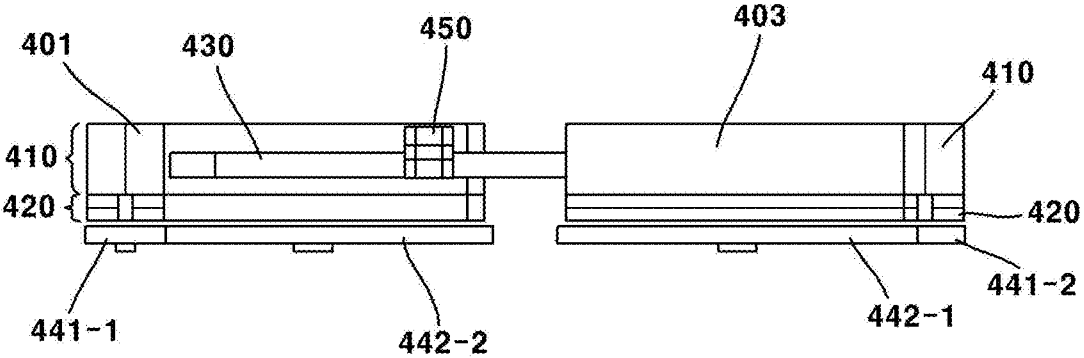
FIG. 40 is a side view illustrating a coil and a magnet of a camera device according to the present embodiment.
Figure 41:
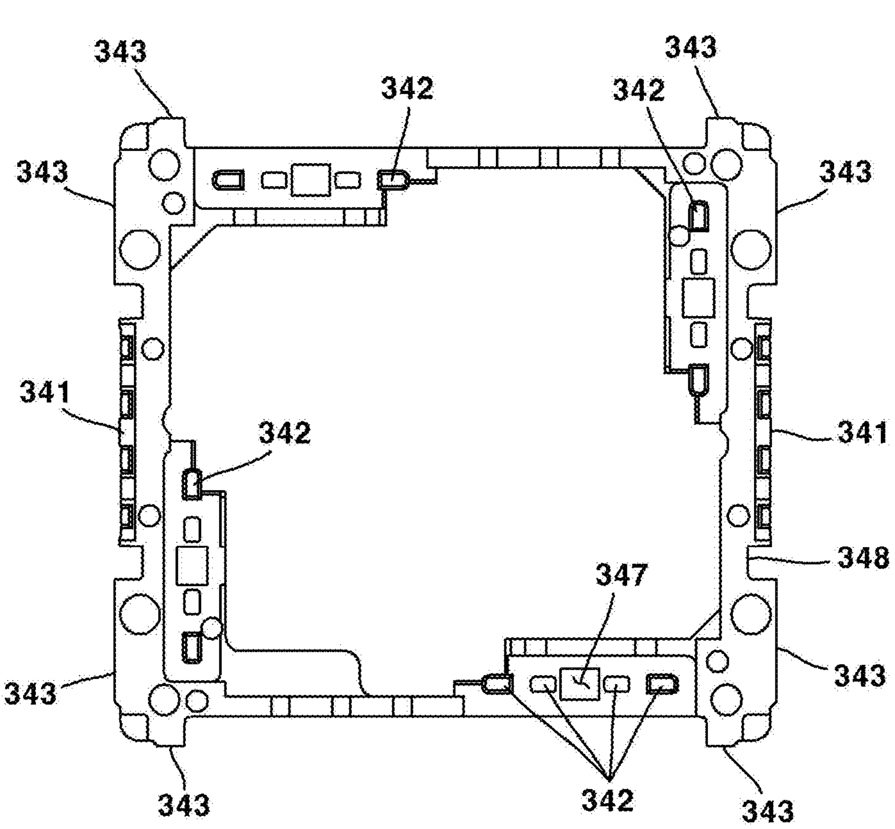
FIG. 41 is a plan view of a holder of a camera device according to the present embodiment.
Figure 42:
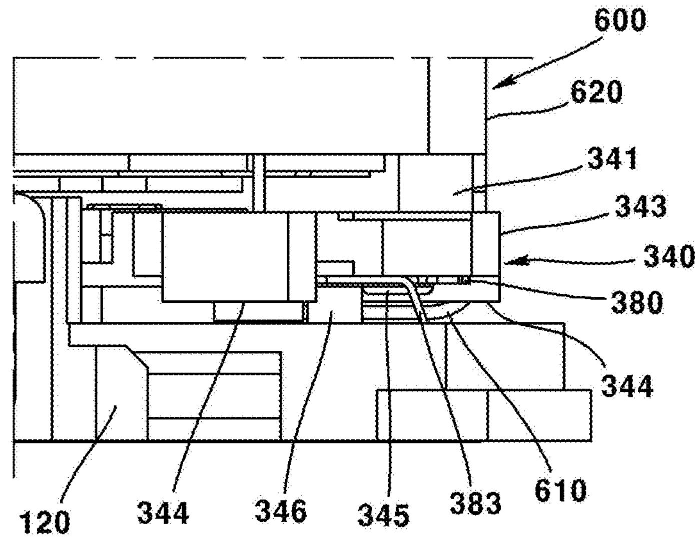
FIG. 42 is an enlarged side view illustrating a holder and related configuration of a camera device according to the present embodiment.
Figure 43:
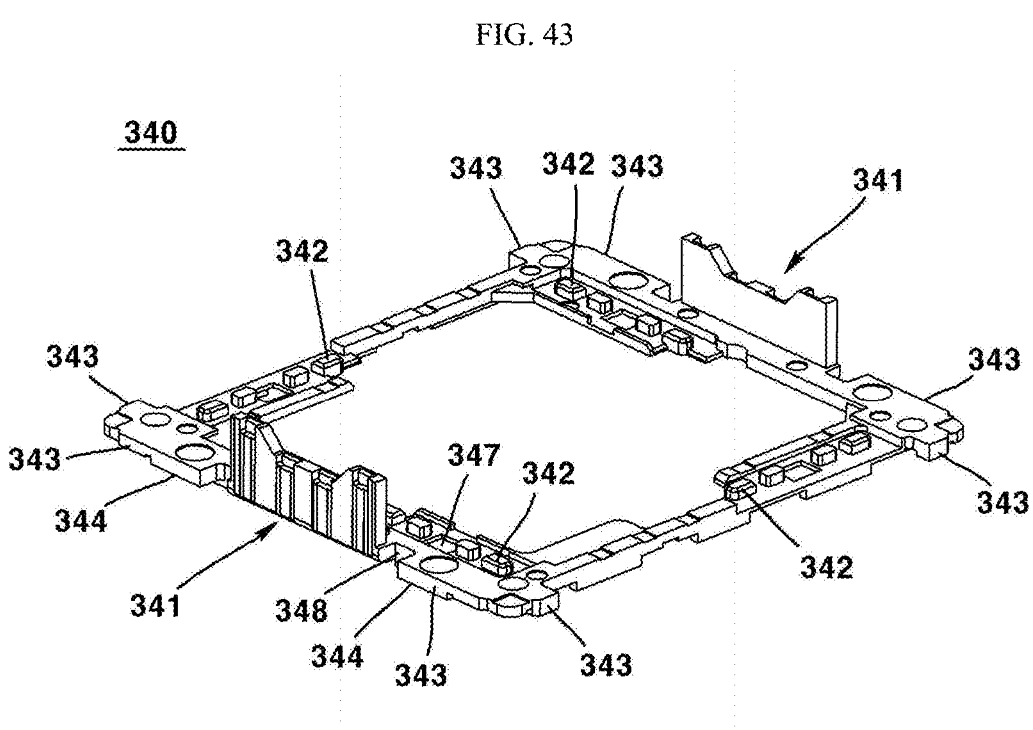
FIG. 43 is a perspective view of a holder of a camera device according to the present embodiment.
Figure 44:
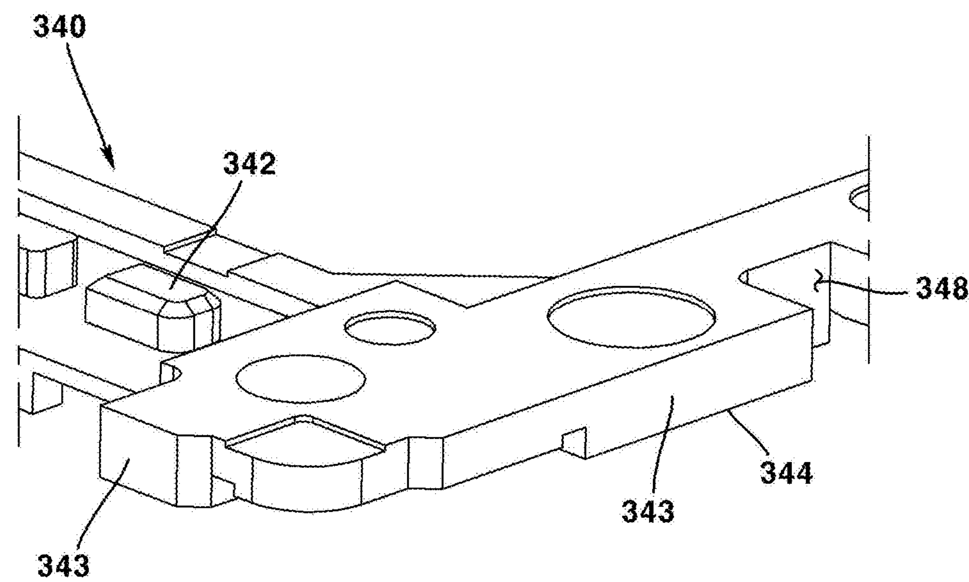
FIGS. 44 and 45 are enlarged perspective views of a portion of a holder of a camera device according to the present embodiment.
Figures 45, 46:
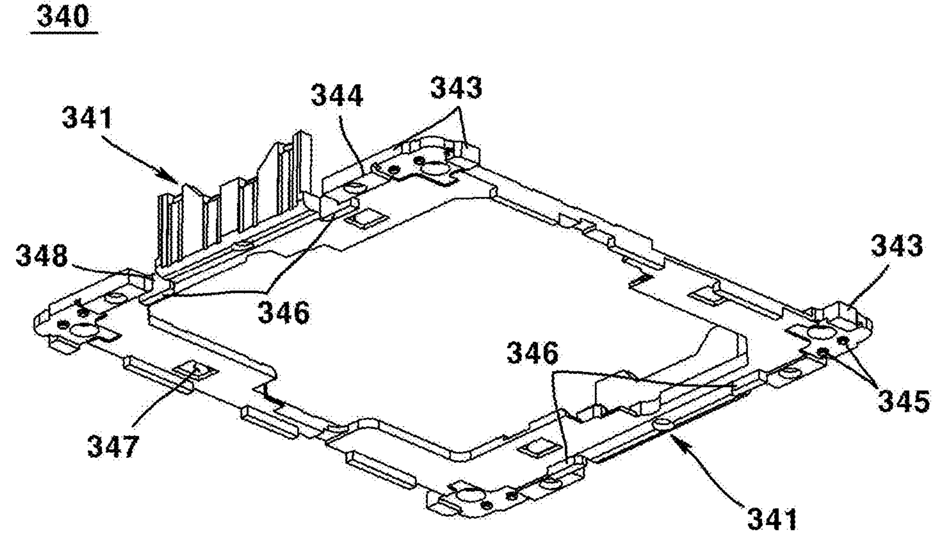
FIG. 46 is a bottom perspective view of a holder of a camera device according to the present embodiment.
Figure 47:
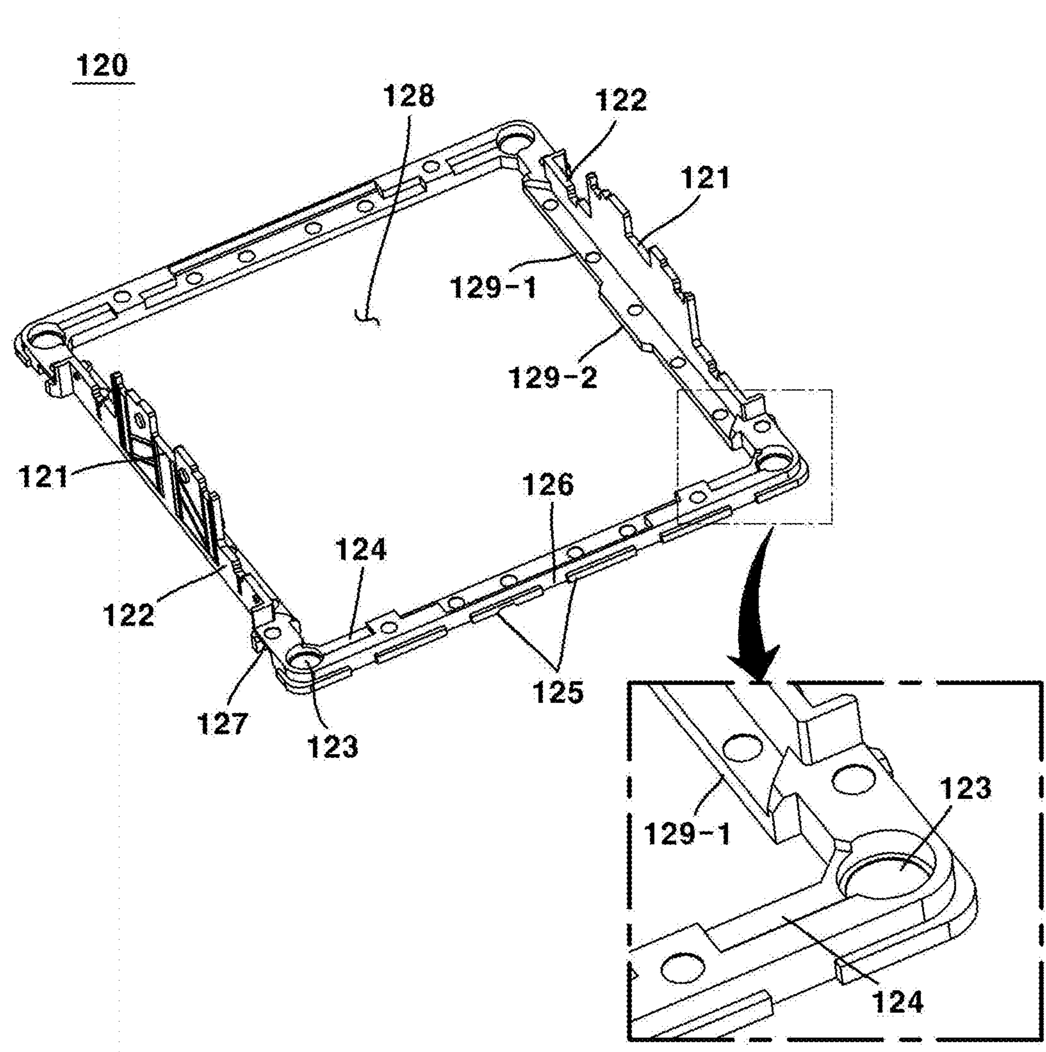
FIG. 47 is a perspective view of a base of a camera device according to the present embodiment.
Figures 50, 51:
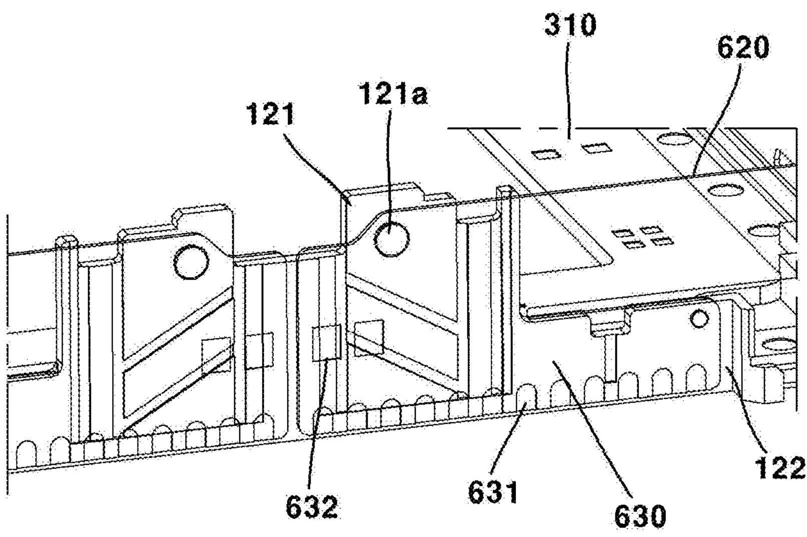
FIG. 50 is a perspective view illustrating a state in which a connecting substrate has been removed from a base according to the present embodiment.
FIG. 51 is a perspective view illustrating a connecting substrate coupled to a base according to the present embodiment.
Figure 52:
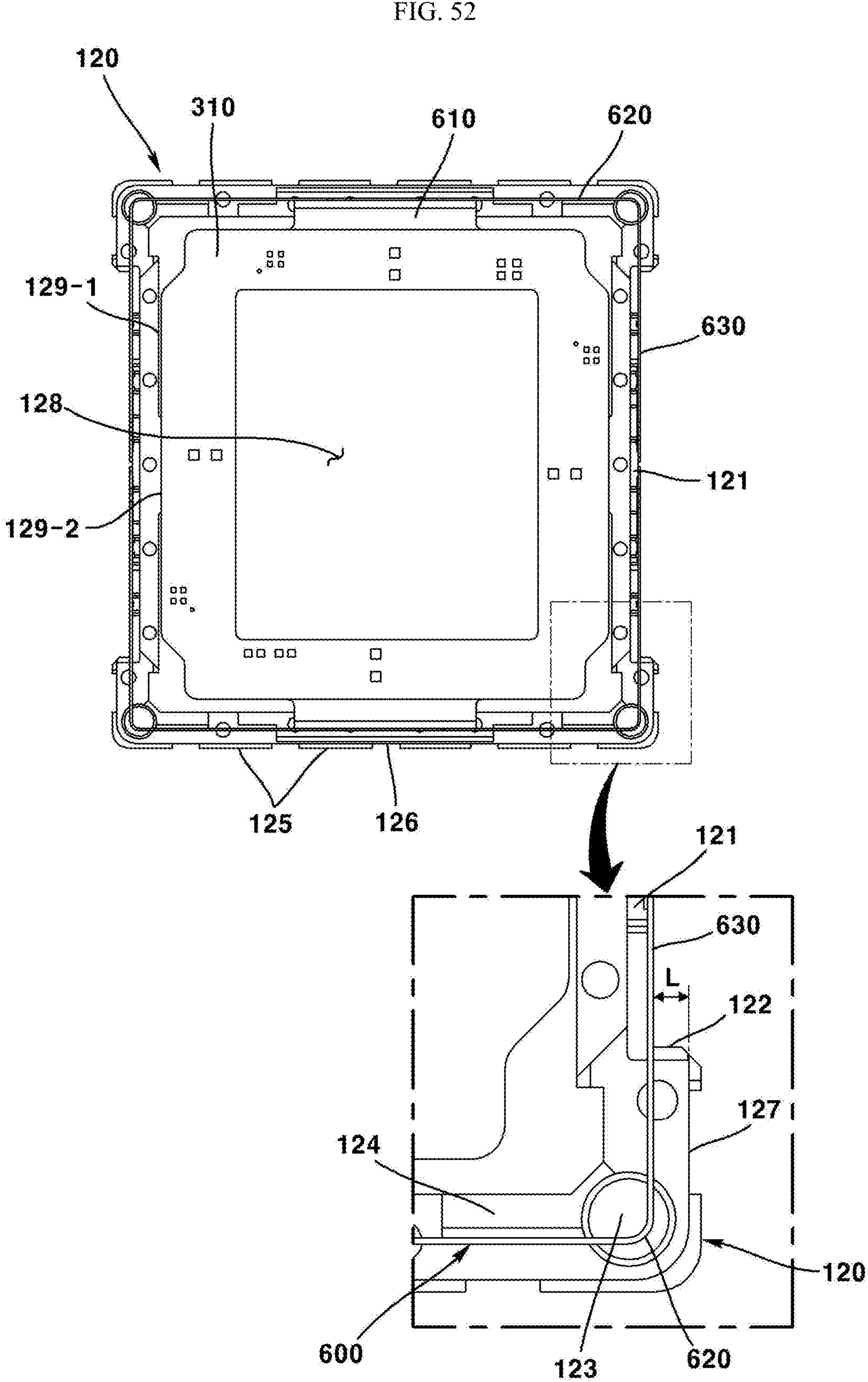
FIG. 52 is a plan view and partially enlarged view illustrating a partial configuration of a camera device in the state of FIG. 49 as seen from above.
Figures 53, 54A, 54B:
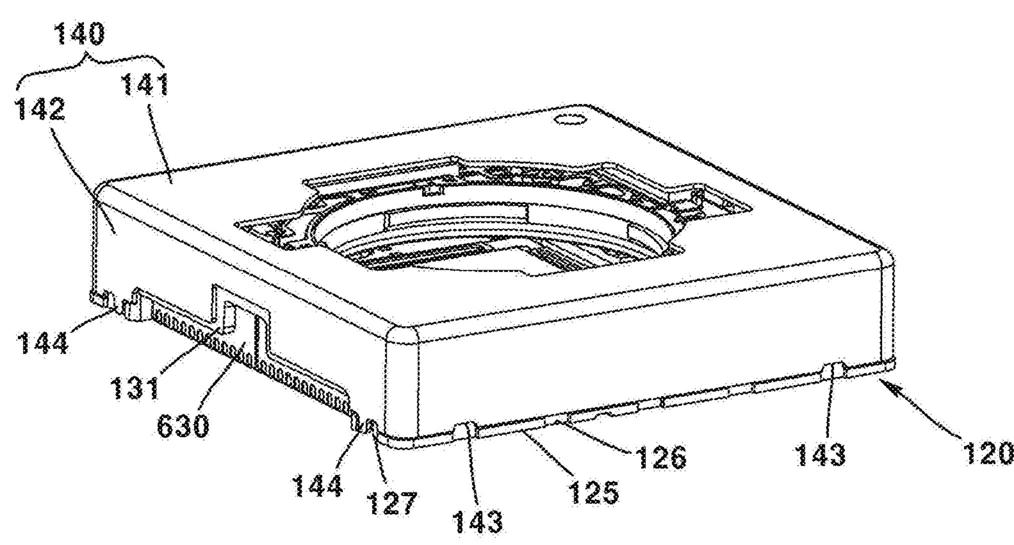
FIG. 53 is a perspective view of a camera device according to the present embodiment.

FIG. 1 is a perspective view of a camera device according to the present embodiment; FIG. 2 is a perspective view of the camera device according to the present embodiment with the cover member omitted; FIG. 3 is a plan view of a camera device according to the present embodiment; FIG. 4 is a cross-sectional view taken along line A-A of FIG. 3; FIG. 5 is a cross-sectional view taken along line B-B of FIG. 3; FIG. 6 is a cross-sectional view taken along line C-C of FIG. 3; FIG. 7 is an exploded perspective view of a camera device according to the present embodiment; FIG. 8 is an exploded perspective view of a camera device according to the present embodiment viewed from a direction different from that of FIG. 7; FIG. 9 is an exploded perspective view of a first moving part and related components of a camera device according to the present embodiment; FIG. 10 is an exploded perspective view of the second moving part and related components of a camera device according to the present embodiment; FIG. 11 is a perspective view of a partial configuration of a connecting substrate, a wire, and a second moving part of a camera device according to the present embodiment; FIG. 12 is a perspective view illustrating a wire coupling structure of a camera device according to the present embodiment;

FIG. 13 is an enlarged view of a portion of FIG. 12; FIG. 14 is a perspective view illustrating a coupled structure of a connecting substrate and a third substrate of a camera device according to the present embodiment; FIG. 15 is an enlarged view illustrating a portion of FIG. 14; FIG. 16 is a perspective view of a second substrate and a connecting substrate of a camera device according to a modified embodiment; FIG. 17 is a perspective view of a second substrate and a connecting substrate of a camera device according to another modified embodiment; FIG. 18 is a perspective view of a second substrate and a connecting substrate of a camera device according to yet another modified embodiment; FIG. 19 is a perspective view illustrating a magnet and a coil of a camera device according to the present embodiment; FIG. 20 is an exploded perspective view of a camera device according to the present embodiment; FIG. 21 is a perspective view illustrating a wing portion and related configuration of a housing according to the present embodiment; FIG. 22 is a cross-sectional perspective view illustrating a wing portion and related configuration of a housing according to the present embodiment; FIG. 23 is a cross-sectional view illustrating a portion of a camera device according to the present embodiment; FIG. 24 is a cross-sectional perspective view illustrating a wing portion of a housing at an opposite side in FIG. 22 and related configuration; FIG. 25 is a cross-sectional view illustrating a portion of a camera device opposite to FIG. 23; FIG. 26 is a perspective view of a housing of a camera device according to the present embodiment; FIG. 27 is an exploded perspective view for explaining a coupling structure of a lens of a camera device according to the present embodiment; FIG. 28 is a perspective view of a camera device according to the present embodiment with a cover member and a first substrate removed; FIG. 29 is a plan view of a camera device according to the present embodiment with a cover member and a first substrate removed; FIG. 30 is an enlarged view illustrating an application structure of the first to fourth dampers of a camera device according to the present embodiment; FIG. 31 is a cross-sectional view illustrating an application structure of a first damper and a fourth damper of a camera device according to the present embodiment; FIG. 32(*a*) is a plan view illustrating a structure for applying a damper to a bobbin and an upper elastic member according to the present embodiment, FIG. 32(*b*) is a plan view illustrating a structure for applying a damper to a bobbin and an upper elastic member according to a modified embodiment, and FIG. 32(*c*) is a plan view illustrating a structure for applying a damper to a bobbin and an upper elastic member according to another modified embodiment; FIG. 33 is a cross-sectional view illustrating an application structure of a fourth damper of a camera device according to the present embodiment; FIG. 34 is a perspective view illustrating a structure for applying a fourth damper to a coupling member and a base of a camera device according to the present embodiment; FIG. 35 is a bottom view of a partial configuration of a camera device according to the present embodiment; FIG. 36 is a plan view of a partial configuration of a camera device in the state of FIG. 35; FIG. 37 is an enlarged view of a portion of FIG. 36; FIG. 38 is a plan view illustrating a coil and a magnet of a camera device according to the present embodiment; FIG. 39 is a bottom view illustrating a coil and a magnet of a camera device according to the present embodiment; FIG. 40 is a side view illustrating a coil and a magnet of a camera device according to the present embodiment; FIG. 41 is a plan view of a holder of a camera device according to the present embodiment; FIG. 42 is an enlarged side view illustrating a holder and related configuration of a camera device according to the present embodiment; FIG. 43 is a perspective view of a holder of a camera device according to the present embodiment; FIGS. 44 and 45 are enlarged perspective views of a portion of a holder of a camera device according to the present embodiment; FIG. 46 is a bottom perspective view of a holder of a camera device according to the present embodiment; FIG. 47 is a perspective view of a base of a camera device according to the present embodiment; FIG. 48(*a*) is a perspective view illustrating an arrangement structure of a coupling member and a base of a camera device according to the present embodiment, and FIG. 48(*b*) is a bottom perspective view; FIG. 49 is a perspective view illustrating a coupled state of a base and a connecting substrate according to the present embodiment; FIG. 50 is a perspective view illustrating a state in which a connecting substrate has been removed from a base according to the present embodiment; FIG. 51 is a perspective view illustrating a connecting substrate coupled to a base according to the present embodiment; FIG. 52 is a plan view and partially enlarged view illustrating a partial configuration of a camera device in the state of FIG. 49 as seen from above; FIG. 53 is a perspective view of a camera device according to the present embodiment; and FIG. 54(*a*) is a bottom perspective view illustrating a ground terminal and a groove of a base of a camera device according to the present embodiment, and FIG. 54(*b*) is a bottom perspective view of a modified embodiment in which the ground terminal is bent.

The camera device 10 can photograph one or more of images and videos. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an autofocus assembly. The camera device 10 may comprise an image stabilization assembly. The camera device 10 may comprise an autofocus device. The camera device 10 may comprise an image stabilization device. The camera device 10 may comprise an actuator. The camera device 10 may comprise a lens driving actuator. The camera device 10 may comprise a sensor driving actuator. The camera device 10 may comprise an autofocus actuator. The camera device 10 may comprise an image stabilization actuator.

The camera device 10 may comprise a fixed part 100. The fixed part 100 may be a relatively fixed portion when the moving parts 200 and 300 move. The fixed part 100 may be a relatively fixed portion when at least one of the first moving part 200 and the second moving part 300 moves. The fixed part 100 can accommodate the first moving part 200 and the second moving part 300. The fixed part 100 may be disposed outside the first moving part 200 and the second moving part 300.

Throughout the specification, the first substrate 110 is described as a component of the fixed part 100, but the first substrate 110 may be understood as a separate component from the fixed part 100. The fixed part 100 may be disposed in the first substrate 110. The fixed part 100 may be disposed on the first substrate 110. The fixed part 100 may be disposed above the first substrate 110.

The camera device 10 may comprise a first substrate 110. The fixed part 100 may comprise a first substrate 110. The first substrate 110 may be a main substrate. The first substrate 110 may be a substrate. The first substrate 110 may be a printed circuit board PCB. The first substrate 110 may be connected to a power source of the optical apparatus 1. The first substrate 110 may comprise a connector being connected to a power source of the optical apparatus 1. The first substrate 110 may be spaced apart from the second substrate 310.

The camera device 10 may comprise a base 120. The fixed part 100 may comprise a base 120. The base 120 may be disposed in the first substrate 110. The base 120 may be disposed on the first substrate 110. The base 120 may be disposed above the first substrate 110. The base 120 may be fixed to the first substrate 110. The base 120 may be coupled to the first substrate 110. The base 120 may be attached to the first substrate 110 with an adhesive. The base 120 may be disposed between the first substrate 110 and the housing 130. The base 120 may be disposed in contact with an upper surface of the first substrate 110. The base 120 may be disposed to be spaced apart above the first substrate 110.

The connecting substrate 600 may be disposed in the base 120. The connecting substrate 600 may be connected to the base 120. The connecting substrate 600 may be fixed to the base 120. The connecting substrate 600 may be coupled to the base 120. The connecting substrate 600 may be attached to the base 120. The connecting substrate 600 may be fixed to the base 120 with an adhesive. The connecting substrate 600 may be in contact with the base 120.

The base 120 may comprise a protruded portion 121. The base 120 may comprise a protruded portion 121 being protruded upward. The protruded portion 121 may be protruded from an upper surface of the base 120. The protruded portion 121 may be protruded upward from an outer side surface of the base 120. The connecting substrate 600 may be disposed in the protruded portion 121 of the base 120. The connecting substrate 600 may be connected to the protruded portion 121 of the base 120. The connecting substrate 600 may be fixed to the protruded portion 121 of the base 120. The connecting substrate 600 may be coupled to the protruded portion 121 of the base 120. The connecting substrate 600 may be attached to the protruded portion 121 of the base 120. The connecting substrate 600 may be fixed to the protruded portion 121 of the base 120 with an adhesive. The connecting substrate 600 may be in contact with the protruded portion 121 of the base 120. A protruding structure of the base 120 may be formed in the base 120 for assembly of the connecting substrate 600.

The terminal portion 630 of the connecting substrate 600 may be disposed in the protruded portion 121 of the base 120. The terminal portion 630 of the connecting substrate 600 may be connected to the protruded portion 121 of the base 120. The terminal portion 630 of the connecting substrate 600 may be fixed to the protruded portion 121 of the base 120. The terminal portion 630 of the connecting substrate 600 may be coupled to the protruded portion 121 of the base 120. The terminal portion 630 of the connecting substrate 600 may be attached to the protruded portion 121 of the base 120. The terminal portion 630 of the connecting substrate 600 may be fixed to the protruded portion 121 of the base 120 with an adhesive. The terminal portion 630 of the connecting substrate 600 may be in contact with the protruded portion 121 of the base 120.

The base 120 may comprise a coupling protrusion 121*a*. The coupling protrusion 121*a* may be a boss. The coupling protrusion 121*a* may be coupled to the terminal portion 630 of the connecting substrate 600. The coupling protrusion 121*a* may be coupled to a hole in the terminal portion 630 of the connecting substrate 600. The coupling protrusion 121*a* may be inserted into the hole of the terminal portion 630 of the connecting substrate 600. The coupling protrusion 121*a* may be formed in the protruded portion 121 of the base 120. The coupling protrusion 121*a* may be formed in an upper region of an outer surface of the protruded portion 121 of the base 120. An assembly guide boss may be formed in the base 120 to increase assembly position accuracy of the connecting substrate 600. A hole being coupled to a boss may be formed in the connecting substrate 600.

The base 120 may comprise a groove 121*b*. The groove 121*b* may be an adhesive accommodating groove. The groove 121*b* may be a bond application groove. An adhesive may be disposed in the groove 121*b*. The adhesive disposed in the groove 121*b* may fix the terminal portion 630 of the connecting substrate 600 to the base 120. The groove 121*b* may be formed in the protruded portion 121 of the base 120. The groove 121*b* may be formed on an outer surface of the protruded portion 121 of the base 120. The groove 121*b* may comprise a plurality of grooves. A bond application groove may be formed in the base 120 to increase the adhesion of the connecting substrate 600.

At least a portion of the adhesive for attaching the connecting substrate 600 and the base 120 may be disposed in the groove 121*b*. The groove 121*b* may be formed on an outer side surface of the base 120. The groove 121*b* may be formed on an outer side surface of the protruded portion 121. The groove 121*b* may be formed on an outer surface of the protruded portion 121 by being recessed. The groove 121*b* may be open upward. Through this structure, adhesive can be injected into the groove 121*b* from above. The groove 121*b* may comprise: a first portion being extended in an optical axis direction; and a second portion inclinedly connected to the first portion.

The plurality of grooves 122, 123, 124, 126, and 127 of the base 120 may be referred to as 'first to seventh grooves' to distinguish them from one another.

The base 120 may comprise a groove 122. The groove 122 may be a terminal accommodating groove. The groove 122 may be formed on a side surface of the base 120. The terminal portion 630 of the connecting substrate 600 may be disposed in the groove 122. The stroke space of the extension portion 620 of the connecting substrate 600 may be determined by the recessed depth of the groove 122. The groove 122 may be formed on an outer side surface of the base 120 facing the side plate 142 of the cover member 140. The groove 122 may be formed by the protruded portion 121. In other words, the groove 122 may be formed by a step between the recessed outer side surface of the protruded portion 121 and the outer side surface of the base 120. In the present embodiment, to secure the stroke space of the connecting substrate 600, the assembly surface of the terminal portion 630 of the connecting substrate 600 may be formed in the groove 122 recessed from the outer edge of the base 120.

The base 120 may comprise a groove 123. The groove 123 may be a damper accommodating groove. The groove 123 may be formed on an upper surface of the base 120. The groove 123 can accommodate at least a portion of a fourth damper 940. The fourth damper 940 may be disposed in the groove 123. A dam structure is formed in the base 120 by the groove 123, and a fourth damper 940 can be disposed inside the dam. Through this, the loss of the fourth damper 940 can be inhibited. A damper is disposed in the groove 123 and may be connected to the extension portion 383 of the coupling member 380. The base 120 may be provided with a groove structure so that the OIS damper can be applied.

The base 120 may comprise a groove 124. The groove 124 may be a coupling member interference prevention groove. The groove 124 may be formed on an upper surface of the base 120. The groove 124 may be extended from the groove 123. The groove 124 may be extended from the groove 123 in a direction perpendicular to the optical axis direction. The groove 124 can inhibit the solder portion connecting the coupling member 380 and the wire 800 from interfering with the base 120 when the second moving part 300 moves. The groove 124 can inhibit the extension portion 383 of the coupling member 380 and the base 120 from interfering with each other when the second moving part 300 moves. The groove 123 may be formed deeper from an upper surface of the base 120 than the groove 124. That is, the groove 123, which is a damper accommodating groove, may be recessed deeper than the groove 124, which is the coupling member interference prevention groove. The base 120 may comprise an avoidance structure to inhibit interference with the solder portion of the coupling member 380 having a damper spring during OIS driving.

The base 120 may comprise a step portion 125. The step portion 125 may be protruded from an outer side surface of the base 120. A cover member 140 may be disposed in the step portion 125. The side plate 142 of the cover member 140 may be disposed in the step portion 125. The step portion 125 may be overlapped with the side plate 142 of the cover member 140 in an optical axis direction.

The camera device 10 may comprise a sealing member. The sealing member can inhibit foreign substances from entering the inside of the camera device 10. The sealing member may be disposed between the cover member 140 and the base 120. The sealing member may seal the gap between the cover member 140 and the base 120. The sealing member may be disposed between the step portion 125 of the base 120 and the side plate 142 of the cover member 140. At least a portion of the sealing member may be disposed in the plurality of fourth grooves 126 of the base 120 and the groove 143 of the cover member 140.

The base 120 may comprise a groove 126. The groove 126 may be a sealing groove. The groove 126 may be formed on the side surface of the step portion 125. The groove 126 may be formed on the upper surface of the step portion 125. The groove 126 may comprise a plurality of grooves. The groove 126 may be formed as five grooves on one side surface of the base 120. A sealing groove structure may be applied to the base 120 to inhibit foreign matter from entering the actuator. Five grooves may be formed on one side surface of a lower end portion of the base 120.

A plurality of grooves 126 of the base 120 may comprise a plurality of grooves being disposed on any one of the four side surfaces of the base 120. The plurality of grooves 126 of the base 120 may comprise a plurality of grooves being disposed on a first side surface of the base 120. At this time, the sum of the widths of the plurality of grooves 126 in a direction perpendicular to the optical axis direction may be 17% to 37% of the width of the first side surface of the base 120. In a direction perpendicular to the optical axis direction, the sum of the widths of the plurality of grooves 126 may be 22% to 32% of the width of the first side surface of the base 120. In a direction perpendicular to the optical axis direction, the sum of the widths of the plurality of grooves 126 may be 25% to 29% of the width of the first side surface of the base 120.

The base 120 may comprise a groove 127. The groove 127 may be a ground terminal interference prevention groove. The groove 127 may be recessed deeper than the thickness of the side plate 142 of the cover member 140 on a side surface of the step portion 125. The groove 127 may be formed at a position corresponding to the ground terminal 144 of the cover member 140.

In a modified embodiment, the groove 127 may accommodate at least a portion of the ground terminal **144*a* of the cover member 140. The groove 127 may accommodate at least a portion of the ground terminal 144*a* bent inward from the side plate 142 of the cover member 140. A ground terminal 144 may be applied to the cover member 140 so that it can be grounded to the first substrate 110. In the modified embodiment, an accommodating groove that can avoid bending of the ground terminal 144 may be formed in the base 120**.

The base 120 may comprise a hole 128. The hole 128 may be formed at a location corresponding to the image sensor 330. The hole 128 may be formed to be larger than the image sensor 330. The image sensor 330 may be assembled through the hole 128 of the base 120. An image sensor assembly that is coupled with an image sensor 330, a sensor substrate 320, a sensor base 350, a filter 360, and a plate member 370 is inserted through the hole 128 of the base 120 to be coupled to a second substrate 310.

The base 120 may comprise a first protruded portion 129-1. The first protruded portion 129-1 may be formed at an opposite side of the first groove 122 of the base 120. The first protruded portion 129-1 may be protruded from an inner side surface of the base 120. The second substrate 310 may not be overlapped with the first protruded portion 129-1 in an optical axis direction.

In the present embodiment, a hole for inserting the image sensor assembly is formed in the center of the base 120, and a groove 122 for arranging the terminal portion 630 of the connecting substrate 600 is formed in an outer portion of the base 120. The groove 122 of the base 120 may be recessed inward to secure the stroke space of the extension portion 620, but there is a problem that the thickness of the base 120 in a direction perpendicular to the optical axis direction becomes thin in the groove 122 portion of the base 120 due to the hole 128 in the base 120. In the present embodiment, the strength of the base 120 can be maintained by securing the thickness of the base 120 through the first protruded portion 129-1. The second protruded portion 129-2 may further be protruded inward from some regions of the first protruded portion 129-1.

The base 120 may comprise a second protruded portion 129-2. The second protruded portion 129-2 may be protruded from the first protruded portion 129-1. The second protruded portion 129-2 may additionally be protruded from the first protruded portion 129-1. The second protruded portion 129-2 may be protruded more inward than the first protruded portion 129-1. The second substrate 310 may be overlapped with the second protruded portion 129-2 in an optical axis direction.

The camera device 10 may comprise a housing 130. The fixed part 100 may comprise a housing 130. The housing 130 may be disposed in the base 120. The housing 130 may be disposed on the base 120. The housing 130 may be disposed above the base 120. The housing 130 may be fixed to base 120. The housing 130 may be fixed to the cover member 140. The housing 130 may be coupled to base 120. The housing 130 may be attached to the base 120 with an adhesive. The housing 130 may be disposed on the first substrate 110. The housing 130 may be disposed above the first substrate 110. The housing 130 may be formed as a separate member from the base 120. The housing 130 may be disposed on the holder 340. The housing 130 may be disposed between base 120 and cover member 140. The housing 130 may remain fixed without moving during AF driving. The housing 130 may remain fixed without moving during OIS driving.

The housing 130 may comprise: a first side surface and a second side surface being disposed opposite to each other; and a third side surface and a fourth side surface being disposed opposite to each other. A wing portion 131 may be formed on each of the first side surface and second side surface of the housing 130. A protruded portion 132 may be formed on each of the third side surface and the fourth side surface of the housing 130.

The housing 130 may comprise a wing portion 131. The wing portion 131 may be disposed between the connecting substrate 600 and the side plate 142 of the cover member 140. At least a portion of the terminal portion 630 of the connecting substrate 600 may be disposed between the protruded portion 121 of the base 120 and the wing portion 131 of the housing 130. The wing portion 131 may have a wing structure. The wing portion 131 may block foreign substances from entering between the connecting substrate 600 and the side plate 142 of the cover member 140. The wing portion 131 can relieve external impact being applied to the side plate 142 of the cover member 140. The housing 130 may be formed of an insulating member. The wing portion 131 may be a spacer portion. The wing portion 131 may be a sealing portion. The wing portion 131 may be a compensation portion. The wing portion 131 may be an extension portion. The wing portion 131 may comprise a horizontal extension portion and a vertical extension portion being extended downward from the horizontal extension portion. The wing portion 131 may comprise a first portion being extended in a first direction and a second portion being extended from the first portion in a second direction different from the first direction. The wing portion 131 may be spaced apart from the protruded portion 121 of the base 120. The wing portion 131 may be spaced apart from the protruded portion 121 of the base 120 within a tolerance range. Or, the wing portion 131 may be in contact with the protruded portion 121 of the base 120. The wing portion 131 may be coupled to the protruded portion 121 of the base 120. The horizontal width of the upper portion of the wing portion 131 may correspond to the width of the shortest portion among the horizontal widths of the terminal portion 630 of the connecting substrate 600. Or, the horizontal width of the upper portion of the wing portion 131 may be longer than the horizontal width of the terminal portion 630 of the connecting substrate 600. The horizontal width of the upper portion of the wing portion 131 may be shorter than the width of the shortest portion among the horizontal widths of the terminal portion 630 of the connecting substrate 600. The wing portion 131 may be disposed for sealing only on the side where the terminal portion 630 is exposed.

In a sensor shift OIS actuator using the FPCB of the connecting substrate 600, a required separation distance for driving the FPCB may be necessary. At this time, the required separation distance may be the separation distance between the FPCB and the stopper part. In other words, a separation distance vulnerable to foreign substances may be created. However, due to the difficulty in applying the separation distance sealing structure, vulnerability to foreign matter defects may occur.

In the present embodiment, the wing portion 131, which is a wing structure descending from the housing 130, may be inserted between the cover member 140, which serves as a side stopper, and the connecting substrate 600. In a modified embodiment, a separate spacing member may be disposed instead of the wing portion 131 coming down from the housing 130.

The sealing structure can be completed by inserting the wing structure being developed from the housing 130, which is an essential fixed structure, into the space between the connecting substrate 600 and the side plate 142 of the cover member 140. Through this, the product can be protected from external impact and introduction of foreign substances.

A base 120, a connecting substrate 600, a wing portion 131 of the housing 130, and a side plate 142 of the cover member 140 may be sequentially disposed in a direction perpendicular to the optical axis direction. The distance between the connecting substrate 600 and the side plate 142 of the cover member 140 in a direction perpendicular to the optical axis direction may be equal to the thickness of the wing portion 131 of the housing 130. The distance between the connecting substrate 600 and the side plate 142 of the cover member 140 in a direction perpendicular to the optical axis direction may correspond to the thickness of the wing portion 131 of the housing 130. However, considering manufacturing errors, assembly tolerances, and the like, when the thickness of the wing portion 131 of the housing 130 is more than 90% of the distance between the connecting substrate 600 and the side plate 142 of the cover member 140, it can be considered to be equal. Or, when the introduction of foreign substances can be blocked, the thickness of the wing portion 131 of the housing 130 can be considered to be equal to the distance between the connecting substrate 600 and the side plate 142 of the cover member 140.

The wing portion 131 of the housing 130 may comprise a groove 131*a*. A third substrate 470 may be disposed in the groove 131*a*. The groove 131*a* may be formed in a shape corresponding to the third substrate 470.

In a modified embodiment, the wing portion 131 of the housing 130 may be omitted. In this case, a spacing member replacing the role of the wing portion 131 of the housing 130 may be provided. The spacing member may be a space. The spacing member may be a space member. The spacing member may be a sealing member. The spacing member may be a compensation member. The spacing member may be disposed between the connecting substrate 600 and the side plate 142 of the cover member 140. The space between the base 120 and the cover member 140 may be sealed through the wing portion 131 or the spacing member.

The housing 130 may comprise a protruded portion 132. The protruded portion 132 may be protruded outward from the housing 130. The protruded portion 132 may be protruded outward from each of the third side surface and the fourth side surface of the housing 130. The protruded portion 132 may in contact with the cover member 140. The protruded portion 132 may be fixed to the cover member 140. The protruded portion 132 may provide an assembly guide to the cover member 140. A stroke space for movement of the extension portion 620 of the connecting portion material 600 can be secured by the protruded portion 132.

The housing 130 may comprise a hole 133. The protruded portion 121 of the base 120 may be inserted into the hole 133. The hole 133 may be formed adjacent to the wing portion 131. The hole 133 may be formed to penetrate the housing 130 in an optical axis direction.

The housing 130 may comprise a hole 134. The hole 134 may be a wire passing hole. A wire 800 may be disposed in the hole 134. The wire 800 may pass through hole 134. The wire 800 may penetrate through hole 134. The hole 134 may be formed to have a larger diameter than the wire 800 so as not to interfere with the wire 800.

The housing 130 may comprise a groove 135. The groove 135 may be formed on an upper surface of the housing 130. The groove 135 may be formed in a corner region of an upper surface of the housing 130. The groove 135 may be formed to be spaced apart from the outer side surface of the housing 130. The groove 135 may be disposed adjacent to the hole 134. A damper may be disposed in the groove 135.

The housing 130 may comprise dam 136. The dam 136 may be formed between an outer side surface of the housing 130 and the groove 135 of the housing 130 by the groove 135 of the housing 130. The dam 136 can inhibit a phenomenon in which the first damper 910 being disposed inside the dam 136 is leaking to the outside.

The hole 134 of the housing 130 may comprise a chamfer. The hole 134 can avoid the wire 800 through the chamfer. The hole 134 of the housing 130 may comprise a first chamfer 134*a* whose width in a direction perpendicular to the optical axis increases as it moves upward. The hole 134 of the housing 130 may comprise a second chamfer 134*b* being disposed below the first chamfer 134*a* and having a width in a direction perpendicular to the optical axis increases as it moves downward. The length of the second chamfer 134*b* in an optical axis direction may be longer than the length of the first chamfer 134*a* in an optical axis direction. The length of the second chamfer 134*b* in an optical axis direction may be different from the length of the first chamfer 134*a* in an optical axis direction. The first damper 910 may be disposed from the first chamfer 134*a* to the second chamfer 134*b*. The chamfer shape of the hole 134 may be formed in the shape of a step. The hole 134 may comprise a step shape.

The camera device 10 may comprise a cover member 140. The fixed part 100 may comprise a cover member 140. The cover member 140 may be disposed in the base 120. The cover member 140 may be disposed on the base 120. The cover member 140 may be fixed to the base 120. The cover member 140 may be coupled to the base 120. The cover member 140 may be coupled to the housing 130. The cover member 140 may be coupled to the first substrate 110. The cover member 140 may be fixed to the base 120. The cover member 140 may be fixed to the housing 130. The cover member 140 may be fixed to the first substrate 110. The cover member 140 may cover at least a portion of the base 120. The cover member 140 may cover at least a portion of the housing 130. The cover member 140 can accommodate the housing 130 therein.

The cover member 140 may be a ‘cover can’ or a ‘shield can’. The cover member 140 may be formed of a metal material. The cover member 140 can block electromagnetic interference (EMI). The cover member 140 may be electrically connected to the first substrate 110. The cover member 140 may be grounded to the first substrate 110.

The cover member 140 may comprise an upper plate 141. The cover member 140 may comprise a hole being formed in the upper plate 141. The hole may be formed at a location corresponding to the lens 220. The cover member 140 may comprise a side plate 142. The side plate 142 may comprise a plurality of side plates. The side plate 142 may comprise four side plates. The side plate 142 may comprise first to fourth side plates. The side plate 142 may comprise first and second side plates being disposed opposite to each other, and third and fourth side plates being disposed opposite to each other. The cover member 140 may comprise a plurality of corners between a plurality of side plates.

The cover member 140 may comprise a groove 143. The groove 143 may be a sealing member arrangement groove. A sealing member may be disposed in the groove 143. The groove 143 may be formed in the side plate 142 of the cover member 140. The groove 143 may be connected to the groove 126 of the base 120. The groove 143 may be connected to one or more of the plurality of grooves 126 of the base 120. The groove 143 may be disposed at a position corresponding to the groove 126 of the base 120. The groove 143 may be formed at a lower end of the side plate 142 of the cover member 140. The groove 143 may comprise a plurality of grooves. The groove 143 may be formed in a smaller number than the grooves 126 of the base 120. In a modified embodiment, the groove 143 may be formed in the same number as the grooves 126 of the base 120.

The cover member 140 may comprise a ground terminal 144. The ground terminal 144 may be extended downward from the side plate 142. The ground terminal 144 may be coupled to the first substrate 110. The ground terminal 144 may be connected to the first substrate 110. The ground terminal 144 may be electrically connected to the first substrate 110. The ground terminal 144 may be coupled to the first substrate 110 through a conductive member. The ground terminal 144 may be soldered to the terminal of the first substrate 110. The cover member 140 may be electrically connected to the first substrate 110. The cover member 140 may be grounded to the first substrate 110.

The ground terminal 144 of the cover member 140 may be disposed at a position corresponding to the groove 127 of the base 120. Or, in a modified embodiment, the ground terminal 144*a* may be bent. The ground terminal 144*a* may be bent inward. At least a portion of the ground terminal 144*a* may be bent inward and disposed in the groove 127 of the base 120.

Throughout the specification, the cover member 140 is described as a component of the fixed part 100, but the cover member 140 can be understood as a separate component from the fixed part 100. The cover member 140 may be combined with the fixed part 100. The cover member 140 may cover the first moving part 200.

The camera device 10 may comprise a control unit. The control unit may be disposed in the first substrate 110. The control unit may be disposed next to the cover member 140. The control unit may comprise an individual shield can smaller than the cover member 140. The control unit may comprise a driver IC. The control unit can control the operation of the camera device 10.

The camera device 10 may comprise a first moving part 200. The first moving part 200 can move against the fixed part 100. The first moving part 200 can move in an optical axis direction with respect to the fixed part 100. The first moving part 200 may be disposed inside the fixed part 100. The first moving part 200 may be movably disposed inside the fixed part 100. The first moving part 200 may be movably disposed in an optical axis direction inside the fixed part 100. An autofocus (AF) function may be performed as the first moving part 200 moves in an optical axis direction against the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed to be spaced apart above the first substrate 110. The bobbin 210 may be disposed inside the housing 130. The bobbin 210 may be disposed inside the housing 130. At least a portion of the bobbin 210 may be accommodated in the housing 130. The bobbin 210 may be movably disposed in the housing 130. The bobbin 210 may be movably disposed in the housing 130 to be movable in an optical axis direction. The bobbin 210 may be coupled with the lens 220. The bobbin 210 may be hollow or comprise a hole. The lens 220 may be disposed in a hollow or hole of the bobbin 210. The outer circumferential surface of the lens 220 may be coupled to an inner circumferential surface of the bobbin 210.

The camera device 10 may comprise a lens 220. The first moving part 200 may comprise a lens 220. The lens 220 may be coupled to bobbin 210. The lens 220 may be fixed to the bobbin 210. The lens 220 can move integrally with the bobbin 210. The lens 220 may be screw-coupled to the bobbin 210. The lens 220 may be attached to the bobbin 210 using an adhesive. The lens 220 may be disposed in a position corresponding to the image sensor 330. The optical axis of the lens 220 may coincide with an optical axis of the image sensor 330. The optical axis may be a z-axis. The lens 220 may comprise a plurality of lenses. The lens 220 may comprise a 5-element or 6-element lens.

The camera device 10 may comprise a lens module. The lens module may be coupled to the bobbin 210. The lens module may comprise a barrel and one or more lenses 220 being disposed inside the barrel.

The bobbin 210 may comprise a protrusion 211 being protruded from the inner circumferential surface of the bobbin 210. The lens 220 may comprise a groove 221 being formed on an outer circumferential surface of the lens 220. The groove 221 of the lens 220 may comprise a first groove 221*a* being extended from a lower surface of the lens 220 in an optical axis direction. The groove 221 of the lens 220 may comprise a second groove 221*b* being extended from the first groove 221*a* in a direction perpendicular to the optical axis and spaced apart from a lower end of the first groove 221*a*. At least a portion of the protrusion 211 of the bobbin 210 may be disposed in the second groove 221*b* of the lens 220.

The bobbin 210 may comprise a groove 212. The groove 212 may be formed on an upper surface of the bobbin 210. The groove 212 may be a damper tank. The groove 212 can be described as being formed as a portion of the upper surface of the bobbin 210 is recessed. Or, the groove 212 may be described as the remaining portion where a portion of the upper surface of the bobbin 210 is protruded. A damper may be disposed in the groove 212. The groove 212 may comprise a side surface that is a curved surface surrounding the damper.

The bobbin 210 may comprise a protrusion 213. The protrusion 213 may be formed on an upper surface of the bobbin 210. The protrusion 213 may be protruded from an upper surface of the bobbin 210. The protrusion 213 may be protruded from one surface of the bobbin 210. The protrusion 213 may be protruded upward from the bobbin 210. A third damper 930 may be applied to the protrusion 213.

The bobbin 210 may comprise a sensing magnet mounting portion 214. The sensing magnet mounting portion 214 may be protruded from an outer circumferential surface of the bobbin 210. The sensing magnet mounting portion 214 may be protruded from an outer side surface of the bobbin 210. The sensing magnet mounting portion 214 may be more protruded than the AF coil 430 from an outer circumferential surface of the bobbin 210. A sensing magnet 450 may be disposed in the sensing magnet mounting portion 214. The sensing magnet mounting portion 214 may comprise a groove. At least a portion of the sensing magnet 450 may be disposed in a groove of the sensing magnet mounting portion 214. The sensing magnet 450 may be fixed to the sensing magnet mounting portion 214 with an adhesive.

The bobbin 210 may comprise a correction magnet mounting portion 215. The correction magnet mounting portion 215 may be protruded from an outer circumferential surface of the bobbin 210. The correction magnet mounting portion 215 may be protruded from an outer side surface of the bobbin 210. The correction magnet mounting portion 215 may be more protruded from the outer circumferential surface of the bobbin 210 than the AF coil 430. A correction magnet 460 may be disposed in the correction magnet mounting portion 215. The correction magnet mounting portion 215 may comprise a groove. At least a portion of the correction magnet 460 may be disposed in the groove of the correction magnet mounting portion 215. The correction magnet 460 may be fixed to the correction magnet mounting portion 215 with an adhesive.

The lens 220 may be inserted from the upper side of the bobbin 210. At this time, the protrusion 211 of the bobbin 210 may pass through the first groove 221*a* of the lens 220. When the protrusion 211 of the bobbin 210 is caught at an upper end of the first groove 221*a* of the lens 220, the lens 220 can be rotated against the bobbin 210. At this time, the protrusion 211 of the bobbin 210 may be inserted into the second groove 221*b* of the lens 220. When the protrusion 211 of the bobbin 210 is inserted into the second groove 221*b* of the lens 220, the movement of the lens 220 in an optical axis direction against the bobbin 210 may be restricted. The lens 220 may be fixed to the bobbin 210 with an adhesive.

In the present embodiment, a protrusion 211 is formed in the bobbin 210 and a groove 221 is formed in the lens 220, but in a modified embodiment, the bobbin 210 may comprise a groove and the lens 220 may comprise a protrusion being coupled to the groove of the bobbin 210.

The camera device 10 may comprise a second moving part 300. The second moving part 300 can move against the fixed part 100. The second moving part 300 may move in a direction perpendicular to the optical axis direction based on the fixed part 100. The second moving part 300 may be disposed inside the fixed part 100. The second moving part 300 may be movably disposed inside the fixed part 100. The second moving part 300 may be movably disposed in a direction perpendicular to the optical axis direction inside the fixed part 100. Image stabilization (OIS) function may be performed by the second moving part 300 moving in a direction perpendicular to the optical axis direction with respect to the fixed part 100. The second moving part 300 may be disposed between the first moving part 200 and the first substrate 110.

The camera device 10 may comprise a second substrate 310. The second moving part 300 may comprise a second substrate 310. The second substrate 310 may be a substrate. The second substrate 310 may be a printed circuit board (PCB). The second substrate 310 may be spaced apart from the first substrate 110. The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in an optical axis direction and in a direction perpendicular to the optical axis direction. The second substrate 310 can move in a direction perpendicular to the optical axis. The second substrate 310 may be electrically connected to the image sensor 330. The second substrate 310 can move integrally with the image sensor 330. The second substrate 310 may comprise a hole. An image sensor 330 may be disposed in a hole of the second substrate 310. The second substrate 310 may be coupled to an upper surface of the sensor substrate 320. The second substrate 310 may be disposed on an upper surface of the sensor substrate 320. The second substrate 310 may be fixed to an upper surface of the sensor substrate 320. The second substrate 310 may be spaced apart from the housing 130. The second substrate 310 may be disposed in the holder 340.

The second substrate 310 may comprise a terminal 311. The terminal 311 may be disposed on a lower surface of the second substrate 310. The terminal 311 may be coupled with the terminal 321 of sensor substrate 320. The second substrate 310 may be formed separately from the sensor substrate 320. The second substrate 310 may be formed separately and coupled with the sensor substrate 320. The terminal 321 of the sensor substrate 320 may be soldered to the terminal 311 of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled with the image sensor 330. The sensor substrate 320 may be coupled to the second substrate 310.

The sensor substrate 320 may comprise a hole. The hole may be hollow. An image sensor 330 may be disposed in the hole of the sensor substrate 320. A portion of the plate member 370 may be disposed in the hole of the sensor substrate 320. The protruded portion 374 of the plate member 370 may be disposed in the hole of the sensor substrate 320. The hole of the sensor substrate 320 may be formed in a size and shape corresponding to the protruded portion 374 of the plate member 370.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 may be coupled below the second substrate 310 with the image sensor 330 coupled thereto.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and the sensor base 350. The image sensor 330 may be disposed inside the base 120. The image sensor 330 may be electrically connected to the second substrate 310. The image sensor 330 can move integrally with the second substrate 310. The image sensor 330 may be disposed below the lens 220. The image sensor 330 may be disposed in the plate member 370 and electrically connected to the sensor substrate 320 through wire bonding. The image sensor 330 may be movably disposed. The image sensor 330 may move in a direction perpendicular to the optical axis. The image sensor 330 may rotate about an optical axis.

Light passing through the lens 220 and the filter 360 may be incident on the image sensor 330 to form an image. The image sensor 330 may be electrically connected to the sensor substrate 320, the second substrate 310, and the first substrate 110. The image sensor 330 may comprise an effective image region. The image sensor 330 can convert light being irradiated to the effective image region into an electrical signal. The image sensor 330 may comprise one or more among a charge coupled device (CCD), a metal oxide semiconductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or hole where the image sensor 330 is disposed. An OIS coil 440 may be disposed in the holder 340. The holder 340 may comprise a protrusion around which the OIS coil 440 is wound. The holder 340 may comprise a hole in which the sensor 445 is disposed. The holder 340 may be spaced apart from the housing 130. The holder 340 may move in a direction perpendicular to the optical axis or rotate about an optical axis by the interaction of the driving magnet and the OIS coil 440 together with the image sensor 330. The holder 340 is a member in which the OIS coil 440 is disposed and may be a coil holder.

The connecting substrate 600 may be disposed in the holder 340. The connecting substrate 600 may be connected to the holder 340. The connecting substrate 600 may be fixed to the holder 340. The connecting substrate 600 may be coupled to the holder 340. The connecting substrate 600 may be attached to the holder 340. The connecting substrate 600 may be fixed to the holder 340 with an adhesive. The connecting substrate 600 may be in contact with the holder 340.

The holder 340 may comprise a protruded portion 341. The protruded portion 341 may be protruded from an upper surface of the holder 340. The protruded portion 341 may be protruded upward from an outer side surface of the holder 340. The connecting substrate 600 may be disposed in the protruded portion 341 of the holder 340. The connecting substrate 600 may be connected to the protruded portion 341 of the holder 340. The connecting substrate 600 may be fixed to the protruded portion 341 of the holder 340. The connecting substrate 600 may be coupled to the protruded portion 341 of the holder 340. The connecting substrate 600 may be attached to the protruded portion 341 of the holder 340. The connecting substrate 600 may be fixed to the protruded portion 341 of the holder 340 with an adhesive. The connecting substrate 600 may be in contact with the protruded portion 341 of the holder 340.

The holder 340 may comprise protrusion 342. The protrusion 342 may be protruded from an upper surface of the holder 340. The protrusion 342 may be disposed inside the OIS coil 440. The protrusion 342 may be protruded above the OIS coil 440. The OIS coil 440 may be disposed by being wound around the protrusion 342 of the holder 340.

The protrusion 342 of the holder 340 may be overlapped with the driving magnet in an optical axis direction. The OIS coil 440 may be overlapped with the driving magnet in an optical axis direction. The distance in an optical axis direction between the OIS coil 440 and the driving magnet may be longer than the distance in an optical axis direction between the protrusion 342 of the holder 340 and the driving magnet. When the holder 340 moves upward the protrusion 342 of the holder 340 may be in contact with the driving magnet. At this time, the OIS coil 440 may be spaced apart from the driving magnet. That is, the holder 340 and the protrusion 342 are in contact with the driving magnet before the OIS coil 440 is in contact therewith, thereby inhibiting the OIS coil 440 from being in contact with the driving magnet.

The protrusion 342 may comprise multiple protrusions. The protrusion 342 may be formed in a number corresponding to the number of OIS coils 440. The protrusion 342 may comprise the first to fourth protrusions corresponding to the first-first coil 441-1, the first-second coil 441-2, the second-first coil 442-1, and the second-second coil 442-2. At this time, each of the first to fourth protrusions of the holder 340 may comprise four protrusions being spaced apart from one another. That is, inside each of the first-first coil 441-1, the first-second coil 441-2, the second-first coil 442-1, and the second-second coil 442-2, four protrusions can be disposed respectively. Four protrusions can be disposed in a row.

The holder 340 may comprise a first stopper portion 343. The first stopper portion 343 may be a lateral stopper. The first stopper portion 343 may be protruded outward from the extension portion 620 of the connecting substrate 600. In a direction perpendicular to the optical axis, the distance between the extension portion 620 of the connecting substrate 600 and the cover member 140 can be longer than the distance between the first stopper portion 343 of the holder 340 and the cover member 140. The first stopper portion 343 may be disposed on a side surface of the holder 340 closer to the corner of the holder 340 than the center of the side surface of the holder 340.

The holder 340 may comprise a second stopper portion 344. The second stopper portion 344 may be a lower stopper. The second stopper portion 344 may be in contact with the base 120 when the holder 340 moves downward. The second stopper portion 344 may be protruded below the coupling protrusion 345.

The holder 340 may comprise a coupling protrusion 345. The coupling protrusion 345 may be protruded from a lower surface of the holder 340. The coupling protrusion 345 can be coupled with the coupling member 380. The coupling protrusion 345 may be coupled to the hole of the coupling member 380. The coupling protrusion 345 can be inserted into the hole of the coupling member 380. In a modified embodiment, the coupling protrusion 345 may be replaced with a groove. That is, instead of the coupling protrusion 345, a groove may be formed at the corresponding position. In this case, adhesive may be disposed in the groove of the holder 340 to secure the coupling protrusion 345.

The holder 340 may comprise a protruded portion 346. The protruded portion 346 may comprise two protruded portions 346 being more protruded downward than the second substrate 310. The connecting portion 610 of the connecting substrate 600 may be disposed between the two protruded portions 346. The protruded portion 346 of the holder 340 may be more protruded downward than the second stopper portion 344.

The holder 340 may comprise a hole 347. The hole 347 may be a sensor avoidance hole. A sensor 445 may be disposed in the hole 347. At least a portion of the sensor 445 may be disposed in the hole 347 of the holder 340.

The holder 340 may comprise a groove 348. The groove 348 may be formed on the outer circumferential surface of the holder 340. The groove 348 may be formed by being recessed from an outer side surface of the holder 340. The groove 348 may be formed between the protruded portion 341 and the first stopper portion 343. The groove 348 may be formed between the connecting substrate 600 and the first stopper portion 343. Through the groove 348, a phenomenon in which the bent portion of the connecting substrate 600 is interfered with the holder 340 can be inhibited.

At least a portion of the connecting portion 610 and the extension portion 620 of the connecting substrate 600 may be disposed in the protruded portion 341 of the holder 340. At least a portion of the connecting portion 610 and the extension portion 620 of the connecting substrate 600 may be connected to the protruded portion 341 of the holder 340. At least a portion of the connecting portion 610 and the extension portion 620 of the connecting substrate 600 may be fixed to the protruded portion 341 of the holder 340. At least a portion of the connecting portion 610 and the extension portion 620 of the connecting substrate 600 may be coupled to the protruded portion 341 of the holder 340. At least a portion of the connecting portion 610 and the extension portion 620 of the connecting substrate 600 may be attached to the protruded portion 341 of the holder 340. At least a portion of the connecting portion 610 and the extension portion 620 of the connecting substrate 600 may be fixed to the protruded portion 341 of the holder 340 with an adhesive. At least a portion of the connecting portion 610 and the extension portion 620 of the connecting substrate 600 may be in contact with the protruded portion 341 of the holder 340.

The holder 340 may comprise a hole. The wire 800 may pass through the hole of the holder 340. The hole of the holder 340 may be formed to have a larger diameter than the wire 800 so that the holder 340 is not interfered with the wire 800 when the holder 340 moves. A damper may be disposed in a hole of the holder 340.

The holder 340 may comprise a groove. The groove may be an adhesive accommodating groove. At least a portion of the adhesive that attaches the connecting substrate 600 and the holder 340 may be disposed in the groove. A groove may be formed on an outer side surface of the holder 340. A groove may be formed on an outer side surface of the protruded portion 341. The groove may be formed by being recessed on an outer surface of the protruded portion 341. The upper side of the groove may be open. With this structure, adhesive can be injected into the groove from above. The groove may comprise multiple grooves. The groove may comprise a step 342*a*. The portion from the connecting substrate 600 up to the portion being fixed to the holder 340 may be referred to as the connecting portion 610.

The holder 340 may comprise a groove. The groove may be formed on a lower surface of the holder 340. The groove may be recessed from a lower surface of the holder 340. The groove may be disposed at a position corresponding to the bent portion of the connecting portion 610 of the connecting substrate 600. The groove may be disposed adjacent to the bent portion of the connecting portion 610 of the connecting substrate 600. An adhesive may be disposed in the groove.

The holder 340 may comprise a groove. The groove may be recessed from an outer circumferential surface of the holder 340. The groove may be disposed at a side of the protruded portion 341. The groove may be formed to inhibit interference with the connecting substrate 600.

The camera device 10 may comprise a sensor base 350. The second moving part 300 may comprise a sensor base 350. The sensor base 350 may be disposed in the sensor substrate 320. The sensor base 350 may comprise a hole being formed at a position corresponding to the image sensor 330. The sensor base 350 may comprise a groove in which the filter 360 is disposed.

The camera device 10 may comprise a filter 360. The second moving part 300 may comprise a filter 360. The filter 360 may be disposed between the lens 220 and the image sensor 330. The filter 360 may be disposed in the sensor base 350. The filter 360 may cut off light in a specific frequency band among light passing through the lens 220 from entering the image sensor 330. The filter 360 may comprise an infrared cut-off filter. The filter 360 may cut off infrared rays from being incident on the image sensor 330.

The camera device 10 may comprise a plate member 370. The second moving part 300 may comprise a plate member 370. The plate member 370 may be a SUS. The plate member 370 may be formed of SUS. The plate member 370 may be formed of a copper alloy. The plate member 370 may comprise copper. The plate member 370 may be a reinforcement plate. The plate member 370 may be a stiffener. The plate member 370 may be coupled to a lower surface of the sensor substrate 320. The plate member 370 may be disposed on a lower surface of the sensor substrate 320. The plate member 370 may be in contact with a lower surface of the sensor substrate 320. The plate member 370 may be fixed to a lower surface of the sensor substrate 320. The plate member 370 may be attached to a lower surface of the sensor substrate 320 with an adhesive.

In the present embodiment, the image sensor 330 may be directly disposed in the plate member 370. Meanwhile, the flatness of the plate member 370 may be easier to manage than the sensor substrate 320. Through this, the flatness of the mounting surface of the image sensor 330 can be easily managed. The image sensor 330 may be electrically connected to the sensor substrate 320 through wire bonding. The image sensor 330 may be electrically connected to the sensor substrate 320.

The plate member 370 may comprise a protruded portion 374. The protruded portion 374 may be protruded from an upper surface of the plate member 370. At least a portion of the protruded portion 374 may be disposed in the hole of the sensor substrate 320. The protruded portion 374 of the plate member 370 may be overlapped with the sensor substrate 320 in a direction perpendicular to the optical axis direction. The image sensor 330 may be disposed in the protruded portion 374 of the plate member 370. The image sensor 330 may be disposed on the protruded portion 374 of the plate member 370. The image sensor 330 may be in contact with the protruded portion 374 of the plate member 370. The image sensor 330 may be fixed to the protruded portion 374 of the plate member 370. The image sensor 330 may be attached to the protruded portion 374 of the plate member 370 using an adhesive.

The plate member 370 may comprise a support region. The support region may be coupled with the sensor substrate 320. The support region may be a support portion. The support region may be disposed outside the protruded portion 374. The support region can form an edge. The protruded portion 374 may be protruded from the support region. The thickness of the protruded portion 374 may be smaller than the thickness of the sensor substrate 320. At this time, the thickness of the protruded portion 374 may be the thickness from an upper surface of the support region to an upper surface of the protruded portion 374. That is, the thickness from an upper surface of the support region to an upper surface of the protruded portion 374 may be smaller than the thickness of the sensor substrate 320.

The upper surface of the image sensor 330 being disposed in the plate member 370 may be disposed at the same height as the upper surface of the sensor substrate 320. The thickness of the image sensor 330 may be thinner than the thickness of the sensor substrate 320. The height of the seating surface of the image sensor 330 of the plate member 370 may be lower than the height of an upper surface of the sensor substrate 320.

The camera device 10 may comprise a coupling member 380. The second moving part 300 may comprise a coupling member 380. The coupling member 380 may be disposed in the holder 340. The coupling member 380 may be coupled to the wire 800. The coupling member 380 may be connected to the wire 800 through soldering. The coupling member 380 may be formed of metal. The coupling member 380 may comprise a hole through which the wire 800 passes. The coupling member 380 may comprise a shock absorbing portion to alleviate an impact. The coupling member 380 may comprise a shape that is bent multiple times. The coupling member 380 may comprise a plurality of terminals. The coupling member 380 may comprise four terminals being disposed in four corner regions of the holder 340. The coupling member 380 may be a metal plate. The coupling member 380 may be formed of metal. The coupling member 380 may be a plate. The coupling member 380 may be a terminal member. The coupling member 380 may be a terminal.

The coupling member 380 may comprise a hole 381. The coupling member 380 may comprise a hole 381 where the wire 800 is disposed. The coupling member 380 may comprise a hole 381 through which the wire 800 passes. The diameter of the hole 381 of the coupling member 380 may be different from the diameter of the hole 714*a* of the upper elastic member 710. The diameter of the hole 381 of the coupling member 380 (see D1 in FIG. 13) may be larger than the diameter of the hole 714*a* of the upper elastic member 710 (see D2 in FIG. 13). Through this, the assembly concentricity of the wire 800 can be enhanced. In addition, workability in the process of coupling the wire 800 to the upper elastic member 710 and the coupling member 380 can be enhanced. In a modified embodiment, the diameter of the hole 381 of the coupling member 380 may be smaller than the diameter of the hole 714*a* of the upper elastic member 710.

The coupling member 380 may comprise a hole 382. The hole 382 may be formed in a portion of the circumference of the portion coupled to the wire 800. The hole 382 may be configured to inhibit disconnection of the wire 800.

The coupling member 380 may comprise a coupling portion 380*a*. The coupling portion 380*a* may be coupled to the wire 800. The coupling portion 380*a* may be coupled to the holder 340.

The coupling member 380 may comprise an extension portion 383. The extension portion 383 may be extended from the coupling portion 380*a* toward the groove 123 of the base 120. The extension portion 383 may form an obtuse angle with the coupling portion 380*a*. Or, the extension portion 383 may form a right angle with the coupling portion 380*a*. Or, the extension portion 383 may form an acute angle with the coupling portion 380*a*. The extension portion 383 may be extended from the coupling portion 380*a*. The extension portion 383 may be extended in a direction different from the arrangement direction of the coupling portion 380*a*. The extension portion 383 may be bent and extended. A fourth damper 940 being disposed in the base 120 may be connected to the extension portion 383.

In a modified embodiment, the coupling member 380 may be omitted. For an example, a lower end portion of the wire 800 may be coupled to the base 120. The base 120 may comprise a surface electrode for coupling to the wire 800. The lower end portion of the wire 800 may be soldered to a surface electrode of the base 120.

The camera device 10 may comprise a driving unit. The driving unit can move the moving part 200 and 300 against the fixed part 100. The driving unit can perform an autofocus (AF) function. The driving unit can perform image stabilization (OIS) function. The driving unit can move the lens 220. The driving unit can move the image sensor 330. The driving unit may comprise a magnet and a coil. The driving unit may comprise a shape memory alloy (SMA).

The driving unit may comprise a driving magnet. The driving magnet may be disposed in the housing. The driving magnet may comprise a plurality of magnets. The driving magnet may comprise first to fourth magnets 401, 402, 403, and 404. The driving magnet may comprise first and second magnets 401 and 402 being disposed at opposite sides to each other. The driving magnet may comprise third and fourth magnets 403 and 404 being disposed opposite to each other.

The distance between the first magnet 401 and the third magnet 403 may be different from the distance between the first magnet 401 and the fourth magnet 404. The distance between the first magnet 401 and the third magnet 403 may be greater than the distance between the first magnet 401 and the fourth magnet 404. The distance between the second magnet 402 and the fourth magnet 404 may be different from the distance between the second magnet 401 and the third magnet 403. The distance between the second magnet 402 and the fourth magnet 404 may be greater than the distance between the second magnet 401 and the third magnet 403. In a modified embodiment, the distance between the first magnet 401 and the third magnet 403 may be shorter than the distance between the first magnet 401 and the fourth magnet 404. The distance between the second magnet 402 and the fourth magnet 404 may be shorter than the distance between the second magnet 401 and the third magnet 403.

The sensing magnet 450 may be disposed between the first magnet 401 and the third magnet 403. The sensing magnet 450 may be overlapped with the first magnet 401 and the third magnet 403 in a direction perpendicular to the optical axis. The sensing magnet 450 may be overlapped with the first magnet 401 in a direction perpendicular to the optical axis. The sensing magnet 450 may be overlapped with the third magnet 403 in a direction perpendicular to the optical axis. The sensing magnet 450 may be overlapped with the first magnet 401 and the third magnet 403 in a first direction perpendicular to the optical axis direction. The sensing magnet 450 may be disposed on a virtual straight line connecting the first magnet 401 and the third magnet 403.

The sensing magnet 450 may be overlapped with the third magnet 403 in a direction perpendicular to the inner surface of the first magnet 401. The sensing magnet 450 may be overlapped with the first magnet 401 in a direction perpendicular to the inner surface of the first magnet 401.

The correction magnet 460 may be disposed between the second magnet 402 and the fourth magnet 404. The correction magnet 460 may be overlapped with the second magnet 402 and the fourth magnet 404 in a direction perpendicular to the optical axis direction. The correction magnet 460 may be overlapped with the second magnet 402 in a direction perpendicular to the optical axis direction. The correction magnet 460 may be overlapped with the fourth magnet 404 in a direction perpendicular to the optical axis direction. The correction magnet 460 may be overlapped with the second magnet 402 and the fourth magnet 404 in a first direction perpendicular to the optical axis direction. The correction magnet 460 may be disposed on an imaginary straight line connecting the second magnet 402 and the fourth magnet 404.

The correction magnet 460 may be overlapped with the fourth magnet 404 in a direction perpendicular to the inner surface of the second magnet 402. The correction magnet 460 may be overlapped with the second magnet 402 in a direction perpendicular to the inner surface of the second magnet 402.

Each of the first to fourth magnets 401, 402, 403, and 404 may comprise an AF magnet 410 being disposed at a position corresponding to the AF coil 430. Each of the first to fourth magnets 401, 402, 403, and 404 may comprise an OIS magnet 420 being disposed at a position corresponding to the OIS coil 440.

Each of the first to fourth magnets 401, 402, 403, and 404 may comprise a first width, which is the length between the inner and outer surfaces, and a second width, which is the length between both side surfaces. The first width of the first magnet 401 and the first width of the third magnet 403 may be the same. The first width of the second magnet 402 and the first width of the fourth magnet 404 may be the same. The first width of the first magnet 401 and the first width of the second magnet 403 may be the same. The first to fourth magnets 401, 402, 403, and 404 may all have the same first width, which is the length between the inner and outer surfaces.

The second width of the first magnet 401 may be different from the second width of the third magnet 403. The second width (see W1 in FIG. 38) of the first magnet 401 may be longer than the second width (see W2 in FIG. 38) of the third magnet 403. The second width of the second magnet 402 may be longer than the second width of the fourth magnet 404. In a modified embodiment, the second width of the first magnet 401 may be shorter than the second width of the third magnet 403. The second width of the second magnet 402 may be shorter than the second width of the fourth magnet 404.

The second width of the first magnet 401 may be larger than the width of the first-first coil 441-1 in the corresponding direction. The second width of the third magnet 403 may be equal to or smaller than the width of the second-first coil 442-1 in the corresponding direction. As another example, the second width of the first magnet 401 is larger than the width of the first coil 441 in the corresponding direction by a first length, and the first length may be greater than the second length when the second width of the third magnet 403 is larger than the width of the second-first coil 442-1 in the corresponding direction by a second length. That is, when compared to the corresponding coil, the first magnet 401 may be larger than the third magnet 403 with a bigger difference.

The housing 130 may comprise first and second corners being disposed at opposite sides to each other, and third and fourth corners being disposed at opposite sides to each other. The first magnet 401 may be disposed between the first corner and the fourth corner of the housing 130. The first magnet 401 may be disposed closer to the first corner of the housing 130 than to the fourth corner. The second magnet 402 may be disposed between the second corner and the third corner of the housing 130. The second magnet 402 may be disposed closer to the second corner of the housing 130 than to the third corner. The third magnet 403 may be disposed between the third corner and the first corner of the housing 130. The third magnet 403 may be disposed closer to the third corner of the housing 130 than to the first corner. The fourth magnet 404 may be disposed between the second corner and the fourth corner of the housing 130. The fourth magnet 404 may be disposed closer to the fourth corner of the housing 130 than the second corner.

The distance between the first magnet 401 and the fourth corner may be different from the distance between the third magnet 403 and the first corner. The distance between the first magnet 401 and the fourth corner may be shorter than the distance between the third magnet 403 and the first corner. The distance between the first magnet 401 and the first corner may be the same as the distance between the third magnet 403 and the third corner. In a modified embodiment, the distance between the first magnet 401 and the fourth corner may be longer than the distance between the third magnet 403 and the first corner.

The distance between the second magnet 402 and the third corner may be different from the distance between the fourth magnet 404 and the second corner. The distance between the second magnet 402 and the third corner may be shorter than the distance between the fourth magnet 404 and the second corner. The distance between the second magnet 402 and the second corner may be the same as the distance between the fourth magnet 404 and the third corner. In a modified embodiment, the distance between the first magnet 401 and the fourth corner may be longer than the distance between the third magnet 403 and the first corner.

The OIS coil 440 may comprise: a first-first coil 441-1 corresponding to the first magnet 401; a first-second coil 441-2 corresponding to the second magnet 402; a second-first coil 442-1 corresponding to the third magnet 403; and a second-second coil 442-2 corresponding to the fourth magnet 404. The first-first coil 441-1, first-second coil 441-2, second-first coil 442-1, and second-second coil 442-2 may all be formed to the same size. The first-first coil 441-1, first-second coil 441-2, second-first coil 442-1, and second-second coil 442-2 may all be wound with the same number of turns.

The camera device 10 may comprise an AF driving unit. The AF driving unit may be an autofocus driving unit. The AF driving unit may be a driving unit for autofocus driving. The AF driving unit can move the first moving part 200 in an optical axis direction. The AF driving unit can move the bobbin 210 in an optical axis direction. The lens 220 can be moved in an optical axis direction. The lens 220 may be moved in an optical axis direction against the image sensor 330. The AF driving unit can perform an autofocus (AF) function. The AF driving unit can move the first moving part 200 upward in an optical axis direction. The AF driving unit can move the first moving part 200 downward in an optical axis direction.

The camera device 10 may comprise an OIS driving unit. The OIS driving unit may be an image stabilization driving unit. The OIS driving unit may be a driving unit for driving image stabilization. The OIS driving unit can move the second moving part 300 in a direction perpendicular to the optical axis direction. The OIS driving unit can move the second substrate 310 in a direction perpendicular to the optical axis direction. The OIS driving unit can move the sensor substrate 320 in a direction perpendicular to the optical axis direction. The OIS driving unit can move the image sensor 330 in a direction perpendicular to the optical axis direction. The OIS driving unit may move the image sensor 330 in a direction perpendicular to the optical axis direction against the first substrate 110. The OIS driving unit can move the holder 340 in a direction perpendicular to the optical axis direction. The OIS driving unit can move the sensor base 350 in a direction perpendicular to the optical axis direction. The OIS driving unit can move the filter 360 in a direction perpendicular to the optical axis direction. The OIS driving unit can perform image stabilization (OIS) function.

The OIS driving unit may move the second moving part 300 in a first direction perpendicular to the optical axis direction. The OIS driving unit may move the second moving part 300 in a second direction perpendicular to the optical axis direction and the first direction. The OIS driving unit may rotate the second moving part 300 about an optical axis.

In the present embodiment, the AF driving unit may comprise an AF coil 430. The OIS driving unit may comprise an OIS coil 440. The AF driving unit may comprise an AF magnet 410. The OIS driving unit may comprise an OIS magnet 420. In a modified embodiment, the AF driving unit and the OIS driving unit may comprise a driving magnet commonly used for interaction with the AF coil 430 and the OIS coil 440. That is, the AF driving unit and the OIS driving unit may comprise individually controlled coils and common magnets.

The camera device 10 may comprise an AF magnet 410. The driving unit may comprise an AF magnet 410. The AF magnet 410 may be a magnet. The AF magnet 410 may be a permanent magnet. The AF magnet 410 may be a common magnet. The AF magnet 410 can be used for autofocus (AF).

The AF magnet 410 can be disposed in the fixed part 100. The AF magnet 410 can be fixed to the fixed part 100. The AF magnet 410 can be coupled to the fixed part 100. The AF magnet 410 can be attached to the fixed part 100 with an adhesive. The AF magnet 410 may be disposed in the housing 130. The AF magnet 410 may be fixed to the housing 130. The AF magnet 410 may be coupled to the housing 130. The AF magnet 410 may be attached to the housing 130 with an adhesive. The AF magnet 410 may be disposed at a corner of the housing 130. The AF magnet 410 may be disposed biased toward a corner of the housing 130.

The AF magnet 410 may be a two-pole magnetized magnet comprising one N-pole region and one S-pole region. In a modified embodiment, the AF magnet 410 may be a four-pole magnetized magnet comprising two N-pole regions and two S-pole regions.

The AF magnet 410 may comprise a plurality of magnets. The AF magnet 410 may comprise four magnets. The AF magnet 410 may comprise first to fourth magnets. The first to fourth magnets may be disposed symmetrically to an optical axis. The first to fourth magnets may be formed to have the same size and shape.

The camera device 10 may comprise an OIS magnet 420. The driving unit may comprise an OIS magnet 420. The OIS magnet 420 may be a magnet. The OIS magnet 420 may be a permanent magnet. The OIS magnet 420 may be a common magnet. The OIS magnet 420 can be used for image stabilization (OIS).

The OIS magnet 420 can be disposed in the fixed part 100. The OIS magnet 420 can be fixed to the fixed part 100. The OIS magnet 420 can be coupled with the fixed part 100. The OIS magnet 420 can be attached to the fixed part 100 with an adhesive. The OIS magnet 420 may be disposed in the housing 130. The OIS magnet 420 may be fixed to the housing 130. The OIS magnet 420 may be coupled to the housing 130. The OIS magnet 420 may be attached to the housing 130 with an adhesive. The OIS magnet 420 may be disposed at a corner of the housing 130. The OIS magnet 420 may be disposed biased to a corner of the housing 130.

The OIS magnet 420 may be a two-pole magnetized magnet comprising one N-pole region and one S-pole region. In a modified embodiment, the OIS magnet 420 may be a four-pole magnetized magnet comprising two N-pole regions and two S-pole regions.

The OIS magnet 420 may comprise a plurality of magnets. The OIS magnet 420 may comprise four magnets. The OIS magnet 420 may comprise first to fourth magnets. The first to fourth magnets may be disposed symmetrically to an optical axis. The first to fourth magnets may be formed to have the same size and shape.

The OIS magnet 420 may be disposed below the AF magnet 410. The OIS magnet 420 may be disposed on a lower surface of the AF magnet 410. The OIS magnet 420 may be in contact with a lower surface of the AF magnet 410. The OIS magnet 420 may be fixed to a lower surface of the AF magnet 410. The OIS magnet 420 may be coupled to a lower surface of the AF magnet 410 with an adhesive. In an optical axis direction, the length of the OIS magnet 420 may be shorter than the length of the AF magnet 410. The size of the OIS magnet 420 may be smaller than the length of the AF magnet 410.

The camera device 10 may comprise an AF coil 430. The driving unit may comprise an AF coil 430. The AF coil 430 may be disposed in the first moving part 200. The AF coil 430 may be fixed to the first moving part 200. AF coil 430 may be coupled to the first moving part 200. The AF coil 430 may be attached to the first moving part 200 with an adhesive. The AF coil 430 may be disposed in the bobbin 210. The AF coil 430 may be fixed to the bobbin 210. The AF coil 430 may be coupled to the bobbin 210. The AF coil 430 may be attached to the bobbin 210 with an adhesive. The AF coil 430 may be electrically connected to the driver IC 480. The AF coil 430 may be electrically connected to the lower elastic member 720, the third substrate 470, and the driver IC 480. The AF coil 430 may receive current from the driver IC 480.

The AF coil 430 may be disposed in a position corresponding to the AF magnet 410. The AF coil 430 may be disposed in the bobbin 210 at a position corresponding to the AF magnet 410. The AF coil 430 may face the AF magnet 410. The AF coil 430 may comprise a surface facing the AF magnet 410. The AF coil 430 may be disposed adjacent to the AF magnet 410. The AF coil 430 may interact with the AF magnet 410. The AF coil 430 may electromagnetically interact with the AF magnet 410.

The AF coil 430 can move the first moving part 200 in an optical axis direction. The AF coil 430 can move the bobbin 210 in an optical axis direction. The AF coil 430 can move the lens 220 in an optical axis direction. The AF coil 430 can move the first moving part 200 upward in an optical axis direction. The AF coil 430 can move the bobbin 210 upward in an optical axis direction. The AF coil 430 can move the lens 220 upward in an optical axis direction. The AF coil 430 can move the first moving part 200 downward in an optical axis direction. The AF coil 430 can move the bobbin 210 downward in an optical axis direction. The AF coil 430 can move the lens 220 downward in an optical axis direction. The AF magnet 410 and AF coil 430 can move the lens 220 in an optical axis direction.

The camera device 10 may comprise an OIS coil 440. The driving unit may comprise an OIS coil 440. The OIS coil 440 may be disposed in the second moving part 300. The OIS coil 440 may be fixed to the second moving part 300. The OIS coil 440 may be coupled to the second moving part 300. The OIS coil 440 may be attached to the second moving part 300 with an adhesive. The OIS coil 440 may be disposed in the holder 340. The OIS coil 440 may be fixed to the holder 340. The OIS coil 440 may be coupled to the holder 340. The OIS coil 440 may be attached to the holder 340 with an adhesive. The OIS coil 440 may be disposed by being wound around the protrusion of the holder 340. The OIS coil 440 may be disposed on the holder 340. The OIS coil 440 may be disposed on an upper surface of the holder 340. The OIS coil 440 may be disposed in the second substrate 310. The OIS coil 440 may be electrically connected to the second substrate 310. Both ends of the OIS coil 440 may be soldered to the second substrate 310. The OIS coil 440 may be electrically connected to the driver IC 495. The OIS coil 440 may be electrically connected to the second substrate 310 and the driver IC 495. The OIS coil 440 can receive current from the driver IC 495.

The OIS coil 440 may be disposed in a position corresponding to the OIS magnet 420. The OIS coil 440 may be disposed in a position corresponding to the driving magnet. The OIS coil 440 may be disposed in the holder 340 at a position corresponding to the OIS magnet 420. The OIS coil 440 may face the OIS magnet 420. The OIS coil 440 may comprise a surface facing the OIS magnet 420. The OIS coil 440 may be disposed adjacent to the OIS magnet 420. The OIS coil 440 may interact with the OIS magnet 420. The OIS coil 440 may electromagnetically interact with the OIS magnet 420.

The OIS coil 440 can move the second moving part 300 in a direction perpendicular to the optical axis direction. The OIS coil 440 can move the second substrate 310 in a direction perpendicular to the optical axis direction. The OIS coil 440 can move the sensor substrate 320 in a direction perpendicular to the optical axis direction. The OIS coil 440 can move the image sensor 330 in a direction perpendicular to the optical axis direction. The OIS coil 440 can move the holder 340 in a direction perpendicular to the optical axis direction. The OIS coil 440 may rotate the second moving part 300 about an optical axis. The OIS coil 440 can rotate the second substrate 310 about an optical axis. The OIS coil 440 can rotate the sensor substrate 320 about an optical axis. The OIS coil 440 may rotate the image sensor 330 about an optical axis. The OIS coil 440 can rotate the holder 340 about an optical axis. The OIS magnet 420 and the OIS coil 440 can move the image sensor 330 in a direction perpendicular to the optical axis direction against the base 120.

The OIS coil 440 may comprise a plurality of coils. The OIS coil 440 may comprise four coils. The OIS coil 440 may comprise a coil for x-axis shift. The OIS coil 440 may comprise a coil for y-axis shift.

The OIS coil 440 may comprise a first coil 441. The first coil 441 may be a first sub-coil. The first coil 441 may be a coil for x-axis shift. The first coil 441 can move the second moving part 300 in an x-axis direction. The first coil 441 may be disposed long along a y-axis. The first coil 441 may comprise a plurality of coils. The first coil 441 may comprise two coils. The two coils of the first coil 441 may be electrically connected to each other. The first coil 441 may comprise a connecting coil connecting two coils. In this case, the two coils of the first coil 441 can receive current together. Or, the two coils of the first coil 441 are electrically separated from each other and may receive current individually.

The OIS coil 440 may comprise a second coil 442. The second coil 442 may be a second sub-coil. The second coil 442 may be a coil for y-axis shift. The second coil 442 can move the second moving part 300 in a y-axis direction. The second coil 442 may be disposed long along an x-axis. The first coil 441 may comprise a plurality of coils. The second coil 442 may comprise two coils. The two coils of the second coil 442 may be electrically connected to each other. The second coil 442 may comprise a connection coil connecting two coils. In this case, the two coils of the second coil 442 can receive current together. Or, the two coils of the second coil 442 are electrically separated from each other and may receive current individually.

The camera device 10 may comprise a sensor 445. The sensor 445 may be disposed in the second substrate 310. The sensor 445 may be disposed in the hole of the holder 340. The sensor 445 may comprise a Hall sensor. The sensor 445 may comprise a Hall element (Hall IC). The sensor 445 can detect the OIS magnet 420. The sensor 445 can detect the magnetic force of the OIS magnet 420. The sensor 445 may face the OIS magnet 420. The sensor 445 may be disposed in a position corresponding to the OIS magnet 420. The sensor 445 may be disposed adjacent to the OIS magnet 420. The sensor 445 can detect the position of the second moving part 300. The sensor 445 may detect the movement of the second moving part 300. The sensor 445 may be disposed in a hollow of the OIS coil 440. The sensing value detected by the sensor 445 can be used to feedback image stabilization operation. The sensor 445 may be electrically connected to the driver IC 495.

The sensor 445 may comprise a plurality of sensors. The sensor 445 may comprise three sensors. The sensor 445 may comprise first to third sensors. The first sensor can detect the displacement of the second moving part 300 in an x-axis direction. The second sensor can detect the displacement of the second moving part 300 in a y-axis direction. The third sensor may detect the rotation of the second moving part 300 about a z-axis alone or together with one or more of the first Hall sensor and the second Hall sensor. Each of the first to third sensors may comprise a Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be attached to the first moving part 200 with an adhesive. The sensing magnet 450 may be disposed in the bobbin 210. The sensing magnet 450 may be fixed to the bobbin 210. The sensing magnet 450 may be coupled to the bobbin 210. The sensing magnet 450 may be attached to the bobbin 210 with an adhesive. The sensing magnet 450 may be formed in a smaller size than the AF magnet 410. The sensing magnet 450 may be formed in a smaller size than the OIS magnet 420. Through this, the influence of the sensing magnet 450 on driving can be minimized.

The sensing magnet 450 may be disposed at an opposite side of the correction magnet 460. The sensing magnet 450 and the correction magnet 460 may be disposed at sides opposite to each other in the first moving part 200. The sensing magnet 450 and the correction magnet 460 may be disposed at sides opposite to each other in the bobbin 210.

The camera device 10 may comprise a correction magnet 460. The correction magnet 460 may be a compensation magnet. The correction magnet 460 may be disposed in the first moving part 200. The correction magnet 460 may be fixed to the first moving part 200. The correction magnet 460 may be coupled to the first moving part 200. The correction magnet 460 may be attached to the first moving part 200 with an adhesive. The correction magnet 460 may be disposed in the bobbin 210. The correction magnet 460 may be fixed to the bobbin 210. The correction magnet 460 may be coupled to the bobbin 210. The correction magnet 460 may be attached to the bobbin 210 with an adhesive. The correction magnet 460 may be formed in a smaller size than the AF magnet 410. The correction magnet 460 may be formed in a smaller size than the OIS magnet 420. Through this, the influence of the correction magnet 460 on driving can be minimized. In addition, the correction magnet 460 may be disposed at a side opposite to the sensing magnet 450 to form magnetic force balance with the sensing magnet 450. Through this, tilt that may be caused by the sensing magnet 450 can be inhibited.

The camera device 10 may comprise a third substrate 470. The third substrate 470 may be a substrate. The third substrate 470 may be a printed circuit board (PCB). The third substrate 470 may be a soft substrate. The third substrate 470 may be an FPCB. The third substrate 470 may be coupled with the first substrate 110. The third substrate 470 may be connected to the first substrate 110. The third substrate 470 may be electrically connected to the first substrate 110. The third substrate 470 may be soldered to the first substrate 110. The third substrate 470 may be disposed in the housing 130. The third substrate 470 may be fixed to the housing 130. The third substrate 470 may be coupled to the housing 130. The housing 130 may comprise a groove or hole of a shape corresponding to the third substrate 470. The third substrate 470 may be disposed in a groove or hole of the housing 130. The third substrate 470 may be connected to a terminal of the connecting substrate 600 after bending.

In a direction perpendicular to the optical axis direction, a portion of the third substrate 470 may be disposed between the connecting substrate 600 and the wing portion 131 of the housing 130. The third substrate 470 may be disposed in the groove 131*a* of the wing portion 131 of the housing 130.

The third substrate 470 may comprise a first terminal 471 being connected to the connecting substrate 600. The first terminal 471 may be connected to the connecting substrate 600 through soldering. The third substrate 470 may comprise a second terminal 472 being connected to the upper elastic member 710. The second terminal 472 may be coupled to the upper elastic member 710 through soldering.

The third substrate 370 may comprise a first portion 473 on which the driver IC 480 is disposed. The third substrate 370 may comprise a second portion 474 being coupled to the terminal portion 630 of the connecting substrate 600. The third substrate 370 may comprise a third portion 475 connecting the first portion 473 and the second portion 474. The first portion 473 of the third substrate 370 may be disposed further inside than the second portion 474.

The camera device 10 may comprise a driver IC 480. The driver IC 480 may be an AF driver IC. The driver IC 480 may be electrically connected to the AF coil 430. The driver IC 480 may apply current to the AF coil 430 to perform AF driving. The driver IC 480 may apply power to the AF coil 430. The driver IC 480 may apply current to the AF coil 430. The driver IC 480 may apply voltage to the AF coil 430. The driver IC 480 may be disposed on the third substrate 470. The driver IC 480 may be disposed in a position corresponding to the sensing magnet 450. The driver IC 480 may be disposed to face the sensing magnet 450. The driver IC 480 may be disposed adjacent to the sensing magnet 450.

The driver IC 480 may comprise a sensor. The sensor may comprise a Hall element (Hall IC). The sensor may be disposed at a position corresponding to the sensing magnet 450. The sensor may be disposed to face the sensing magnet 450. The sensor may be disposed adjacent to the sensing magnet 450. The sensor can detect the sensing magnet 450. The sensor can detect the magnetic force of the sensing magnet 450. The sensor can detect the position of the first moving part 200. The sensor can detect the movement of the first moving part 200. The detection value detected by the sensor can be used as feedback for autofocus operation. A sensor may be disposed inside the driver IC 480. The sensor may be embedded in the driver IC 480. The sensor may be comprised in the driver IC 480. The sensor may be a component of the driver IC 480. The sensor may be disposed in the third substrate 470.

The camera device 10 may comprise a gyro sensor 490. The gyro sensor 490 may be disposed in the first substrate 110. The gyro sensor 490 can detect shaking of the camera device 10. The gyro sensor 490 can sense the angular velocity or linear velocity caused by the shaking of the camera device 10. The gyro sensor 490 may be electrically connected to the driver IC 495. The shaking of the camera device 10 detected by the gyro sensor 490 can be used for OIS driving.

The camera device 10 may comprise a driver IC 495. The driver IC 495 may be an OIS driver IC. The driver IC 495 may be electrically connected to the OIS coil 440. The driver IC 495 may apply current to the OIS coil 440 to perform OIS driving. The driver IC 495 may apply power to the OIS coil 440. The driver IC 495 may apply current to the OIS coil 440. The driver IC 495 may apply voltage to the OIS coil 440. The driver IC 495 may be disposed in the second substrate 310.

The camera device 10 may comprise a connecting member. The connecting member may be an interposer. The connecting member may support the movement of the second moving part 300. The connecting member may movably support the second moving part 300. The connecting member may connect the second moving part 300 and the fixed part 100. The connecting member may connect the first substrate 110 and the second substrate 310. The connecting member may electrically connect the first substrate 110 and the second substrate 310. The connecting member may connect the first substrate 110 and the second moving part 300. The connecting member may guide the movement of the second moving part 300. The connecting member may guide the second moving part 300 to move in a direction perpendicular to the optical axis direction. The connecting member may guide the second moving part 300 to rotate about an optical axis. The connecting member may restrict movement of the second moving part 300 in an optical axis direction.

The connecting member may comprise a connecting substrate 600. The connecting member may comprise an elastic member connecting the fixed part 100 and the second moving part 300. The connecting member may comprise a leaf spring. The connecting member may comprise a wire 800. The connecting member may comprise a ball being disposed between the fixed part 100 and the second moving part 300. The connecting member may comprise a conductive member. The connecting member may comprise an electrically conductive tape. The connecting member may comprise EMI tape.

The camera device 10 may comprise a connecting substrate 600. The connecting substrate 600 may be a connecting portion. The connecting substrate 600 may be a connecting member. The connecting substrate 600 may be a soft substrate. The connecting substrate 600 may be a flexible substrate. The connecting substrate 600 may be a flexible printed circuit board. The connecting substrate 600 may be a flexible printed circuit board (FPCB). The connecting substrate 600 may have flexibility at least in part. The second substrate 310 and the connecting substrate 600 may be formed integrally.

The connecting substrate 600 may support the second moving part 300. The connecting substrate 600 may support the movement of the second moving part 300. The connecting substrate 600 may movably support the second moving part 300. The connecting substrate 600 can connect the second moving part 300 and the fixed part 100. The connecting substrate 600 may connect the first substrate 110 and the second substrate 310. The connecting substrate 600 may electrically connect the first substrate 110 and the second substrate 310. The connecting substrate 600 may guide the movement of the second moving part 300. The connecting substrate 600 may guide the second moving part 300 to move in a direction perpendicular to the optical axis direction. The connecting substrate 600 may guide the second moving part 300 to rotate about an optical axis. The connecting substrate 600 may restrict the movement of the second moving part 300 in an optical axis direction. A portion of the connecting substrate 600 may be coupled to the base 120. The connecting substrate 600 may movably support the image sensor 330. The connecting substrate 600 may be disposed inside the cover member 140.

The connecting substrate 600 may comprise two connecting substrates 600 being spaced apart from each other and formed symmetrically. The two connecting substrates 600 may be disposed at both sides of the second substrate 310. The connecting substrate 600 may be bent a total of six times to connect the first substrate 110 and the second substrate 310.

The connecting substrate 600 may comprise a first region being connected to the second substrate 310 and bent in an optical axis direction. The first region is connected to the second substrate 310 and can be bent in an optical axis direction. The first region is connected to the second substrate 310 and may be extended in an optical axis direction. The first region is connected to the second substrate 310 and can be bent and extended in an optical axis direction. The connecting substrate 600 may comprise a second region being extended from the first region. The connecting substrate 600 may comprise a third region being bent in a direction perpendicular to the optical axis direction in the second region. The third region may be bent in a direction perpendicular to the optical axis direction in the second region. The third region may be extended from the second region in a direction perpendicular to the optical axis direction. The third region may be bent and extended from the second region in a direction perpendicular to the optical axis direction.

The connecting substrate 600 may comprise a connecting portion 610 comprising a first region. The connecting substrate 600 may comprise an extension portion 620 comprising a second region and a third region. The connecting substrate 600 may comprise a connecting portion 610 being connected to the second substrate 310. The connecting substrate 600 may comprise an extension portion 620 being extended from the connecting portion 610. The connecting substrate 600 may comprise a terminal portion 630 being connected to the extension portion 620 and comprising a terminal.

The connecting substrate 600 may comprise a connecting portion 610. The connecting portion 610 may be connected to the second moving part 300. The connecting portion 610 may be coupled to the second moving part 300. The connecting portion 610 may be fixed to the second moving part 300. The connecting portion 610 may be connected to the second substrate 310. The connecting portion 610 may be coupled to the second substrate 310. The connecting portion 610 may be fixed to the second substrate 310. The connecting portion 610 may comprise a first bending region being bent in an optical axis direction. The connecting portion 610 may comprise a first region being bent in an optical axis direction with respect to the second substrate 310 and a second region being extended from the first region and bent in a direction perpendicular to the optical axis direction. The connecting portion 610 may be a first connecting substrate. The connecting portion 610 may be connected to the image sensor 330 by soldering.

The connecting portion 610 of the connecting substrate 600 may be disposed further inside than an outer side surface of the base 120. The outer side surface of the base 120 may be disposed at a position corresponding to the inner surface of the side plate 142 of the cover member 140. The connecting portion 610 of the connecting substrate 600 may be disposed on an inner surface of the side plate 142 of the cover member 140. The connecting portion 610 of the connecting substrate 600 may be spaced apart from the inner surface of the side plate 142 of the cover member 140. The connecting portion 610 of the connecting substrate 600 may be spaced apart from the side plate 142 of the cover member 140 by more than a stroke space in a direction perpendicular to the optical axis direction. The terminal portion 630 and the connecting portion 610 of the connecting substrate 600 may be disposed to be spaced apart from the side plate 142 of the cover member 140 by the groove 122 of the base 120. The groove 122 of the base 120 may be recessed so that the connecting portion 610 of the connecting substrate 600 is spaced apart from the side plate 142 of the cover member 140 by more than the stroke space of the connecting portion 610. The wing portion 131 of the housing 130 may be disposed in the groove 122 of the base 120. The wing portion 131 of the housing 130 may be disposed between the terminal portion 630 of the connecting substrate 600 disposed in the groove 122 of the base 120 and the side plate 142 of the cover member 140.

The connecting portion 610 and the extension portion 620 may be connected through a bent portion 615. The bent portion 615 may have a bent shape. As illustrated in FIG. 16, in a modified embodiment, the connecting substrate 600 may comprise a hole 601 being disposed in the bent portion 615. Or, the connecting substrate 600 may comprise a hole 601 being disposed at a position being overlapped with the bent portion 615 in an optical axis direction. The hole 601 may be disposed together with the bent portion 615 and at a position being overlapped with the bent portion 615 in an optical axis direction. The hole 601 may be a circular hole. The hole 601 may be disposed in the center region of the bent portion 615. The connecting portion 610 may comprise a first portion being disposed on one side of the hole 601 and a second portion being disposed on the other side of the hole 601.

As illustrated in FIG. 17, in another modified embodiment, the connecting substrate 600 may comprise a hole 602. The hole 602 may be disposed in the bent portion 615 of the connecting substrate 600. The hole 602 may be disposed at a location being overlapped with the bent portion 615 of the connecting substrate 600 in an optical axis direction. The hole 602 may be extended from the bent portion 615 to a position being overlapped with the bent portion 615 in an optical axis direction. The width of the hole 602 of the connecting substrate 600 in an optical axis direction may be longer than the width in a direction perpendicular to the optical axis direction. The hole 602 may have an oval shape.

As illustrated in FIG. 18, the connecting substrate 600 may comprise a plurality of connecting substrates. The connecting substrate 600 may comprise four connecting substrates being spaced apart from each other. The connecting substrate 600 may comprise first to fourth connecting substrates **600*a*-1, 600*a*-2, 600*a*-3, and 600*a*-4. The first to fourth connecting substrates 600*a*-1, 600*a*-2, 600*a*-3, and 600*a*-4 may be formed symmetrically with respect to the optical axis. The first to fourth connecting substrates 600*a*-1, 600*a*-2, 600*a*-3, and 600*a*-4 may be spaced apart from each other. The first to fourth connecting substrates 600*a*-1, 600*a*-2, 600*a*-3, and 600*a*-4** may be electrically separated from each other.

The connecting substrate 600 may comprise an extension portion 620. The extension portion 620 may connect the connecting portion 610 and the terminal portion 630. The extension portion 620 may be extended from the connecting portion 610. The extension portion 620 may comprise a second bending region being bent in a direction perpendicular to the optical axis direction. The extension portion 620 of the connecting substrate 600 may be spaced apart from the side plate 142 of the cover member 140. The extension portion 620 of the connecting substrate 600 may be spaced apart from the side plate 142 of the cover member 140 in a direction perpendicular to the optical axis direction. The width of the extension portion 620 may be smaller than the width of the terminal portion 630. The extension portion 620 may be a second connecting substrate. The second connecting substrate can connect the first connecting substrate and the third connecting substrate. The extension portion 620 may be a portion that moves when the second moving part 200 moves. The extension portion 620 may be a moving portion. The extension portion 620 may be spaced apart from the wing portion 131 of the housing 130. The extension portion 620 can move inside the space between the inner surface of the side plate 142 of the cover member 140 in a direction perpendicular to the optical axis direction (see L in FIG. 52).

The connecting substrate 600 may comprise a terminal portion 630. The terminal portion 630 may be coupled to the fixed part 100. The terminal portion 630 may be fixed to the fixed part 100. The terminal portion 630 may be coupled to the first substrate 110. The terminal portion 630 may be connected to the first substrate 110. The terminal portion 630 may be soldered to the first substrate 110. The terminal portion 630 may be fixed to the first substrate 110. The terminal portion 630 may be coupled to the base 120. The terminal portion 630 may be fixed to the base 120. The terminal portion 630 may be disposed in an optical axis direction. The terminal portion 630 may comprise a terminal. The terminal may be coupled to the first substrate 110. A plurality of terminals may be disposed at a lower end of the terminal portion 630 of the connecting substrate 600. A plurality of terminals of the connecting substrate 600 may be disposed inside the wing portion 131 of the housing 130. The terminal portion 630 may be a third connecting substrate. The terminal portion 630 may be connected to the first substrate 110 by soldering.

The terminal portion 630 of the connecting substrate 600 may be disposed in the first groove 122 of the base 120. The terminal portion 630 of the connecting substrate 600 may be spaced apart from the side plate 142 of the cover member 140. Through this, the stroke space of the extension portion 620 of the connecting substrate 600 can be secured inside the cover member 140.

The terminal portion 630 may comprise a first terminal 631. The first terminal 631 may be connected to the first substrate 110. The first terminal 631 may be electrically connected to the first substrate 110. The first terminal 631 may be coupled to the first substrate 110. The first terminal 631 may be coupled to the first substrate 110 by a conductive member. The first terminal 631 may be coupled to the first substrate 110 through soldering.

The terminal portion 630 may comprise a second terminal 632. The second terminal 632 may be connected to the third substrate 470. The second terminal 632 may be electrically connected to the third substrate 470. The second terminal 632 may be coupled with the third substrate 470. The second terminal 632 may be coupled to the third substrate 470 by a conductive member. The second terminal 632 may be connected to the third substrate 470 through soldering. The second terminal 632 of the connecting substrate 600 may be overlapped with the first terminal 631 of the connecting substrate 600 in an optical axis direction. The second terminal 632 may be disposed above the first terminal 631. The second terminal 632 may be spaced apart from the first terminal 631. The second terminal 632 may be disposed higher than the first terminal 631.

The first terminal 631 of the connecting substrate 600 may comprise a plurality of first terminals 631. The second terminal 632 of the connecting substrate 600 may comprise a plurality of second terminals 632. In a direction perpendicular to the optical axis direction, the spacing between the plurality of second terminals 632 may be larger than the spacing between the plurality of first terminals 631. In a direction perpendicular to the optical axis direction, the spacing between the plurality of second terminals 632 may be different from the spacing between the plurality of first terminals 631. The second terminal 632 of the connecting substrate 600 may comprise four second terminals.

In the present embodiment, the camera device 10 may comprise a soft substrate. The flexible substrate can connect the fixed part 100 and the second moving part 300. The soft substrate may comprise: a connecting portion 610 being connected to the second moving part 300; an extension portion 620 being extended from the connecting portion 610; and a terminal portion 630 being connected to the extension portion 620 and comprising a terminal.

In the present embodiment, the connecting substrate 600 may comprise a first portion being coupled to the first substrate 110, a second portion being coupled to the second substrate 310, and a third portion connecting the first portion and the second portion. The third portion may be disposed at least partially parallel to an optical axis. The third portion may be formed so that the length in an optical axis direction is longer than the thickness. The second portion of the connecting substrate 600 may be disposed at least partially in parallel with the second substrate 310. The third portion of the connecting substrate 600 may be disposed perpendicular to the second portion at least in part. The third portion of the connecting substrate 600 may be bent roundly at the portion corresponding to the corner of the second substrate 310. The second substrate 310 may comprise: a first side surface and a second side surface being disposed at sides opposite to each other; and a third side surface and a fourth side surface being disposed at sides opposite to each other. The second portion of the connecting substrate 600 may be coupled with the first side surface and the second side surface of the second substrate 310. The first portion of the connecting substrate 600 may be coupled to the portion of the first substrate 110 corresponding to the third and fourth side surfaces of the second substrate 310.

The camera device 10 may comprise a shielding member. The shielding member may be disposed on one surface of the connecting substrate 600. The shielding member may be a conductive tape. The shielding member may be EMI tape. In a modified embodiment, the shielding member may be separated from the connecting substrate 600 and disposed separately. The camera device 10 may comprise a conductive tape. The connecting member may comprise an electrically conductive tape. The connecting substrate 600 may comprise a conductive tape. However, the conductive tape may be understood as a separate component from the connecting substrate 600. The conductive tape may comprise electromagnetic interference (EMI) tape. The conductive tape may be a metal member. The electrically conductive tape may be a metal member. The electrically conductive tape may be a metal layer. The conductive tape may be a thin metal film. The electrically conductive tape may be formed of metal. The electrically conductive tape may be formed of an alloy. The electrically conductive tape may be formed of an electrically conductive material. The conductive tape can have adhesive properties. The conductive tape can be distinguished from the conductive layer 602 of the connecting substrate 600. The conductive tape may be formed of a material different from the conductive layer 602 of the connecting substrate 600.

The conductive tape may be disposed in the connecting substrate 600. The conductive tape may be coupled to the connecting substrate 600. The conductive tape may be fixed to the connecting substrate 600. The conductive tape may be formed integrally with the connecting substrate 600. The electrically conductive tape may have elasticity. The conductive tape may be attached to an outer surface of the connecting substrate 600. Or, the conductive tape may be attached to an inner surface of the connecting substrate 600.

In an optical axis direction, the length of the conductive tape at least in part may be equal to the length of the extension portion 620. The conductive tape may be extended to the same length in an optical axis direction as the extension portion 620. The thickness of the conductive tape may be thinner than the thickness of the connecting substrate 600. The thickness of the conductive tape may be the same as the thickness of the connecting substrate 600. The conductive tape can be connected to ground (GND) and used for impedance matching and noise suppression.

At least a portion of the conductive tape may be disposed in the extension portion 620 of the connecting substrate 600. The extension portion 620 may comprise a bending region being bent in a direction perpendicular to the optical axis direction. At this time, the conductive tape may be disposed in the bending region. The conductive tape may be disposed on an inner surface of the extension portion 620. The conductive tape may be disposed on an outer surface of the extension portion 620.

The conductive tape may be formed of a conductive material. The conductive tape may be electrically connected to the second substrate 310. The conductive tape may be electrically connected to the image sensor 330. The conductive tape may be electrically connected to the driver IC 495. The conductive tape may be connected to the terminal 631 of the connecting substrate 600. The conductive tape may be electrically connected to the terminal 631 of the connecting substrate 600. The conductive tape may be in direct contact with the terminal 631 of the connecting substrate 600. The conductive tape can be used as ground (GND). The conductive tape may be connected to the ground terminal of the connecting substrate 600. The conductive tape may be electrically connected to the first substrate 110. In this case, the quantity of power connection patterns of the connecting substrate 600 may be reduced. The conductive tape may be electrically connected to the ground terminal of the image sensor 330.

The camera device 10 may comprise an elastic member 700. The elastic member 700 may be a support member. The elastic member 700 may connect the fixed part 100 and the first moving part 200. The elastic member 700 can elastically connect the fixed part 100 and the first moving part 200. The elastic member 700 may connect the bobbin 210 and the housing 130. The elastic member 700 can elastically connect the bobbin 210 and the housing 130. The elastic member 700 may movably support the first moving part 200 with respect to the fixed part 100. The elastic member 700 may be deformed when the first moving part 200 moves. When the movement of the first moving part 200 is terminated, the elastic member 700 can position the first moving part 200 to the initial position through restoring force (elastic force). The elastic member 700 may comprise a leaf spring. The elastic member 700 may comprise a spring. The elastic member 700 may have elasticity at least in part. The elastic member 700 may provide restoring force (elastic force) to the first moving part.

The camera device 10 may comprise an upper elastic member 710. The elastic member 700 may comprise an upper elastic member 710. The upper elastic member 710 may be an upper spring. The upper elastic member 710 may be disposed above the lower elastic member 720. The upper elastic member 710 may connect the housing 130 and the bobbin 210. The upper elastic member 710 may be coupled to the housing 130. The upper elastic member 710 may be coupled to the bobbin 210.

The upper elastic member 710 may comprise a plurality of upper elastic units. The upper elastic member 710 may comprise two upper elastic units. The upper elastic member 710 may comprise first and second upper elastic units 710-1 and 710-2. The first and second upper elastic units 710-1 and 710-2 may be spaced apart from each other. The first and second upper elastic units 710-1 and 710-2 may electrically connect the third substrate 470 and the AF coil 430. In a modified embodiment, the lower elastic member 720 may comprise a plurality of lower elastic units. The lower elastic member 720 may comprise two lower elastic units.

The driver IC 480 may be disposed on an inner surface of the third substrate 470. The first upper elastic unit 710-1 may be coupled to an inner surface of the third substrate 470. The second upper elastic unit 710-2 may be coupled to an outer surface opposite to an inner surface of the third substrate 470.

The upper elastic member 710 may comprise an outer portion 711 being coupled to the housing 130. The outer portion 711 of the upper elastic member 710 may be coupled to an upper portion of the housing 130. The outer portion 711 of the upper elastic member 710 may be disposed on an upper surface of the housing 130. The upper elastic member 710 may comprise an inner portion 712 being coupled to the bobbin 210. The inner portion 712 of the upper elastic member 710 may be coupled to an upper portion of the bobbin 210. The inner portion 712 of the upper elastic member 710 may be disposed on an upper surface of the bobbin 210. The upper elastic member 710 may comprise a connecting portion 713 connecting the outer portion 711 and the inner portion 712. The connecting portion 713 may have elasticity.

The connecting portion 713 of the upper elastic member 710 may comprise a first portion **713*a* connecting the outer portion 711 and the inner portion 712. The connecting portion 713 of the upper elastic member 710 may comprise a second portion 713*b* being extended from the first portion 713*a* to a position corresponding to the groove 212 of the bobbin 210. The second portion 713*b* of the connecting portion 713 of the upper elastic member 710 may be disposed closer to the outer portion 711 of the upper elastic member 710 than the inner portion 712 of the upper elastic member 710. The distance between the second portion 713*b* and the outer portion 711 may be shorter than the distance between the second portion 173*b* and the inner portion 712**.

In the present embodiment, the second portion **713*b* of the connecting portion 713 of the upper elastic member 710 may be formed in a circular shape with a larger diameter than the other portions of the second portion 713*b* at the end portion of the second portion 713*b* as illustrated in FIG. 32**(*a*). Through this, the contact area with the second damper 920 increases and the loss of the second damper 920 can be minimized.

In a modified embodiment, as illustrated in FIG. 32(*b*), the second portion **713*c* of the connecting portion 713 of the upper elastic member 710** may be formed straight. That is, compared to the present embodiment, the circular round portion may be omitted.

In another modified embodiment, as illustrated in FIG. 32(*c*), the second portion **713*d* of the connecting portion 713 of the upper elastic member 710 may comprise a hole 713*e* being formed in the circular end portion. The hole 713*e* may be formed in a circular shape. The circular shape of the second portion 713*d* and the circular shape of the hole 713*e* may be concentric. The loss prevention effect of the damper can be increased through the hole 713*e* of the second portion 713*d***.

The upper elastic member 710 may comprise a coupling portion 714. The coupling portion 714 may be coupled to the wire 800. The coupling portion 714 may be extended from the outer portion 711. The coupling portion 714 may comprise a hole **714*a*. The upper elastic member 710 may comprise a hole 714*a* where the wire 800 is disposed. The upper elastic member 710 may comprise a hole 714*a* through which the wire 800** passes.

The upper elastic member 710 may comprise a terminal portion 715. The terminal portion 715 may be coupled with the third substrate 470. The terminal portion 715 may be connected to a terminal of the third substrate 470. The terminal portion 715 may be coupled to the second terminal 472 of the third substrate 470 through a conductive member.

The camera device 10 may comprise a lower elastic member 720. The elastic member 700 may comprise a lower elastic member 720. The lower elastic member 720 may be a lower spring. The lower elastic member 720 may be disposed below the upper elastic member 710. The lower elastic member 720 may connect the housing 130 and the bobbin 210. The lower elastic member 720 may be coupled to the housing 130. The lower elastic member 720 may be coupled to the bobbin 210.

The lower elastic member 720 may comprise an outer portion being coupled to the housing 130. The outer portion of the lower elastic member 720 may be coupled to a lower portion of the housing 130. The outer portion of the lower elastic member 720 may be disposed on a lower surface of the housing 130. The lower elastic member 720 may comprise an inner portion being coupled to the bobbin 210. The inner portion of the lower elastic member 720 may be coupled to a lower portion of the bobbin 210. The inner portion of the lower elastic member 720 may be disposed on a lower surface of the bobbin 210. The lower elastic member 720 may comprise a connecting portion connecting the outer portion and the inner portion. The connecting portion may have elasticity.

The camera device 10 may comprise a wire 800. The wire 800 may be a wire spring. The wire 800 may be an elastic member. The wire 800 may be a leaf spring in a modified embodiment. The wire 800 may connect the fixed part 100 and the second moving part 300. The wire 800 can elastically connect the fixed part 100 and the second moving part 300. The wire 800 may connect the housing 130 and the second substrate 310. The wire 800 may elastically connect the housing 130 and the second substrate 310. The wire 800 may movably support the second moving part 300. The wire 800 may movably support the second moving part 300 against the fixed part 100. The wire 800 may support the movement of the image sensor 330. The wire 800 may movably support the image sensor 330. The wire 800 may be disposed in an optical axis direction. The wire 800 may support the second moving part 300 to move or rotate in a direction perpendicular to the optical axis direction. The wire 800 may connect the upper elastic member 710 and the coupling member 380. The wire 800 may electrically connect the upper elastic member 710 and the coupling member 380. The wire 800 may be coupled to the upper elastic member 710 through soldering. The wire 800 may be coupled to the coupling member 380 through soldering.

The wire 800 may comprise a first portion being coupled to the upper elastic member 710. At this time, the first portion may be an upper end of the wire 800. However, the first portion may be spaced apart from an upper end of the wire 800. The wire 800 may comprise a second portion being coupled to the coupling member 380. At this time, the second portion may be a lower end of the wire 800. However, the second portion may be spaced apart from a lower end of the wire 800.

The camera device 10 may comprise a first damper 910. The first damper 910 may be an OIS damper. The first damper 910 can inhibit oscillation phenomenon during OIS operation. The first damper 910 may have viscosity. The first damper 910 may connect the housing 130 and the wire 800. The first damper 910 may be disposed between the housing 130 and the wire 800. The first damper 910 may be applied between the housing 130 and the wire 800. The first damper 910 may be in contact with the housing 130. The first damper 910 may be in contact with the hole 134 of the housing 130. The first damper 910 may be in contact with the wire 800. At least a portion of the first damper 910 may be disposed in the hole 134 of the housing 130. At least a portion of the first damper 910 may be disposed inside the dam 136 of the housing 130. The first damper 910 can connect the housing 130, which is a fixed part, and the wire 800.

The camera device 10 may comprise a second damper 920. The second damper 920 may be an AF damper. The second damper 920 can inhibit oscillation phenomenon during AF operation. The second damper 920 may have viscosity. The second damper 920 may connect the bobbin 210 and the upper elastic member 710. The second damper 920 may be connected to the connecting portion 713 of the upper elastic member 710. The second damper 920 may connect the groove 212 of the bobbin 210 and the second portion 713*b* of the connecting portion 713 of the upper elastic member 710. The second damper 920 may be disposed closer to the outer portion 711 than the inner portion 712 of the upper elastic member 710. The second damper 920 may be disposed between the groove 212 of the bobbin 210 and the second portion 713*b* of the connecting portion 713 of the upper elastic member 710. The second damper 920 may be applied between the groove 212 of the bobbin 210 and the second portion 713*b* of the connecting portion 713 of the upper elastic member 710. The second damper 920 may be in contact with the groove 212 of the bobbin 210. The second damper 920 may be in contact with the second portion 713*b* of the connecting portion 713 of the upper elastic member 710.

The camera device 10 may comprise a third damper 930. The third damper 930 may be an AF damper. The third damper 930 can inhibit oscillation phenomenon during AF operation. The third damper 930 may be disposed in addition to the second damper 920. Or, the third damper 930 may be disposed without the second damper 920. That is, one or more of the second damper 920 and the third damper 930 may be disposed. The third damper 930 may have viscosity. The third damper 930 may be disposed closer to the outer portion 711 than the inner portion 712 of the upper elastic member 710. The distance between the third damper 930 and the outer portion 711 of the upper elastic member 710 may be shorter than the distance between the second damper 920 and the outer portion 711 of the upper elastic member 710. The third damper 930 may be disposed between the second damper 920 and the outer portion 711 of the upper elastic member 710.

The third damper 930 may connect the bobbin 210 and the upper elastic member 710. The third damper 930 may connect the protrusion 213 of the bobbin 210 and the upper elastic member 710. The third damper 930 may connect the bobbin 210 and the connecting portion 713 of the upper elastic member 710. The third damper 930 may connect the bobbin 210 and the first portion 713*a* of the upper elastic member 710. The third damper 930 may connect the protrusion 213 of the bobbin 210 and the first portion 713*a* of the upper elastic member 710. The third damper 930 may be connected to a portion between the outer portion 711 and the second portion 713*b* of the first portion 713*a* of the upper elastic member 710. The third damper 930 may be disposed between the protrusion 213 of the bobbin 210 and the first portion 713*a* of the upper elastic member 710. The third damper 930 may be applied between the protrusion 213 of the bobbin 210 and the first portion 713*a* of the upper elastic member 710. The third damper 930 may be in contact with the protrusion 213 of the bobbin 210. The third damper 930 may be in contact with the first portion 713*a* of the upper elastic member 710.

The camera device 10 may comprise a fourth damper 940. The fourth damper 940 may be an OIS damper. The fourth damper 940 can inhibit oscillation phenomenon during OIS operation. The fourth damper 940 may be disposed in addition to the first damper 910. Or, the fourth damper 940 may be disposed without the first damper 910. That is, one or more of the first damper 910 and the fourth damper 940 may be disposed. The fourth damper 940 may have viscosity. The fourth damper 940 can connect the coupling member 380 and the base 120. The fourth damper 940 may be disposed between the coupling member 380 and the base 120. The fourth damper 940 may be applied between the coupling member 380 and the base 120. The fourth damper 940 may be in contact with the coupling member 380. The fourth damper 940 may be in contact with the base 120. At least a portion of the fourth damper 940 may be disposed in the groove 123 of the base 120. The fourth damper 940 may be connected to the extension portion 383 of the coupling member 380. The fourth damper 940 may be in contact with the soldering portion. The fourth damper 940 may cover a portion of the soldered portion. The fourth damper 940 may be in contact with the coupling portion 380*a* other than the extension portion 383.

Each of the first to fourth dampers 910, 920, 930, and 940 is an independent component, and one or more of the first to fourth dampers 910, 920, 930, and 940 may be omitted. The first to fourth dampers 910, 920, 930, and 940 may be provided as one or in combination of two or more.

Hereinafter, the operation of the camera device according to the present embodiment will be described with reference to the drawings.

Figure 55:
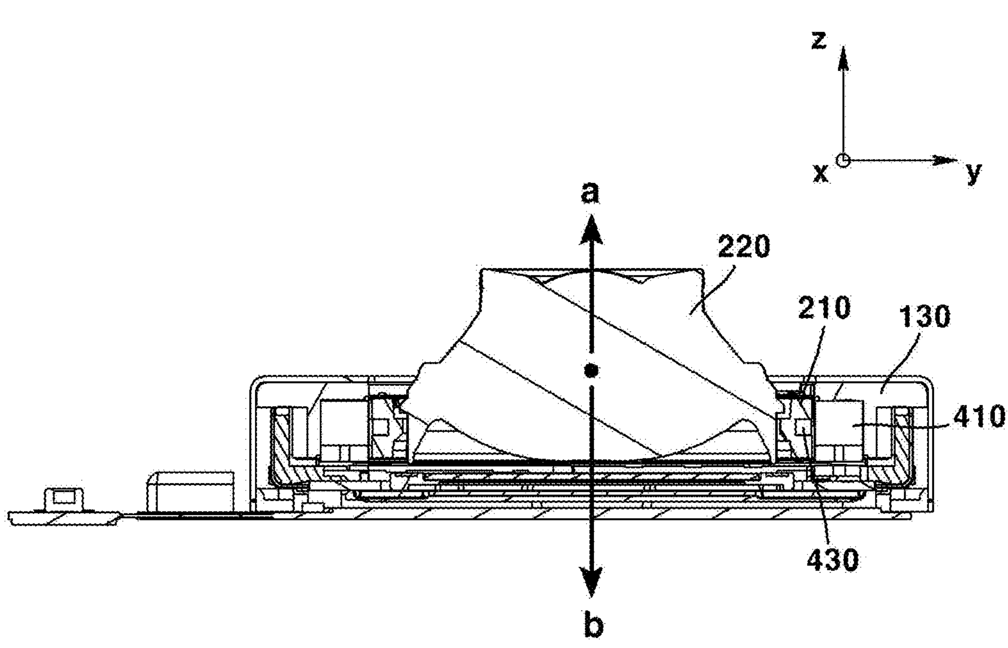
FIG. 55 is a diagram for explaining an operation of an autofocus function of a camera device according to the present embodiment.

FIG. 55 is a diagram for explaining an operation of an autofocus function of a camera device according to the present embodiment.

When power is applied to the AF coil 430 of the camera device 10 according to the present embodiment, an electromagnetic field is formed in the AF coil 430, and the AF coil 430 can be moved in an optical axis direction (z-axis direction) through electromagnetic interaction with the AF magnet 410. At this time, the AF coil 430 may move in an optical axis direction together with the first moving part 200 comprising the lens 220. In this case, the lens 220 moves away from or approaches the image sensor 330, so the focus of the subject can be adjusted. To apply power to the AF coil 430, one or more of current and voltage may be applied.

When a current in a first direction is applied to the AF coil 430 of the camera device 10 according to the present embodiment, the AF coil 430 can move in an upward direction of the optical axis through electromagnetic interaction with the AF magnet 410 (see a in FIG. 55). At this time, the AF coil 430 can move the lens 220 upward in an optical axis direction away from the image sensor 330.

When a current in a second direction opposite to the first direction is applied to the AF coil 430 of the camera device 10 according to the present embodiment, the AF coil 430 can move in a downward direction (see b in FIG. 55) of the optical axis direction through electromagnetic interaction with the AF magnet 410. At this time, the AF coil 430 may move the lens 220 in a downward direction of the optical axis direction to be closer to the image sensor 330.

Figure 56:
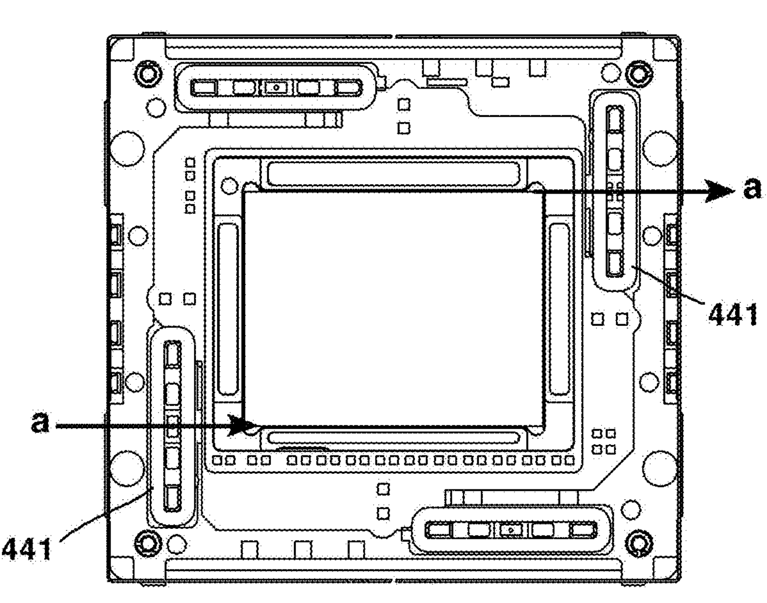
FIGS. 56 to 58 are diagrams for explaining the driving of an image stabilization function of a camera device according to the present embodiment. In more detail.
Figure 56:
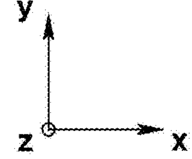
Figure 57:
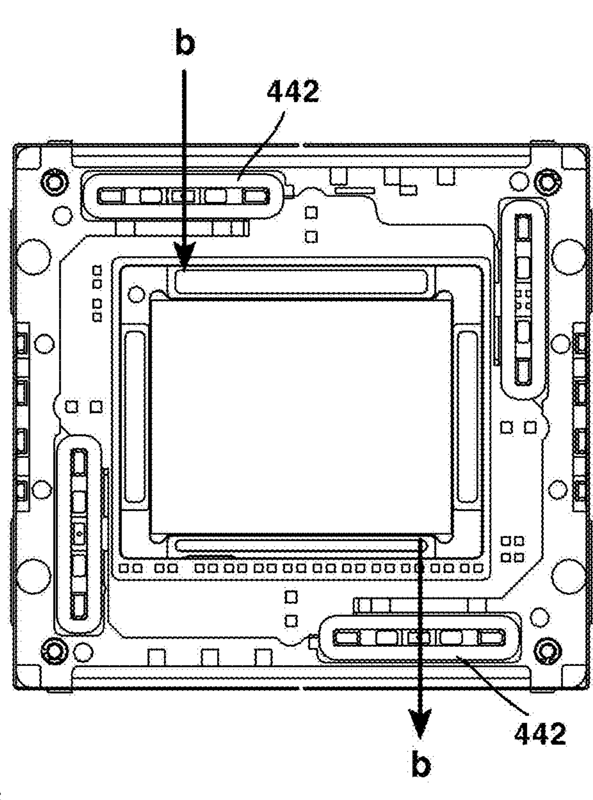
Figure 57:
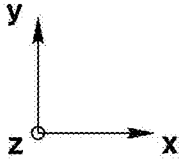
Figure 58:
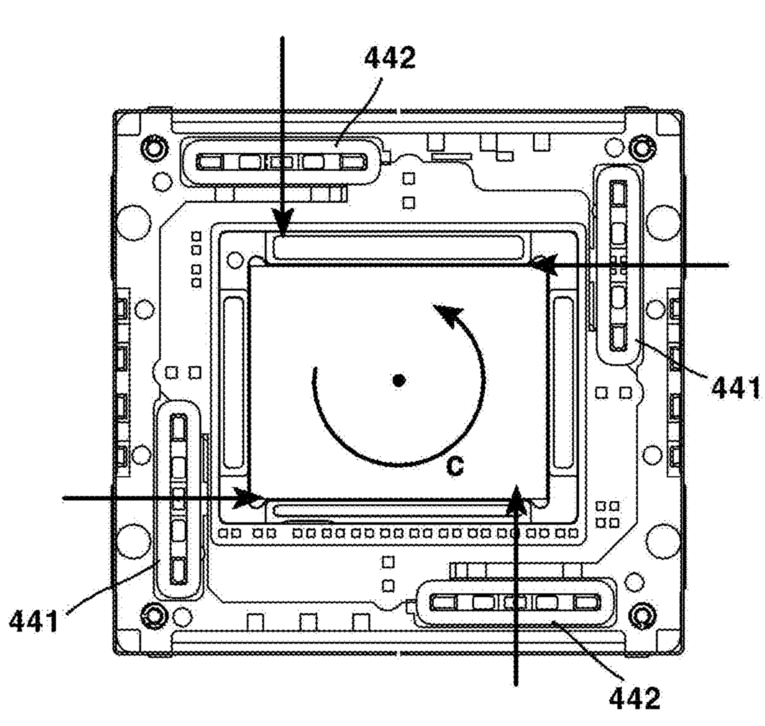
Figure 58:
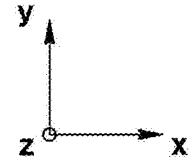

FIGS. 56 to 58 are diagrams for explaining the driving of the image stabilization function of a camera device according to the present embodiment.

When power is applied to the OIS coil 440 of the camera device 10 according to the present embodiment, an electromagnetic field is formed in the OIS coil 440, and the OIS coil 440 can move in a direction perpendicular to the optical axis direction through electromagnetic interaction with the OIS magnet 420. In addition, the OIS coil 440 can rotate about an optical axis through electromagnetic interaction with the OIS magnet 420. At this time, the OIS coil 440 may move or rotate together with the second moving part 300 comprising the image sensor 330. In the present embodiment, the OIS coil 440 may move the image sensor 330 to compensate for the shaking of the camera device 10 being detected by the gyro sensor 490.

FIG. 56 is a diagram illustrating the driving in which an image sensor of a camera device is shifted along an x-axis according to the present embodiment.

When a current in a first direction is applied to the first coil 441 of the camera device 10 according to the present embodiment, The first coil 441 can move in one direction (see a in FIG. 56) of the first direction (x-axis direction) perpendicular to the optical axis direction through electromagnetic interaction with the OIS magnet 420. At this time, the first coil 441 may move the image sensor 330 in one direction of the first direction perpendicular to the optical axis direction. Conversely, when a current in a second direction opposite to the first direction is applied to the first coil 441, the first coil 441 can move in the other direction of the first direction (x-axis direction) perpendicular to the optical axis direction through electromagnetic interaction with the OIS magnet 420. At this time, the first coil 441 may move the image sensor 330 in another direction of the first direction perpendicular to the optical axis direction.

FIG. 57 is a diagram illustrating the driving in which an image sensor of a camera device is shifted along a y-axis according to the present embodiment.

When a current in a first direction is applied to the second coil 442 of the camera device 10 according to the present embodiment, the second coil 442 can move in one direction (see b in FIG. 57) of a second direction (y-axis direction) perpendicular to the optical axis direction through electromagnetic interaction with the OIS magnet 420. At this time, the second coil 442 may move the image sensor 330 in one direction of the second directions perpendicular to the optical axis direction. Conversely, when a current in a second direction opposite to the first direction is applied to the second coil 442, the second coil 442 can move in the other direction of the second direction (y-axis direction) perpendicular to the optical axis direction through electromagnetic interaction with the OIS magnet 420. At this time, the second coil 442 may move the image sensor 330 in another direction of the second direction perpendicular to the optical axis direction.

FIG. 58 is a diagram illustrating the driving in which an image sensor of a camera device is rolling about a z-axis according to the present embodiment.

When a current in a first direction is applied to the first coil 441 and the second coil 442 of the camera device 10 according to the present embodiment, the first coil 441 and the second coil 442 can rotate in one direction about an optical axis through electromagnetic interaction with the OIS magnet 420 (see c in FIG. 58). At this time, the first coil 441 and the second coil 442 may rotate the image sensor 330 in one direction about an optical axis. At this time, one direction may be counterclockwise. Conversely, when a current in a second direction opposite to the first direction is applied to the first coil 441 and the second coil 442, the first coil 441 and the second coil 442 can rotate in other directions about an optical axis through electromagnetic interaction with the OIS magnet 420. At this time, the first coil 441 and the second coil 442 may rotate the image sensor 330 in other direction about an optical axis. At this time, the other direction may be clockwise.

Hereinafter, an optical apparatus according to the present embodiment will be described with reference to the drawings.

Figure 59:
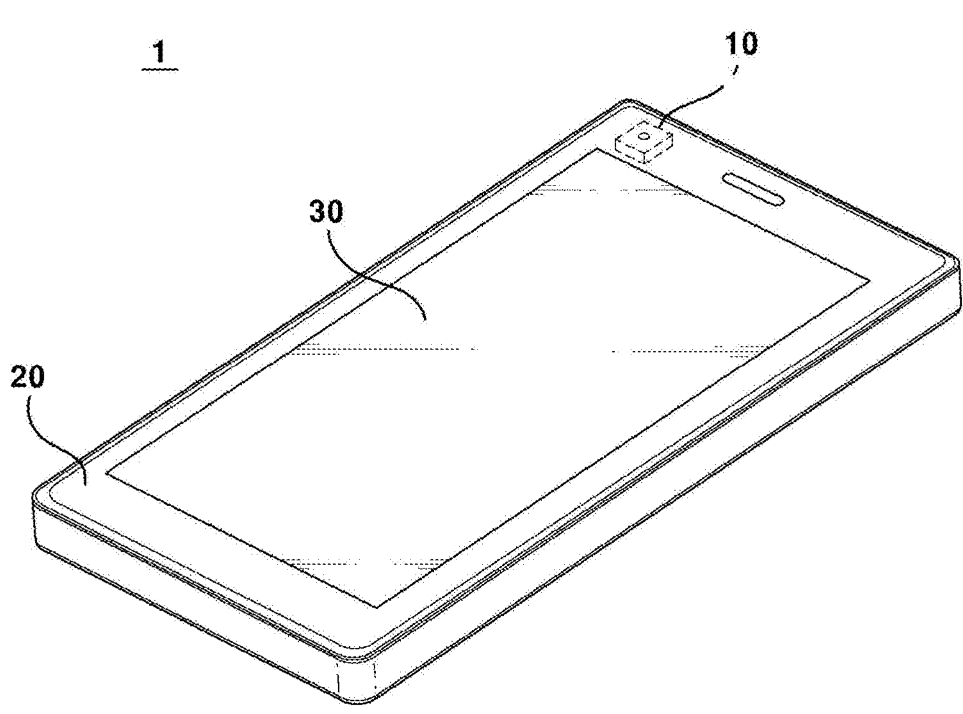
FIG. 59 is a perspective view of an optical apparatus according to the present embodiment.
Figure 60:
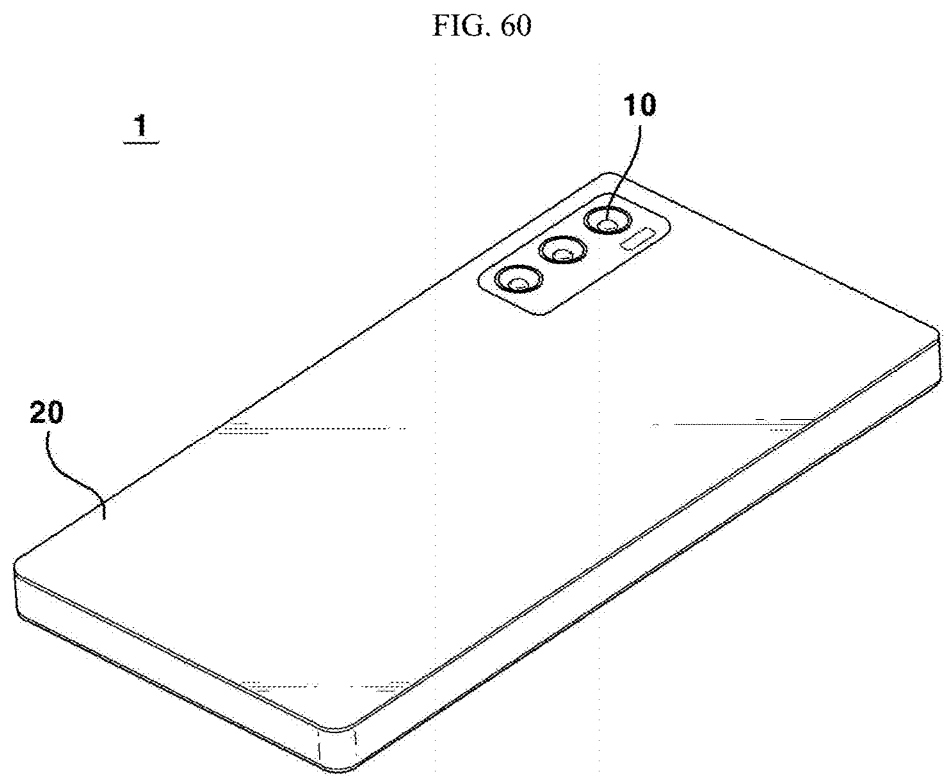
FIG. 60 is a perspective view of an optical apparatus according to the present embodiment seen from a direction different from that of FIG. 59.

FIG. 59 is a perspective view of an optical apparatus according to the present embodiment; and FIG. 60 is a perspective view of an optical apparatus according to the present embodiment seen from a direction different from that of FIG. 59.

An optical apparatus 1 may comprise any one or more among cell phones, mobile phones, portable terminals, mobile terminals, smart phones, smart pads, portable smart devices, digital cameras, laptop computers, digital broadcasting terminals, and personal digital assistants (PDAs), portable multimedia player (PMP), and navigation. The optical apparatus 1 may comprise any device for photographing images or photos.

The optical apparatus 1 may comprise a main body 20. The optical apparatus 1 may comprise a camera device 10. The camera device 10 may be disposed in the main body 20. The camera device 10 can photograph a subject. The optical apparatus 1 may comprise a display 30. The display 30 may be disposed in the main body 20. The display 30 can output one or more of a video or image photographed by the camera device 10. The display 30 may be disposed on a first surface of the main body 20. The camera device 10 may be disposed on one or more of the first surface of the main body 20 and the second surface opposite the first surface.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:

a base;

a holder movably disposed relative to the base;

an image sensor configured to move together with the holder;

a magnet and a coil configured to move the image sensor in a direction perpendicular to an optical axis direction;

a metallic member disposed between the base and the holder in the optical axis direction; and a first damper connecting the base and the metallic member, wherein the first damper has viscosity, and wherein the base comprises a groove recessed from a surface facing the holder and disposed adjacent to the first damper.

2. The camera device of claim 1, comprising:

a wire movably supporting the image sensor;

a housing fixed to the base; and a second damper connecting the housing and the wire, wherein the wire is disposed in the optical axis direction, wherein the housing comprises a hole or a groove through which the wire passes, and wherein at least a portion of the first-second damper is disposed in the hole or on the groove of the housing.

3. The camera device of claim 2, wherein the hole or the groove of the housing comprises a first chamfer having a width increasing in the direction perpendicular to the optical axis direction as it moves upward; and a second chamfer disposed below the first chamfer and having a width increasing in the direction perpendicular to the optical axis direction as it moves downward, and wherein a length of the second chamfer in the optical axis direction is greater than a length of the first chamfer in the optical axis direction.

4. The camera device of claim 1, wherein the metallic member is configured to move in a state of being maintained in connection with the first damper when the image sensor moves by the magnet and the coil.

5. The camera device of claim 1, comprising:

a wire movably supporting the image sensor;

a housing fixed to the base;

a second damper connecting the housing and the wire; and an upper elastic member coupled to the housing, wherein a first portion of the wire is coupled with the upper elastic member.

6. The camera device of claim 5, wherein the first second damper is spaced apart from the upper elastic member.

7. The camera device of claim 5, comprising:

a bobbin movably disposed in the housing; and a third damper connecting the bobbin and the upper elastic member, wherein the upper elastic member comprises an outer portion coupled with the housing, an inner portion coupled with the bobbin, a connecting portion connecting the outer portion and the inner portion, and a coupling portion extending from the outer portion and coupled with the wire, and wherein the third damper is connected with the connecting portion of the upper elastic member.

8. The camera device of claim 7, wherein the bobbin comprises a groove formed on an upper surface of the bobbin, wherein the connecting portion of the upper elastic member comprises a first portion connecting the outer portion and the inner portion, and a second portion extending from the first portion to a position corresponding to the groove of the bobbin, and wherein the third damper connects the groove of the bobbin and the second portion of the connecting portion of the upper elastic member.

9. The camera device of claim 8, wherein the second portion of the connecting portion of the upper elastic member is disposed closer to the outer portion of the upper elastic member than to the inner portion of the upper elastic member.

10. An optical apparatus comprising:

a main body;

the camera device of claim 1 disposed on the main body; and a display disposed on the main body and configured to output a video or an image photographed by the camera device.

11. The camera device of claim 8, wherein the second portion of the connecting portion of the upper elastic member is formed in a circular shape with a diameter greater than another portion of the second portion at an end portion of the second portion, and wherein the second portion of the connecting portion of the upper elastic member comprises a hole formed on the end portion of the second portion.

12. The camera device of claim 8, wherein the bobbin comprises a protrusion formed on the upper surface of the bobbin, wherein a fourth damper connects the protrusion of the bobbin and the first portion of the upper elastic member, and wherein the fourth damper is connected with a portion of the first portion of the upper elastic member between the outer portion and the second portion.

13. The camera device of claim 5, comprising:

a first substrate disposed with the base;

a second substrate spaced apart from the first substrate and electrically connected with the image sensor; and a connection substrate connecting the first substrate and the second substrate;

wherein a second portion of the wire is coupled with the metallic member.

14. The camera device of claim 1, comprising:

a fixed part comprising the base;

a moving part comprising the holder and the image sensor; and a ball disposed between the fixed part and the moving part.

15. The camera device of claim 1, wherein the metallic member comprises an extension portion bent and extending toward the groove of the base.

16. The camera device of claim 15, comprising a wire movably supporting the image sensor, wherein the metallic member comprises a coupling portion coupled with the wire, and wherein the extension portion extends from the coupling portion toward the groove of the base to form an obtuse angle with the coupling portion.

17. The camera device of claim 16, wherein at least a portion of the first damper is disposed in the groove of the base to be connected with the extension portion of the metallic member.

18. The camera device of claim 1, wherein the metallic member is a coupling member formed of metal.

19. A camera device comprising:

a base;

a holder movably disposed relative to the base;

an image sensor configured to move together with the holder;

a magnet and a coil configured to move the image sensor in a direction perpendicular to an optical axis direction;

a coupling member disposed between the base and the holder in the optical axis direction; and a first damper connecting the base and the coupling member, wherein the first damper has viscosity, and wherein the base comprises a groove recessed from a surface facing the holder and disposed adjacent to the first damper.

20. A camera device comprising:

a first member;

a holder movably disposed relative to the first member;

an image sensor configured to move together with the holder;

a magnet and a coil configured to move the image sensor in a direction perpendicular to an optical axis direction;

a metallic member disposed between the first member and the holder in the optical axis direction; and a first damper connecting the first member and the metallic member, wherein the first damper has viscosity, and wherein the first member comprises a groove recessed from a surface facing the holder and disposed adjacent to the first damper.

* * * * *